United States Patent
Ramelson et al.

(10) Patent No.: US 7,373,500 B2
(45) Date of Patent: May 13, 2008

(54) SECURE NETWORK PROCESSING

(75) Inventors: Brian Ramelson, Brighton, MA (US);
Stephen Metzger, Harvard, MA (US);
Paul Phillips, Westboro, MA (US);
Rajesh Vaidheswarra, Northborough, MA (US)

(73) Assignee: Sun MicroSystems, Inc., Santa Clara, CA (US)

( * ) Notice: Subject to any disclaimer, the term of this patent is extended or adjusted under 35 U.S.C. 154(b) by 752 days.

(21) Appl. No.: 10/414,459

(22) Filed: Apr. 15, 2003

(65) Prior Publication Data

US 2004/0250059 A1    Dec. 9, 2004

(51) Int. Cl.
*H04L 9/00* (2006.01)
(52) U.S. Cl. ..................................... 713/150
(58) Field of Classification Search ............... 713/150, 713/153, 151, 192, 154
See application file for complete search history.

(56) References Cited

U.S. PATENT DOCUMENTS

| | | | |
|---|---|---|---|
| 6,836,474 B1 * | 12/2004 | Larsson et al. ............. 370/338 |
| 7,043,632 B2 * | 5/2006 | Chapman et al. ........... 713/153 |
| 2002/0191604 A1 | 12/2002 | Mitchell et al. |
| 2003/0014650 A1 * | 1/2003 | Freed et al. ................ 713/189 |
| 2003/0105977 A1 * | 6/2003 | Brabson et al. ............. 713/201 |
| 2004/0123096 A1 * | 6/2004 | Buer et al. .................. 713/153 |

OTHER PUBLICATIONS

The SSL Protocol, Version 3.0, Alan O. Freier et al., Netscape Communications, Nov. 18, 1996 (pp. 1-63).
Transmission Control Protocol, DARPA Internet Program, Information Sciences Institute, University of Southern California, Marina Del Ray, CA, Sep. 1981 (pp. i-iii, 1-85).

* cited by examiner

*Primary Examiner*—Ellen Tran
(74) *Attorney, Agent, or Firm*—Barry W. Chapin, Esq.; Chapin IP Law, LLC

(57) ABSTRACT

In one general aspect, a network communication unit is disclosed that includes a cryptographic record parsing offload engine that has an input and an output. The unit also includes a processor that includes cryptographic handshake logic and has an input operatively connected to the output of the cryptographic record parsing offload engine.

11 Claims, 17 Drawing Sheets

1) Datagrams begin arriving

2) As more arrive, start issuing acknowledges and move pointer

3) Occasionally a frame will be lost on receipt

4) Only practical to support one orphan sequence

5) Issue acknowedges up to Forward Seq #

SECURE NETWORK PROCESSING

CROSS-REFERENCE TO RELATED APPLICATIONS

This application is related to copending applications entitled Stream Memory Manager and Object-Aware Transport-Layer Network Processing Engine, both filed on the same day as this application and herein incorporated by reference.

FIELD OF THE INVENTION

This application relates to packet-based computer network communication systems, such as hardware communication systems that can terminate a large number of transport layer connections.

BACKGROUND OF THE INVENTION

Modern computers are often interconnected to form networks that enable various forms of interaction, such as file transfer, web browsing, or e-mail. Many of these networks, including the Internet, are based on the layered Transmission Control Protocol over Internet Protocol (TCP/IP) model. These and other types of networks can be organized according to the more extensive Open Systems Interconnection (OSI) model set forth by the International Standards Organization (ISO).

The lowest two layers of the TCP/IP and OSI models are the physical layer and the data link layer. The physical layer defines the electrical and mechanical connections to the network. The data link layer performs fragmentation and error checking using the physical layer to provide an error-free virtual channel to the third layer.

The third layer is known as the network layer. This layer determines routing of packets of data from sender to receiver via the data link layer. In the TCP/IP model, this layer employs the Internet Protocol (IP).

The fourth layer is the transport layer. This layer uses the network layer to establish and dissolve virtual, error-free, point-to-point connections, such that messages sent by one computer will arrive uncorrupted and in the correct order at another computer. The fourth layer can also use port numbers to multiplex several types of virtual connections through a path to a same machine. In the TCP/IP model, this layer employs the Transfer Control Protocol (TCP).

Network services such as File Transfer Protocol (FTP), Hypertext Transfer Protocol (HTTP), Secure HTTP (HTTPS), and Simple Mail Transfer Protocol (SMTP) can be viewed as residing at one or more higher levels in the hierarchical model (e.g., Level 5 through Level 7). These services use the communication functionality provided by the lower levels to communicate over the network.

TCP/IP functionality can be provided to processes running on a node computer through an interface known as the sockets interface. This interface provides libraries that allow for the creation of individual communications end-points called "sockets." Each of these sockets has an associated socket address that includes a port number and the computer's network address.

Netscape Corporation has developed a secure form of sockets, called the Secure Sockets Layer (SSL). This standard uses secure tokens to ensure security and privacy in network communications. It provides for encryption during a communications session and authentication of client computers, server computers, or both.

Security concerns often require private networks to be connected to public networks by firewalls. These can reside in a peripheral network zone of an organization's Local Area Network (LAN) known as the Demilitarized Zone (DMZ). They typically include a number of public Internet ports and a single highly monitored choke point connection to the LAN. This architecture allows them to implement a variety of security functions to protect the LAN from outside attacks, and to hide the IP addresses of the computers inside the firewall.

In addition to firewalls, high-traffic web service providers, e-commerce systems, or other large-scale network-based systems often use load balancers. These distribute traffic among a number of servers based on a predetermined distribution scheme. This scheme can be simple, such as a "round-robin" scheme, or it can be based on contents of the packet itself, such as its source IP address.

Load balancers that use a distribution scheme based on packet contents often use a technique known as "stitching." This type of device typically buffers a portion of a packet received from a client until the relevant part of the packet has been examined, from which it selects a server. It can then send the buffered packet data to the server until its buffer is empty. The load balancer then simply relays any further packet data it receives to the selected server, thereby "stitching" the connection between the client and server.

To improve TCP/IP performance in network devices, some computers have been equipped with hardware-based TCP/IP Offload Engines (TOEs). These offload engines implement some of the TCP/IP functionality in hardware. They generally work in connection with a modified sockets interface that is configured to take advantage of the hardware-based functionality.

SUMMARY OF THE INVENTION

In one general aspect, the invention features a network communication unit that includes connection servicing logic that is responsive to transport-layer headers and is operative to service virtual, error-free network connections. A programmable parser is responsive to the connection servicing logic and is operative to parse application-level information received by the connection servicing logic for at least a first of the connections. Also included is application processing logic that is responsive to the parser and operative to operate on information received through at least the first of the connections based on parsing results from the parser.

In preferred embodiments, the unit can further include interaction-defining logic operative to define different interactions between the connection servicing logic, the parser, and the application processing logic, the unit can further include a message-passing system to enable the interactions defined by the interaction-defining logic. The message-passing system can operate with a higher priority queue and a lower priority queue, with at least portions of messages in the higher priority queue being able to pass at least portions of messages in the lower priority queue. The programmable parser can include dedicated, function-specific parsing hardware. The programmable parser can include general-purpose programmable parsing logic. The programmable parser can include an HTTP parser. The programmable parser includes programmable parsing logic that is responsive to user-defined policy rules. The connection servicing logic can include a transport-level state machine substantially completely implemented with function-specific hardware. The connection servicing can logic include a TCP/IP state machine substantially completely implemented with function-specific hardware. The unit can further include a packet-based physical network communications interface having an output operatively connected to an input of the connection servicing logic. The connection servicing logic can include logic sufficient to establish a connection autonomously. The connection servicing logic can include a downstream flow control input path responsive to a downstream throughput signal path and transport layer connection speed adjustment logic responsive to the downstream flow control input path. The transport layer connection flow adjustment logic can be operative to adjust an advertised window parameter. The application processing logic can include stream modification logic. The stream modification logic can include stream deletion logic. The stream modification logic can include stream insertion logic. The stream insertion logic can be responsive to a queue of streams to be assembled and transmitted by the connection servicing logic. The application processing logic and the stream insertion logic can be operative to insert cookie streams into a data flow transmitted by the connection servicing logic. The connection servicing logic can include a stream extension command input responsive to an output of the programmable parser. The unit can further include stream storage responsive to the connection servicing logic and operative to store contents of a plurality of transport-layer packets received by the connection servicing logic for a same connection. The stream storage can be operative to respond to access requests that include a stream identifier and a stream sequence identifier. The stream storage can include function-specific hardware logic. The stream storage can also be responsive to the programmable parser to access streams stored by the connection servicing logic. The stream storage can also be responsive to the application processing logic to access streams stored by the connection servicing logic. The stream storage can include function-specific memory management hardware operative to allocate and deallocate memory for the streams. The stream storage can be accessible through a higher priority queue and a lower priority queue, with at least portions of messages in the higher priority queue being able to pass at least portions of messages in the lower priority queue. The programmable parser can include logic operative to parse information that spans a plurality of transport-layer packets. The programmable parser can include logic operative to parse information in substantially any part of an HTTP message received through the connection servicing logic. The application processing logic can include logic operative to perform a plurality of different operations on information received through a single one of the connections based on successive different parsing results from the programmable parser. The application processing logic can include object-aware load-balancing logic. The application processing logic can include object-aware firewall logic. The application processing logic can include protocol-to-protocol content mapping logic. The application processing logic can include content-based routing logic. The application processing logic can include object modification logic. The application processing logic can include compression logic. The unit can further include an SSL processor operatively connected to the connection servicing logic. The connection servicing logic, the programmable parser, and the application processing logic can be substantially all housed in a same housing and powered substantially by a single power supply. At least the connection servicing logic and the programmable parser can be implemented using function-specific hardware in a same integrated circuit. The network communication unit can be operatively connected to a public network and to at least one node via a private network path. The network communication unit can be operatively connected to the Internet and to at least one HTTP server via the private network path. The programmable parser can include parsing logic and lookup logic responsive to a result output of the parsing logic. The programmable parser can include longest prefix matching logic and longest suffix matching logic. The programmable parser can include exact matching logic. The programmable parser can include matching logic with at least some wild-carding capability. The programmable parser can include function-specific decoding hardware for at least one preselected protocol. The programmable parser can include protocol-specific decoding hardware for string tokens. The programmable parser can include protocol-specific decoding hardware for hex tokens. The programmable parser can include dedicated white space detection circuitry. The programmable parser can include logic operative to limit parsing to a predetermined amount of information contained in the transport-level packets received by the connection servicing logic. The application processing logic can include quality-of-service allocation logic. The application processing logic can include dynamic quality-of-service allocation logic. The application processing logic can include service category marking logic.

In another general aspect, the invention features a network communication unit that includes servicing means responsive to transport-layer headers, for servicing virtual, error-free network connections, programmable parsing means responsive to the means for servicing, for parsing application-level information received by the servicing means for at least a first of the connections, and means responsive to the parsing means, for operating on information received through at least the first of the connections based on parsing results from the programmable parsing means.

In a further general aspect, the invention features a network communication unit that includes a plurality of processing elements operative to perform operations on network traffic elements, and interaction-defining logic operative to set up interactions between the processing elements to cause at least some of the plurality of processing elements to interact with each other in one of a plurality of different ways to achieve one of a plurality of predetermined network traffic processing objectives.

In preferred embodiments, the interaction-defining logic can be implemented using software running on a general-purpose processor. The interaction-defining logic can operate by downloading commands to function-specific processing element circuitry. The interaction-defining logic can treat the processing elements as including at least a parsing entity, an object destination, a stream data source, and a stream data target. The interaction-defining logic can be operative to define the interactions between the processing elements to provide sever load balancing services. The interaction-defining logic can be operative to define the interactions between the processing elements to provide network caching services. The interaction-defining logic can be operative to define the interactions between the processing elements to provide network security services. The processing elements can include a TCP/IP state machine and a transport-level parser. One of the processing elements can include a compression engine. One of the processing elements can include a stream memory manager operative to allow others of the processing elements to store and retrieve data in a stream format. The processing elements can be operatively connected by a message passing system, with the interaction-defining logic being operative to change topological characteristics of the message passing system. The message-passing system operates with a higher priority queue and a lower priority queue and wherein at least portions of messages in the higher priority queue can pass at least portions of messages in the lower priority queue. The processing elements can each include dedicated, function-specific processing hardware. The unit can further include a packet-based physical network communications interface having an output operatively connected to an input of the connection servicing logic.

In another general aspect, the invention features a network communication unit that includes a plurality of means for performing operations on network traffic elements, and means for setting up interactions between the means for performing operations to cause at least some of the plurality of processing elements to interact with each other in one of a plurality of different ways to achieve one of a plurality of predetermined network traffic processing objectives.

In a further general aspect, the invention features a network communication unit that includes an application-layer rule specification interface operative to define rules that each include a predicate that defines one or more conditions within an application layer construct and an action associated with that condition, condition detection logic responsive to the rule specification logic and operative to detect the conditions according to the rules, and implementation logic responsive to the rule specification interface and to the condition detection logic operative to perform an action specified in a rule when a condition for that rule is satisfied.

In preferred embodiments, implementation logic is can be operative to perform load-balancing operations. The implementation logic can be operative to perform caching operations. The implementation logic can be operative to perform firewall operations. The implementation logic can be operative to perform compression operations. The implementation logic can be operative to perform cookie insertion operations. The implementation logic can be operative to perform dynamic quality of service adjustment operations. The implementation logic can be operative to perform stream modification operations. The implementation logic can be operative to perform packet-marking operations. The condition detection logic can be operative to detect information in HTTP messages. The condition detection logic can be operative to detect information in IP headers. The implementation logic can be operative to perform object modifications. Most of the rule-specification interface, the condition detection logic, and the implementation logic can be built with function-specific hardware. Substantially all of the rule-specification interface, the condition detection logic, and the implementation logic can be built with function-specific hardware. The implementation logic can be operative to request at least one retry. The implementation logic can be operative to redirect at least a portion of a communication. The implementation logic can be operative to forward at least a portion of a communication.

In another general aspect, the invention features a network communication unit that includes means for defining application-layer rules that each include a predicate that defines one or more conditions within an application layer construct and an action associated with that condition, condition detecting means responsive to the rule defining means for detecting the conditions according to the rules, and means responsive to the rule defining means and to the condition detecting means for performing an action specified in a rule when a condition for that rule is satisfied.

In a further general aspect, the invention features a network communication unit that includes connection servicing logic responsive to transport-layer packet headers and operative to service virtual, error-free network connections, a downstream flow control input responsive to a downstream throughput signal output, and transport layer connection flow adjustment logic responsive to the downstream flow control input path and implemented with function-specific hardware logic.

In preferred embodiments, the unit can further include stream storage, with the downstream throughput signal path being provided by the stream storage. The transport layer connection speed adjustment logic can be operative to adjust an advertised window parameter passed through a packet-based physical network communications interface.

In another general aspect, the invention features a network communication unit that includes connection servicing logic responsive to transport-layer packet headers and operative to service virtual, error-free network connections, wherein the connection servicing logic includes a stream extension command input, and a parser responsive to the connection servicing circuitry and operative to parse information contained in transport-level packets received by the connection servicing logic for a single one of the connections, and wherein the parser includes function specific stream extension hardware including a stream extension command output operatively connected to the stream extension command input of the connection servicing logic.

In a further general aspect, the invention features a network communication unit that includes connection servicing logic responsive to transport-layer headers and operative to service virtual, error-free network connections, wherein the connection servicing logic includes a transport-level state machine substantially completely implemented with function-specific hardware, and application processing logic operatively connected to the connection servicing logic and operative to operate on application-level information received by the connection servicing logic. The application processing logic can include logic operative to cause the network communication unit to operate as a proxy between first and second nodes.

In another general aspect, the invention features a network communication unit that includes incoming connection servicing logic operative to service at least a first virtual, error-free network connection, outgoing connection servicing logic operative to service at least a second virtual, error-free network connection, and application processing logic operatively connected between the incoming connection servicing logic and the outgoing connection servicing logic and operative to transmit information over the second connection based on information received from the first connection, while maintaining different communication parameters on the first and second connections.

In preferred embodiments, the application processing logic can include packet consolidation logic operative to consolidate data into larger packets. The application processing logic can include dynamic adjustment logic operative to dynamically adjust parameters for at least one of the first and second connections.

In a further general aspect, the invention features a network communication unit that includes means for servicing at least a virtual, error-free incoming network connection, means for servicing at least a virtual, error-free outgoing network connection, and means responsive to the means for servicing an incoming connection and to the means for servicing an outgoing connection, for transmitting information over the outgoing connection based on information received from the incoming connection, while maintaining different communication parameters on the incoming connection and the outgoing connection.

In another general aspect, the invention features a network communication unit that includes connection servicing logic responsive to transport-layer headers and operative to service virtual, error-free network connections for a plurality of subscribers, application processing logic operatively connected to the connection servicing logic and operative to operate on application-level information received by the connection servicing logic, and virtualization logic operative to divide services provided by the connection servicing logic and/or the application processing logic among the plurality of subscribers.

In preferred embodiments, the virtualization logic is operative to prevent at least one of the subscribers from accessing information of at least one other subscriber. The virtualization logic can include subscriber identification tag management logic. The subscriber identification tag management logic can be operative to manage message and data structure tags within the network communication unit. The virtualization logic can include resource allocation logic operative to allocate resources within the network communication unit among the different subscribers. The virtualization logic can include quality-of-service allocation logic. The virtualization logic can include stream memory allocation logic. The virtualization logic can include session identifier allocation logic. The virtualization logic can be operative to allocate a minimum guaranteed resource allocation and a maximum not-to-exceed resource allocation on a per-subscriber basis.

In a further general aspect, the invention features a network communication unit that includes servicing means responsive to transport-layer headers for servicing virtual, error-free network connections for a plurality of subscribers, operating means responsive to the servicing means, for operating on application-level information received by the servicing means, and virtualization means for dividing services provided by the servicing means and/or the operating means among the plurality of subscribers.

In one more general aspect, the invention features a network communication unit that includes a cryptographic record parsing offload engine that has an input and an output. The unit also includes a processor that includes cryptographic handshake logic and has an input operatively connected to the output of the cryptographic record parsing offload engine.

In preferred embodiments, the cryptographic record parsing engine can be an SSL/TLS record parsing engine. The unit can further include message-length-detection logic operative to cause an amount of message data from a message corresponding to a message length obtained from a record to be stored even if the message is encoded in a plurality of different records. The message-length-detection logic can be operative to cause the amount of message data to be stored independent of any interactions with the processor. The unit can further include a handshake cryptographic acceleration engine operatively connected to a port of the processor. Operative connections between the processor and the cryptographic record parsing offload engine can be of a different type than are operative connections between the processor and the cryptographic acceleration engine. The unit can further include a bulk cryptographic acceleration engine operatively connected to a port of the processor, with the handshake cryptographic acceleration engine including handshake acceleration logic, and with the bulk cryptographic acceleration engine including encryption and decryption acceleration logic. The cryptographic record parsing engine can include validation logic operative to validate format information in cryptographic records received from the packet-based network communications interface. The validation logic can include type validation logic. The validation logic can include protocol version validation logic. The validation logic can be operative to invalidate cryptographic records independent of any interactions with the processor. The unit can further include function-specific, transport-layer communication hardware having an output operatively connected to the input of the cryptographic record parsing offload engine. The function-specific, transport-layer communication hardware can include a TCP/IP state machine. The unit can further include a packet-based physical network communications interface having an output operatively connected to the input of the cryptographic record parsing offload engine. The unit can further include interaction-defining logic operative to define different interactions between the connections interface, the cryptographic record parsing offload engine and other processing elements. The unit can further include decision logic operative to determine whether messages for particular packets should be routed through the cryptographic record parsing offload engine or whether they should bypass the cryptographic record parsing offload engine.

In another general aspect, the invention features a network communication unit that includes means for offloading cryptographic record parsing, and means for performing cryptographic handshake operations responsive to the means for offloading cryptographic record parsing.

In a further general aspect, the invention features a network communication unit that includes storage for a plurality of streams, queue creation logic operative to create a queue of streams stored in the storage, and stream processing logic responsive to the queue creation logic and to the storage and being operative to successively retrieve and process the streams.

In preferred embodiments, the stream processing logic can include transport-layer transmission logic and wherein the transport-layer transmission logic is responsive to the queue creation logic to successively retrieve and transmit the streams. The transport-layer transmission logic can include a TCP/IP state machine. The transport-layer transmission logic can include a transport-level state machine substantially completely implemented with function-specific hardware. The stream processing logic can include encryption logic, with the encryption logic being responsive to the queue creation logic to successively encrypt the streams. The encryption logic can be SSL/TLS encryption logic. The storage can include function-specific hardware operative to respond to access requests that include a stream identifier and a stream sequence identifier.

In another general aspect, the invention features a network communication unit that includes means for storing a plurality of streams, means for creating a queue of streams in the means for storing, and means for processing streams responsive to the queue creation logic and to the storage, for successively retrieving and processing the streams.

Systems according to the invention can be advantageous in that they operate on underlying objects, such as HTTP objects. This type of functionality has been difficult to implement with prior art packet-based server load balancing devices, in part because requests can span packet boundaries.

Systems according to the invention can also be advantageous in that they can allow users a high degree of versatility in performing operations on network traffic by allowing them to program a parser that operates on application-level information. And this functionality can be made available through a straightforward rule-based interface that can enable users to accurately target the information that they need to evaluate. They can then specify an action for that type of information that relates meaningfully to the targeted information. Rather than guessing where requests should be routed based on their IP addresses, for example, systems according to the invention can determine the exact nature of those requests and route each of them to the most appropriate server for those requests.

Systems according to this aspect of the invention can further be advantageous in that they can be reconfigured to accomplish different objectives. By allowing the interactions between elements to be changed, a single system can use elements to efficiently handle different types of tasks. And such systems can even be updated to perform new types of tasks, such as handling updated protocols or providing new processing functions.

Systems according to the invention can also carry out their operations in a highly efficient and highly parallelized manner. This performance can derive at least in part from the fact that particular elements of the system can be implemented using function-specific hardware. The result is a highly versatile system that can terminate a large number of connections at speeds that do not impede communication data rates.

Systems according to the invention can benefit from virtualization as well. By isolating resources by subscriber, these systems can prevent one subscriber from corrupting another's data. And by allocating resources among different subscribers or subscriber groups, they can provide for efficient utilization of resources among tasks that may have competing objectives.

DETAILED DESCRIPTION OF AN ILLUSTRATIVE EMBODIMENT

Figure 1:
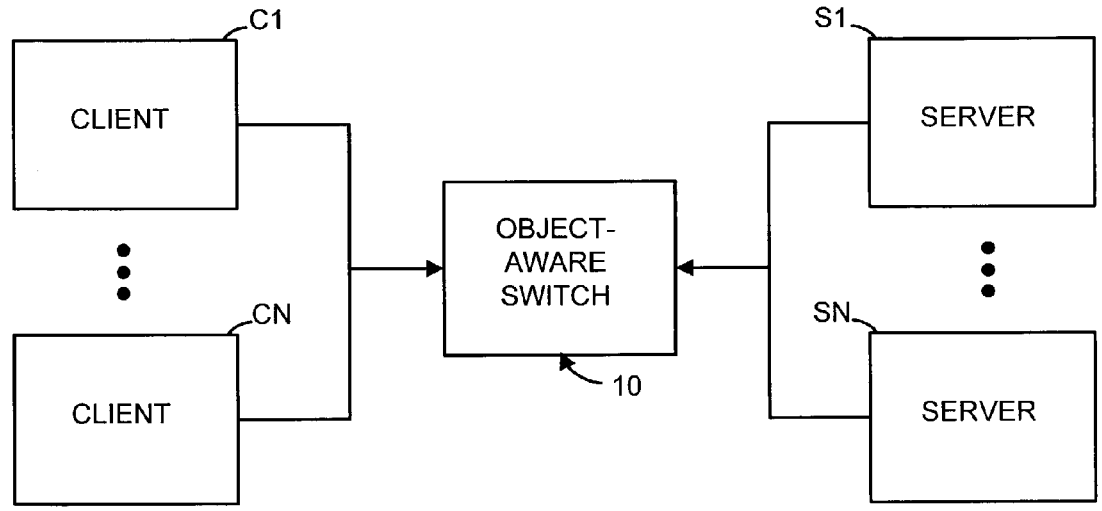
FIG. 1 is a block diagram of an illustrative network system employing an object-aware switch according to the invention.

Referring to FIG. 1, an illustrative networked system according to the invention includes an Object-Aware Switch (OAS) 10 to which one or more clients C1-CN are operatively connected via a transport-layer protocol, such as TCP. One or more servers S1-SN are also operatively connected to the OAS via a transport-layer protocol, which can also be TCP. Generally, the OAS terminates transport-level connections with the clients C1-CN, performs object-aware policy operations on packets received through these connections, and relays information resulting from these operations to new connections it establishes with one or more of the servers. In a typical installation, the clients are remote Internet users while the OAS and servers reside on a LAN that is isolated from the Internet by the OAS.

Figure 2:
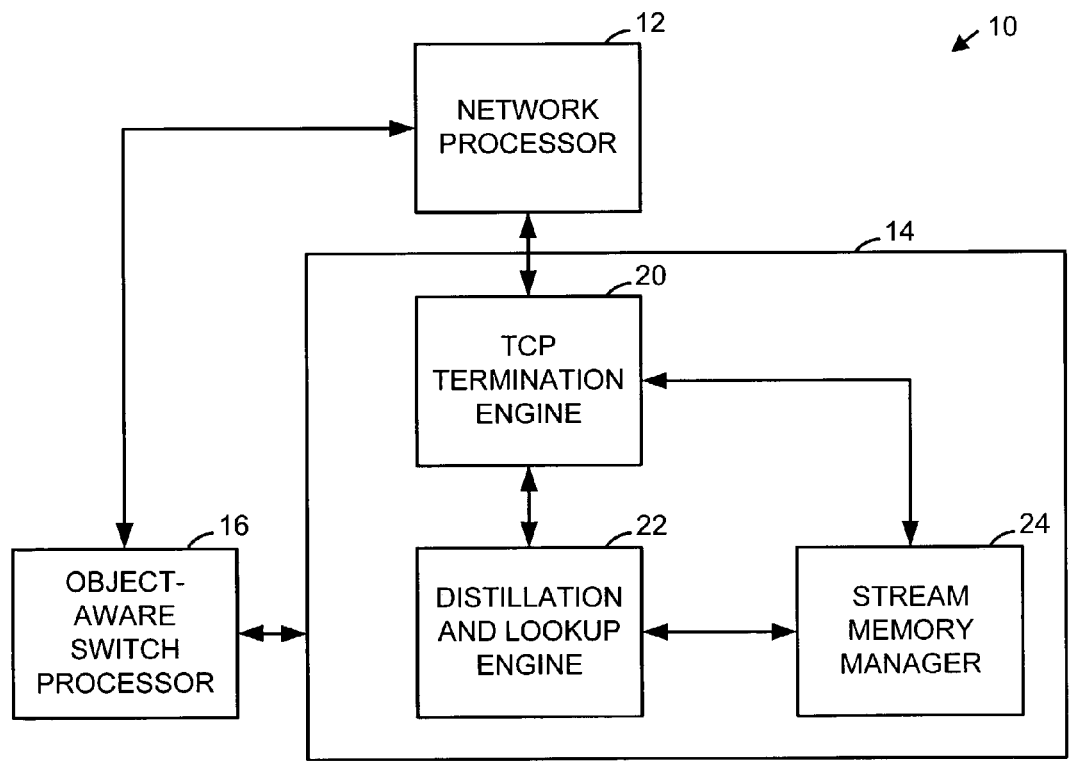
FIG. 2 is a block diagram of an illustrative object-aware switch according to the invention.

Referring to FIG. 2, an illustrative object-aware switch 10 according to the invention includes a Network Processor (NP) 12 that is operatively connected between a switching fabric and a transport-layer engine, such as a TCP engine 14, as well as to an Object-Aware Switch Processor (OASP) 16. The transport-layer engine 14 includes a transport-layer termination engine, such as a TCP Termination Engine (TTE) 20, which is operatively connected to a Distillation And Lookup Engine (DLE) 22, and a Stream Memory Manager (SMM) 24.

The TTE 20, SMM 22, DLE 24, and an optional SSL record processor (SRP) can each be integrated into one of a series of individual chips in a chip complex that can be implemented as a Field-Programmable Gate Array (FPGA) or an Application-Specific Integrated Circuit (ASIC), although these functions could also be further combined into a single chip, or implemented with other integrated circuit technologies. The OASP can be implemented as a process running on a general-purpose processor, such as an off-the-shelf PowerPC® IC, which can also run a number of other processes that assist in the operation of the chip. The OASP communicates with other parts of the OAS via the well-known PCI bus interface standard. The network processor 12 can be a commercially available network processor, such as IBM's Rainer network processor (e.g., NP4GS3). This processor receives and relays large-scale network traffic and relays a series of TCP packets to the TTE. The SMM is described in more detail in the above-referenced copending application entitled Stream Memory Manager.

Figure 3:
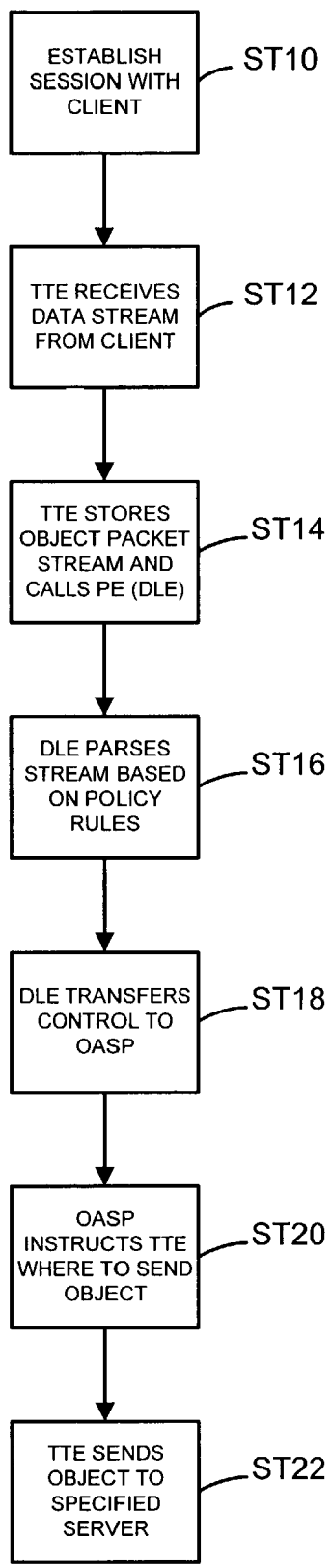
FIG. 3 is a flowchart presenting an illustrative series of operations performed by the object-aware switch of FIG. 2.

In a simple configuration, referring to FIGS. 1-3, the TTE 20 is responsible for responding to SYN packets and creating a session originating with one of the clients C1-CN, although the OASP can also instruct the TTE to initiate a session to a particular host (step ST10). The TTE then receives the data stream for the session (step ST12) and sends it to the SMM. When the stream has enough data in it, the TTE sends a message to the Parsing Entity (PE) responsible for the connection (step ST14). The parsing entity will generally be the DLE, but other entities can also perform this function. For example, part of a dedicated SSL processor can act as the parsing entity for SSL connections. The DLE then parses an underlying object from the data stream based on local policy rules, and transfers control to the OASP (step ST18). The OASP then identifies one of the destination servers S1-SN for the object (step ST20), the TTE creates a session with the identified destination server, and transfers the object to this server (ST22).

Because the TTE terminates connections, the OAS 10 is not confined simply to forwarding TCP frames, but can perform meaningful operations on underlying objects being transferred, such as HTTP requests. And since the OAS operates at the object level, it can implement a whole host of features that would be very difficult or impossible to implement using a session stitching model. Examples of functionality that the OAS can provide include TCP firewalling, TCP acceleration, and TCP-based congestion management.

TCP firewalls that are based on the OAS 10 can protect the servers S1-SN from a variety of TCP-based attacks. Because client sessions are terminated with the OAS, TCP SYN attacks and QoS attacks do not reach the server. And, although the OAS has to be protected against these attacks itself, this function can now be accomplished at a single point and thereby accomplished more easily. The OAS also includes an inherent Network Address Translation (NAT) capability that can further protect the servers by making them inaccessible, except through the OAS.

The OAS 10 can rate limit client requests headed for the servers. If a client is issuing HTTP requests at a rate exceeding a particular threshold, for example, these requests can be buffered within the OAS and then forwarded at a much slower rate to one or more of the servers. These thresholds can be configured using per-user policies, so that communities that are hidden behind a few IP addresses, such as AOL, can be given higher thresholds than individual addresses.

The OAS 10 is designed according to a configurable design philosophy, which allows the various elements of the OAS 10 to interoperate in a number of different ways with each other and with other elements. Configuration can be achieved by loading different firmware into various elements of the OAS and/or by loading configuration registers to define their behavior. Much of the configuration is performed for a particular application at startup, with some parameters being adjustable dynamically.

Using this configurable design approach, specialized functional modules can be implemented, with examples including a caching module, a security module, and a server load-balancing module. These modules can be the basis for a larger application switch that can perform object-aware switching. In one embodiment, this application switch is built into a rack-mountable housing that bears physical network connectors. A management port allows users to configure and monitor the switch via a command-line interface (CLI), a menu-based web interface, and/or Small Network Management Protocol (SNMP). A serial console port also allows users low level access to the command-line interface for remote maintenance and troubleshooting.

When the application switch includes a load-balancing functional module, it inspects inbound network packets and makes forwarding decisions based on embedded content (terminated TCP) or the TCP packet header (non-terminated TCP). It applies one or more object rules and policies (such as levels of service, HTTP headers, and cookies) and a load balancing algorithm before forwarding the packets to their Web server destinations. In one example, it can switch traffic between server groups using information passed in HTTP headers.

Figure 4:
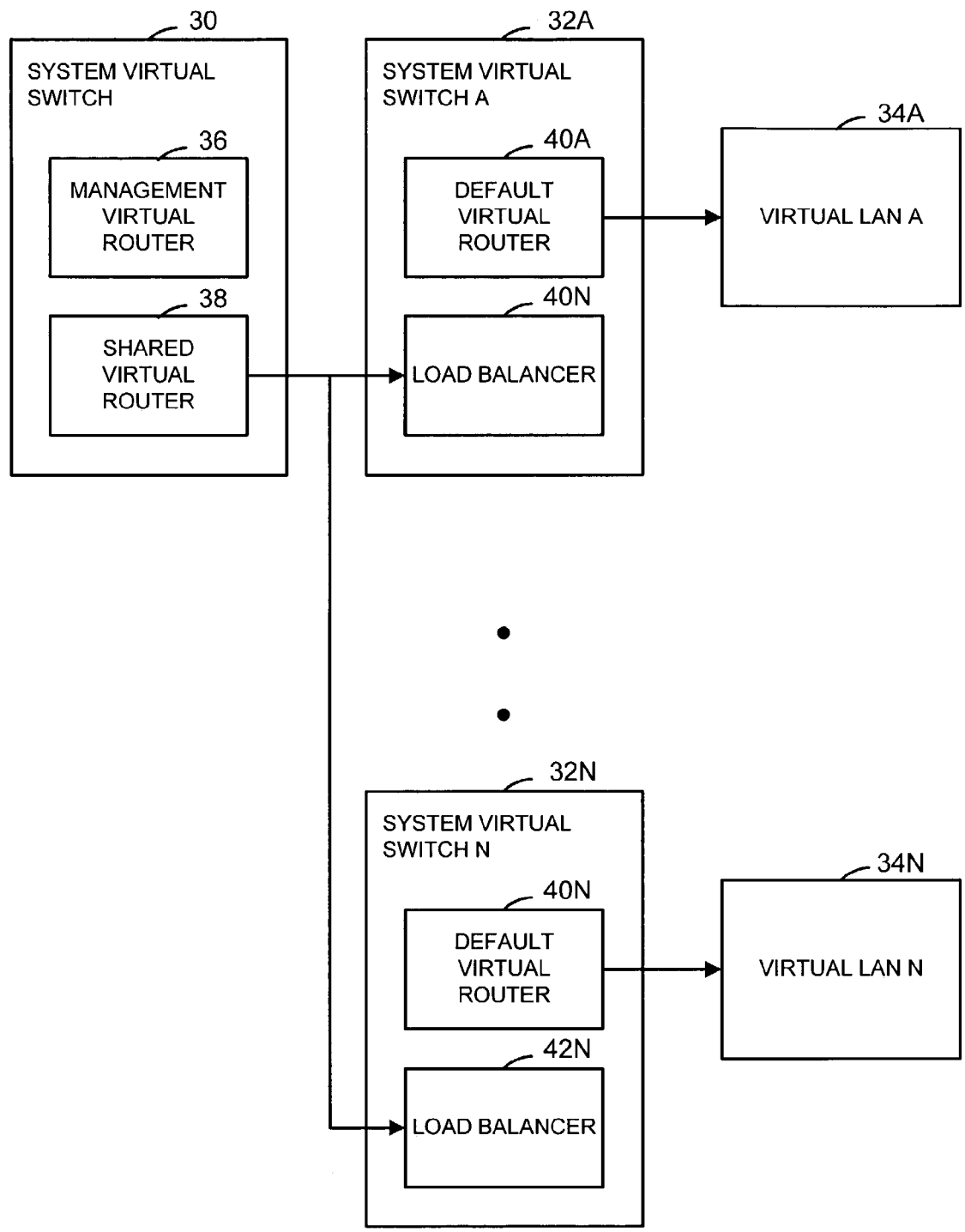
FIG. 4 is a block diagram of an illustrative set of virtual networks set up by an application switch employing an object-aware application switch according to the invention.

Referring to FIG. 4, the application switch uses virtualization to partition itself into multiple logical domains called virtual switches 30 32. Creating multiple virtual switches allows a data center to be partitioned among multiple customers based on the network services and the applications they are running. The application switch supports two types of virtual switches, a system virtual switch 30 and operator-defined virtual switches 32A . . . 32N. The operator-defined virtual switches can each receive predetermined resource allocations to be used for different subscribers, or categories of traffic, such as "e-commerce," "internet," "shopping cart," and "accounting."

The system virtual switch 30 provides the interface to Internet routers using one or more physical Ethernet ports and a virtual router 38 called shared. The shared virtual router supports the IP routing protocols running on the switch, and connects to the operator-defined virtual switches 32A . . . 32N. All physical Internet connections occur in the shared virtual router, which isolates virtual router routing tables and Ethernet ports from other operator-defined virtual switches.

For system management, the system virtual switch is also equipped with an independent virtual router called the management virtual router 36. The management virtual router uses a configured Ethernet port for dedicated local or remote system management traffic where it isolates management traffic from data traffic on the system, keeping all other Ethernet ports available for data connections to back-end servers.

As a separate virtual router, the management virtual router 36 runs the management protocols and the SNMP agent for local and remote configuration and monitoring using the CLI, Web interface, or third-party SNMP application. It supports SNMP, TFTP, Telnet, SSH, HTTP, syslogger, trapd, and NTP. In one embodiment, there can be up to five virtual routers, including the shared virtual router 38 and the management virtual router 36. Each virtual router can be assigned its own IP address.

An operator-defined virtual switch 32 is an independent and uniquely-named logical system supporting L2/L3 switching and IP routing, L4 to L7 load balancing, TCP traffic termination, and SSL acceleration. Creating an operator-defined virtual switch causes the system to create a single virtual router called default 40 for that virtual switch. The default virtual router can then switch traffic balanced by a load balancer 42 for that virtual switch between the backend Web servers, the shared virtual router on the system virtual switch, and the Internet clients that are requesting and accessing resources on the Web servers.

When it is equipped with encryption hardware, the application switch can use SSL to terminate and decrypt secure requests from Web clients. This allows the switch to offload the SSL processing responsibilities from the Web hosts, keeping the servers free for other processing tasks. The application switch can function as both an SSL client and an SSL server. As an SSL server, the application switch can terminate and decrypt client requests from browsers on the Internet, forwarding the traffic in the clear to the destination Web servers. Optionally, as an SSL client, the application switch can use SSL regeneration to re-encrypt the data en route to the backend Web servers.

The application switch can also perform server health checking, by monitoring the state of application servers in a real server group to ensure their availability for load balancing. If a server in the group goes down, the application switch can remove it from the load-balancing algorithm, and can dynamically adjust the load preferences. When the server becomes operational again, the application switch can place the server back into the load balancing algorithm. The application switch uses TCP, ICMP, or HTTP probes to monitor servers at set intervals using operator-defined settings in the configuration.

The application switch can also perform filtering with Access Control Lists (ACLs) to permit or deny inbound and outbound traffic on virtual router interfaces. An ACL consists of one or more rules that define a traffic profile. The application switch uses this profile to match traffic, permitting or denying traffic forwarding to resources on the back-end servers.

The following CLI configuration session shows the use of a sample ACL named ACL_1. This ACL contains one rule that blocks TCP traffic from the client at 192.67.48.10, TCP port 80 (for HTTP) to the default vRouter on one of the vSwitches.

accesslist ACL_1 rule 1 ruleAction deny ruleProto TCP ruleTcpSrcPort 80
        ruleSrcAddrs 192.67.43.10
        accessGroup vlan.10 in ACL_1

Note that direct L3 interfaces are supported without a virtual router, allowing an IP interface to be created directly on an Ethernet interface. Static or "reverse" NAT is also supported, allowing new outbound traffic initiated from a real Web server (such as email) to be mapped to an IP address that masks the real server IP addresses. L2 spanning trees are supported as well.

The virtual routers can also support Link Aggregation Groups (LAGs), as defined by the IEEE 803.2ad/D3.0 specification. LAGs allow multiple interfaces to be configured so that they appear as a single MAC (or logical interface) to upper layer network clients. A LAG provides increased network capacity by totaling the bandwidth of all ports defined by the LAG. The LAG carries traffic at the higher data rate because the traffic is distributed across the physical ports. Because a LAG consists of multiple ports, the software load balances inbound and outbound traffic across the LAG ports. If a port fails, the application switch reroutes the traffic to the other available ports.

The L4 to L7 load balancer application defines the relationship between virtual services and real services. The operator assigns each load balancer one or more virtual IP addresses, called VIPs, which are the addresses known to external networks. When the VIP receives a client request (such as an HTTP request), the load balancer forwards the traffic to the destination Web server using a load balancing algorithm (such as round robin) and Network Address Translation (NAT). When the server responds to the request, the application switch directs the traffic to the VIP for forwarding to the client.

The load balancer supports the following applications.
  Layer 4 Server Load Balancing (L4SLB): non-terminated TCP traffic load balancing based on IP source and destination address, L4 source and destination port, and a weighted hash algorithm.
  Layer 4 Server Load Balancing Advanced (L4SLB_ADV): terminated TCP traffic load balancing based on IP source and destination address, L4 source and destination port, and a selected algorithm: round robin, weighted hash, weighted random, source address, and least connections.
  Layer 4 Server Load Balancing with Secure Socket Layer (L4SLB_SSL)

HTTP and HTTPS object switching: load balancing in which object-aware switching and policy matching allow object switching rules that are used to inspect HTTP headers, cookies, URLs, or actual content. This type of load balancer can then make a decision to forward the traffic to the server group, or to take another action, such as redirect the request to another server, or reset the request if no object rule matches exist.

The procedure for setting up a load balancer begins with the operator defining the real services that are running on the servers. A real service, associated with a server, is identified by a real service name. The real service defines the expected type of inbound and outbound traffic processed by the host, defined by the IP address and application port. Real services have assigned weights when they participate in load balancing groups.

The operator then creates service groups for fulfilling Web service requests. A service group combines one or more real service definitions into a group. A service group assigns a particular load-balancing algorithm to the services in the group, along with other configurable characteristics.

Forwarding policies can then be defined to link object rules to service groups. A forwarding policy binds an object rule to a service group. An object rule with an action of forward, for example, must have an associated destination service group for the forwarded traffic. L4 server load balancing applications provide for configuration of a single, named forwarding policy with each service group. Forwarding and load balancing decisions are based on the service group configuration.

The operator can then configure the virtual services that link a VIP to a forwarding policy. The virtual service links a forwarding policy to the externally visible virtual IP address (VIP). When the VIP receives a client HTTP request, the virtual service uses the forwarding policy to identify the service group containing candidate servers for fulfilling a request. This can include an evaluation of the traffic against any L5 to L7 object rules and the configured forwarding policy. With L4 traffic and no object rules, the switch uses the service group configuration to make forwarding and load balancing decisions.

When a match is found, the request is forwarded to the service group and the traffic is load balanced across the real servers in the service group port. Real services have assigned weights when they participate in load balancing groups.

Although a wide variety of load-balancing algorithms could be readily supported, the application switch is initially configured to support the following algorithms for load balancing within a service group:
  Weighted hash
  Weighted random
  Round robin
  Source address
  Least connections For each weighted algorithm, the operator can assign static or dynamic weights using a load balancing metric.

The weighted hash algorithm attempts to distribute traffic evenly across a service group. The weighted hash algorithm uses the load balancing weight setting associated with each real server to see where it can distribute more or less traffic.

When configuring a real service and a load balancing weight, the operator should consider that server's ability to handle more or less traffic than other servers in the group. If a server is capable of handling more traffic, then set the real server weight to a higher numerical weight than those weights assigned to other servers in the group. An L4SLB network supports the weighted hash algorithm only.

The weighted random algorithm distributes traffic to Web servers randomly using weight settings. Servers with higher weights therefore receive more traffic than those configured with lower weight settings during the random selection.

The round-robin algorithm distributes traffic sequentially to the next real server in the service group. All servers are treated equally, regardless of the number of inbound connections or response time. The source address algorithm directs traffic to the specific servers based on statically assigned source IP addresses, and the least connections algorithm dynamically directs traffic to the server with the least number of active connections.

The service group definition also allows the operator to specify a load balancing metric to be used with a dynamic weight setting, as specified in the real service definition. The real service definition must be set to dynamic to use one of the supported dynamic metrics. If the real service definition contains a static numerical weight, then the load balancing metrics are ignored. The load balancing metrics for dynamic weight selection are: lowest latency, which computes the response time to and from a server and uses that value to determine which server to use, and least connections, which conducts polls to determine which server currently has the fewest number of active connections. The default metric is the lowest latency metric.

Setting up policy-based load balancing is similar to the other types of load balancing supported by the application switch, except that one or more object switching rules need to be specified. These rules can include one or more operator-defined expressions that compare an HTTP client request with a set of rules. When the switch inspects the traffic content against the rule(s), the switch can then make a decision to forward the traffic to the server group, or to take another action, such as redirect the request to another server, or reset the request if no object rule matches exist. Note that while the application switch is presented in connection with HTTP services, it could also be configured to perform object-based switching operations on other types of traffic.

An object rule is a set of one or more text expressions that compare object data and configuration data to determine a match and a resulting action. If an inbound HTTP request matches a configured object rule, the associated service group executes a specific action, such as forward, retry, or redirect. An object, as specified in the application switch object rules, is a message with a defined start and end point within an application protocol stream layered over TCP, such as an HTTP request (client to server) or an HTTP response (server to client).

The load balancer uses one or more expressions to match inbound traffic. As the load balancer receives requests from the client, it attempts to match expressions in its object rules against the HTTP request. The result of the comparison is either true (matches) or false (does not match).

If the application switch is able to match an HTTP request, an action is taken. If the rule does not match, the switch moves to the next rule in order of precedence until a match is found or until the switch evaluates all rules. If the switch cannot determine a match, or if there are no remaining rules, the switch drops the request and sends a warning stating that no policy matches were found. The syntax of an object rule uses the following CLI format:

objectRule <objectRule_name> predicate {URI field_name: <operator> [integer|string|keyword]} action [forward|redirect|reset]

where <objectRule_name> is any unique alphanumeric name with no blank spaces.

A sample configuration session will now be presented. This sample configuration session creates an object rule that allows inbound HTTP requests to the e-commerce images server group to be load balanced and forwarded to the appropriate image servers, and creates a second object rule that forwards all remaining HTTP requests to the default servers. This example uses the object rule names matchImages and matchAll, followed by a predicated field name statement, followed by an action to be taken if the traffic is matched against an object rule. The example begins with the operator specifying the two following object rules to the CLI:

objectRule matchImages predicate {URI_PATH matches "/images/*"} action forward
objectRule matchAll predicate {URI_PATH matches "*"} action forward The operator then uses the host command to create three hosts that map the user-specified names host_1, host_2, and host_3 to corresponding server IP addresses. The application switch stores the created hosts in a host table.

host host_1 10.10.50.2
host host_2 10.10.50.3
host host_3 10.10.50.4

The operator then uses the real service command to create three real services which each binds a named host and port to a named service. There can be up to 512 real services per service group (up to 1024 per virtual switch), and there can be multiple ports on each host.

realService rs1 host_1 tcp 80 1
realService rs2 host_2 tcp 80 1
realService rs3 host_3 tcp 80 1

The operator then uses the service group command to create two service groups, imageServers and defaultServers, and assigns the real services created with the realService command to those groups. The service group command also assigns the service groups to the round-robin load balancing algorithm.

serviceGroup imageServers roundrobin {rs1 rs2}
serviceGroup defaultServers roundRobin rs3

The operator then uses the forwarding policy command to bind the service groups defined with the service group command with the object rules defined with the object rule command.

forwardingPolicy imageForward imageServers matchImages 1
forwardingPolicy defaultForward defaultServers matchAll 5

This binding provides a destination for forwarded traffic where the object rules have an associated an action of forward. If the object rule's action is reset or redirect, there is no associated service group. Each service group can only be associated with a single forwarding policy.

The forwarding policy command also assigns a precedence to an object rule, which defines the order in which rules are evaluated. Each forwarding policy names a service group and binds a rule and precedence to it. Each forwarding policy only has a single rule, but each virtual service can have multiple forwarding policies. The policy with the lowest precedence is evaluated first.

Where rules are used, it can be important to define a default object rule with a low precedence in a forwarding policy for a service group. If a service group has no object rule is associated, a reset is sent back to the client.

With the forwarding policies bound to service groups, the operator can associate these policies with a virtual service using the virtual service command.

Virtual Service e-commerceNet 10.10.50.11 HTTP forwardingPolicyList "imageForward defaultForward"

The virtual service command specifies a name for the virtual service (e-commerceNet), a virtual IP address (10.10.50.11) for the load balancer, a type of load balancing (HTTP), and a optional forwarding policy list (forwardingPolicyList). The VIP is the address to which DNS resolves URIs. Essentially, it is the address of the load balancer, and masks the individual addresses of the servers behind it. Network address translation (NAT) converts, on the outbound transmission, the server's IP address in response headers to the VIP when responding to the client.

The virtual service command configures the client side of the configuration for the server load balancer. When a request is received from the client, the virtual service evaluates it against the object rules listed in the forwarding policies associated with this command. When a match is found, that forwarding policy has a service group associated with the object rule, and the request can be forwarded to that service group. The system then load balances across the real servers in that service group.

This example has illustrated the creation of a first forwarding policy that associates the first object rule (matchImages) in the object rule set to the imageServers service group. A precedence of 1 indicates that this object rule is first in a series of potential object rule definitions to be evaluated in the rule set. The second forwarding policy sends all other matched traffic to the defaultServers service group with a precedence of 5, and is an example of a default rule. The virtual service configuration specifies the VIP (10.10.50.11), the forwarding policy list (imageForward and defaultForward), and the application service type (HTTP). Table 1 lists the HTTP request and HTTP response header field names that can be supplied with an object rule, along with one or more object rule command examples.

TABLE 1

| Field Name | Description |
| --- | --- |
| ACCEPT | HTTP Request header; client specifies the content type it can accept in the message body of the HTTP response.<br>Type: string<br>Example:<br>objectRule OR1 predicate {ACCEPT matches "*/*"} action forward<br>Result: Client accepts any content.<br>Example:<br>objectRule OR1 predicate {ACCEPT matches "text/*"} action forward<br>Result: Client accepts any text content. |
| ACCEPT_ LANGUAGE | HTTP Request header; client specifies the preferred language to be supplied in the HTTP response. The first two letters are the ISO 639 language designation; the second two letters are the ISO 3166 country code.<br>Type: string<br>Example:<br>objectRule OR1 predicate<br>{ACCEPT_LANGUAGE eq "ja-jp"} action forward<br>Result: Client accepts the Japanese language in the server's HTTP response. |
| ACCEPT_ ESI (Edge Side Includes) | HTTP Request header; client specifies an Akamai-sourced HTTP request.<br>Type: string<br>Example:<br>objectRule OR1 predicate {ACCEPT_ESI present} action forward<br>Result: If present or matched, the HTTP server takes the specified action (forward, reset, redirect) on the Akamai-sourced request. |

TABLE 1-continued

| Field Name | Description |
| --- | --- |
| CON- NECTION | General; supports persistent and non-persistent connections.<br>CONNECTION informs the client that the server will close a connection after sending a response, or if it will keep the connection persistent.<br>Type: keyword (See Table 6-4)<br>Example:<br>objectRule OR1 predicate {CONNECTION is close}<br>Result: Client is informed that the server will close the connection after sending a response.<br>Example:<br>objectRule OR1 predicate<br>{CONNECTION is keep-alive} action forward<br>Result: Client is informed that the server will keep a persistent connection with the client after the server sends a response. |
| CONTENT_ LENGTH | Entity; performs the specified action based on the size of the message body in bytes.<br>Type: integer<br>Example:<br>objectRule OR1 predicate<br>(CONTENT_LENGTH < 40000} action forward<br>Note: Valid with HTTP Method of POST.<br>See METHOD. |
| COOKIE | HTTP Request; client includes any preferred cookies that it has received from a server (Set-Cookie in an HTTP response) in subsequent requests to that server using the cookie header.<br>Type: string<br>Example:<br>objectRule OR1 predicate<br>(COOKIE eq "session-id = 105"} action forward<br>Result: The client HTTP request uses the cookie to open a specific URL with each request to that server. |
| HOST | HTTP Request; client includes the host URL of the Web server.<br>Type: string<br>Example:<br>objectRule OR1 predicate<br>{HOST eq "www.e-commerce.com"} action forward<br>Result: The client HTTP request is directed to the specified host URL.<br>Note: Derived from HOST_HEADER or URI_HOST. If the HOST field name is specified, the switch first checks for the URI_HOST field definition. If URI_HOST does not exist, then the switch checks for the HOST_HEADER field. |
| HOST_ HEADER | HTTP Request; client includes the host URL of the Web server.<br>Type: string<br>Example:<br>objectRule OR1 predicate {HOST HEADER eq "www.e-commerce.com"} action forward<br>Result: The client HTTP request is directed to the specified host URL. |
| HOST_ HEADER_ PORT | HTTP Request; client includes the TCP port that the Web sever application protocols should use. TCP Port 80 is the expected port for HTTP requests.<br>Type: integer<br>Example:<br>objectRule OR1 predicate<br>{HOST_HEADER_PORT == 80} action forward |
| REFERER | HTTP Request (optional); client specifies where it got the URL specified in the HTTP request. Web sites that provide links to other sites are the "referal" sites.<br>Type: string<br>Example:<br>objectRule OR1 predicate {REFERER eq "www.e-commerce.com/default/relatedlinks"} action forward |

TABLE 1-continued

| Field Name | Description |
|---|---|
| TRANSFER_ ENCODING | General; indicates the transfer encoding format applied to the HTTP message body.<br>Type: keyword (See Table 6-4)<br>Example:<br>objectRule OR1 predicate<br>{TRANSFER_ENCODING is chunked} action forward<br>Chunked encoding breaks up the message body into chunks to improve Web server performance. The server begins sending the response as soon as it begins composing the response. The last chunk has a size of 0 bytes.<br>Example:<br>objectRule OR1 predicate<br>{TRANSFER_ENCODING is gzip} action forward<br>The gzip keyword compresses the message body and reduces transmission time. |
| METHOD | HTTP Request; client specifies the method to be performed on the object identified by the URL. The METHOD is the first field name in the HTTP request line.<br>Type: keyword (See Table 6-4)<br>Example:<br>objectRule OR1 predicate {METHOD is GET} action forward<br>Result: The client HTTP GET request is directed to the specified host URL.<br>Methods: GET (required), HEAD (required), POST, PUT, DELETE (not allowed on servers), CONNECT, TRACE, OPTIONS |
| HTTP_ VERSION | HTTP Request; specifies the HTTP protocol version that the client is able to support. The HTTP_VERSION follows the URI field name in the HTTP request line.<br>Type: string<br>Sample HTTP request line: GET/HTTP/1.1<br>Example:<br>objectRule OR1 predicate<br>{HTTP_VERSION eq "HTTP/1.1"}<br>action forward |
| PORT | HTTP Request; client includes the TCP port that the Web sever application protocols should use. TCP Port 80 is the expected port for HTTP requests.<br>Type: integer<br>Example:<br>objectRule OR1 predicate {PORT == 80} action forward<br>Note: Derived from HOST_HEADER_PORT or URI_PORT. If the PORT field name is specified, the switch first checks for the URI_PORT field definition. If URI_PORT does not exist, then the switch checks for the HOST_HEADER_PORT field. |
| UPGRADE | General; client requests and negotiates an HTTP protocol upgrade with the server.<br>Type: string<br>Example:<br>objectRule OR1 predicate {UPGRADE eq "HTTP/1.1"} action forward<br>Result: The server responds with a 101 Switching Protocols status and a list of protocols in the upgrade header. Both the HTTP Request and HTTP Response display the Connection: Upgrade header.<br>For example:<br>HTTP/1.1 101 Switching Protocols<br>Upgrade: HTTP/1.1<br>Connection: Upgrade |
| RESPONSE_ VERSION | HTTP Response; specifies the highest HTTP version supported by the server that is transmitted back to the client. The RESPONSE_VERSION is the first field in the HTTP status line.<br>Type: string<br>Example:<br>objectRule OR1 predicate {RESPONSE_VERSION matches "HTTP/1.1"} action forward |
| RESPONSE_ CODE | HTTP Response; response status codes returned to client Used only with httpInBand forwarding actions (see Table 6-5).<br>Type: integer<br>Example:<br>objectRule OR1 predicate<br>{URI_SUFFIX eq "org"} action forward<br>httpInBandEnable true httpInBandFailoverCheck<br>{RESPONSE_CODE != 404} sorryServiceType page sorryString "/ft0/sorrypage.html"<br>In this example, if a backend server returns a response code not equal to 404 (NOT FOUND), the switch attempts a retry to the backend server. If the retry fails, the sorryServices Web page is returned to the client.<br>Status codes:<br><br>100-199: Informational; final result not available<br>200-299: Success; the HTTP request was successful<br>300-399: Redirection; the client should redirect the HTTP request to a different server<br>400-499: Client error; the HTTP request contained an error and the server was unable to complete the request<br>500-599: Server error; the server failed to act on the HTTP request, even if the request was valid. |

Uniform Resource Identifiers (URIs) have the structure presented in Table 2 for the following illustrative URI.

HTTP://www.e-commerce.com:80/images/file1.jpg?instructions.

TABLE 2

| Field Name | Example field |
|---|---|
| URI_SCHEME | HTTP: |
| URI_HOST | www.e-commerce.com |
| URI_PORT | 80 |
| URI_PATH | /images/ |
| URI_ALLFILE | file1.jpg |
| URI_BASENAME | file1 |
| URI_SUFFIX | jpg |
| URI_QUERY | ?instructions |

Table 3 lists URI field names supported by the application switch with one or more object rule examples.

TABLE 3

| Field name | Description |
|---|---|
| URI | HTTP Request; specifies the complete Uniform Resource Identifier (URI) string to the Web server resource.<br>Type: string<br>Example:<br>objectRule OR1 predicate {URI eq "http://www.e-commerce.com:80/images/file.jpg?instructions"} |
| URI_ SCHEME | Within URI; identifies the application protocol (HTTP) used to access the Web server(s).<br>Type: string<br>Example:<br>objectRule OR1 predicate {URI_SCHEME ne "http"} action reset<br>Result: If the URI_SCHEME is not equal to HTTP, the connection to the Web server is reset. |
| URI_HOST | Within URI; client specifies the host URL of the Web server.<br>Type: string<br>Example:<br>objectRule OR1 predicate {URI_HOST eq "www.e-commerce.com"} |

TABLE 3-continued

| Field name | Description |
|---|---|
| URI_PORT | Within URI; client includes the TCP port that the Web sever application protocols should use. TCP Port 80 is the expected port for HTTP requests.<br>Type: integer<br>Example:<br>objectRule OR1 predicate {URI_PORT != 80}<br>Result: If the URI_PORT is not equal to 80, the connection to the Web server is reset. |
| URI_PATH | Within URI; client specifies the directory path to a resource on the Web server.<br>Type: string<br>Example:<br>objectRule OR1 predicate<br>{URI_PATH matches"/images/*"} |
| URI_ALLFILE | Within URI; client specifies the complete resource (basename and suffix) to access on the Web server.<br>Type: string<br>Example:<br>objectRule OR1 predicate<br>{URI_ALLFILE eq "file1.jpg"} |
| URI_BASENAME | Within URI; client specifies the basename resource to access on the Web server.<br>The suffix is not specified.<br>Type: string<br>Example:<br>objectRule OR1 predicate<br>{URI_BASENAME matches "file1"} |
| URI_SUFFIX | Within URI; client specifies the resource suffix or file extension.<br>Type: string<br>Example:<br>objectRule OR1 predicate<br>{URI_SUFFIX matches "jpg"} |
| URI_QUERY | Within URI: client specifies or requests additional information from the server.<br>Type: string<br>Example:<br>objectRule OR1 predicate<br>{URI_QUERY eq "instructions"} |

Table 4 lists and describes the operators associated with object rule predicate statements. Within a predicate statement, operators determine how text strings and integers perform with specified action (forward, redirect, reset).

TABLE 4

| Operator | Purpose | Example |
|---|---|---|
| { } braces | Encloses a predicate statement created in the CLI.<br>(Not used in the Web Interface). | objectRule OR1 predicate {URI_QUERY matches "information*"} |
| " " quotes | Encloses text strings | objectRule OR1 predicate {URI_SUFFIX matches "jpg"} |
| eq | Equal to (string) | objectRule OR1 predicate {HTTP_VERSION eq "HTTP/1.1"} |
| == | Equal to (integer) | objectRule OR1 predicate {URI_PORT == 80} |
| ne | Not equal to (string) | objectRule OR1 predicate {URI_SCHEME ne "http"} action reset |
| != | Not equal to (integer) | objectRule OR1 predicate {URI_PORT != 80} action reset |
| lt | Less than (string) | objectRule OR1 predicate {ACCEPT lt "200"} action forward |
| < | Less than (integer) | objectRule OR1 predicate {CONTENT-LENGTH < 40000} action forward |
| gt | Greater than (string) | objectRule OR1 predicate {ACCEPT gt "100"} |
| > | Greater than (integer) | objectRule OR1 predicate (CONTENT-LENGTH > 40000} |
| le | Less than or equal to (string) | objectRule OR1 predicate {ACCEPT le "350"} |
| <= | Less than or equal to (integer) | objectRule OR1 predicate {CONTENT-LENGTH <= 40000} |
| ge | Greater than or equal to (string) | objectRule OR1 predicate (ACCEPT ge "350"} |
| >= | Greater than or equal to (integer) | objectRule OR1 predicate {CONTENT-LENGTH >= 40000} |
| ( ) grouping in parentheses | Encloses a predicate statement when multiple operators (such as "and", "or") are used within an object rule. | objectRule OR1 predicate {(CONTENT-LENGTH > 500) or (CONTENT-LENGTH == 500)} action forward |
| not | not operator | objectRule OR1 predicate {URI_SCHEME != "HTTP")} action forward |
| ! | See != in this table | |
| and | and operator | objectRule OR1 predicate {(METHOD is GET) and (URI matches "http://www.e-commerce.com:80/images/*")} action forward |
| && | Same as and | objectRule OR1 predicate {METHOD is GET} && {URI matches "http://www.e-commerce.com:80/images/*"} action forward |
| or | or | objectRule OR1 predicate {(METHOD is GET) or (METHOD is HEAD)} action forward |
| \|\| | Same as or | objectRule OR1 predicate {(METHOD is GET) \|\| (METHOD is HEAD)} action forward |
| and or | Combination of AND and OR in a single predicate statement | objectRule OR1 predicate {(METHOD is GET) or (METHOD is HEAD) and (URI_PATH matches "/images/*")} action forward |
| matches match | String matching | objectRule OR1 predicate {USER_AGENT matches "*Mozilla/4.0*"} action forward |
| contains contain | Keyword matching | objectRule OR1 predicate {METHOD contains HOST} action forward |
| is | Keyword matching | objectRule OR1 predicate {TRANSFER_ENCODING is chunked} action forward |
| has | String matching | objectRule OR1 predicate {HTTP_VERSION has "HTTP/1.1"} action forward |
| Present | String matching | objectRule OR1 predicate {ACCEPT_ESI present} action forward |

Table 5 lists and describes the keywords associated the specific object rule predicate statements, METHOD, CONNECTION, and TRANSFER-ENCODING.

TABLE 5

| Keyword | Used with; Description | Example |
|---|---|---|
| GET | METHOD; The client requests a specific resource from the server.<br>Sample request:<br>GET http://www.e-commerce.com/images/file1.jpg | objectRule OR1 predicate {METHOD is GET} action forward |

TABLE 5-continued

| Keyword | Used with; Description | Example |
|---|---|---|
| HEAD | METHOD; The client requests that the server not include the resource in the response. Sample request: HEAD http://www.e-commerce.com/images/file1.jpg | objectRule OR1 predicate {METHOD is HEAD} action forward |
| OPTIONS | METHOD; The client requests the server to provide the options it supports for the indicated response. Sample request: OPTIONS http://www.e-commerce.com/images/file1.jpg | objectRule OR1 predicate {METHOD is OPTIONS} action forward |
| POST | METHOD; The client requests the server to pass the message body to the indicated resource. Sample request: POST http://www.e-commerce.com/cgi-bin/file.cgi HTTP/1.1 | objectRule OR1 predicate {METHOD is POST} action forward |
| PUT | METHOD; The client requests the server to accept the message body as the resource. Sample request: PUT http://www.e-commerce.com/images/file2.jpg | objectRule OR1 predicate {METHOD is PUT} action redirect<br><br>Result: Client request is directed to another server. |
| DELETE | METHOD; The client requests the server to delete the indicated resource.<br><br>Sample request: DELETE http://www.e-commerce.com/images/file1.jpg | objectRule OR1 predicate {METHOD is DELETE} action forward sorryServiceType page "/ft10/sorryPage.htm"<br><br>Result: Client is forbidden from deleting the file specified in the request. |
| TRACE | METHOD; The client requests the server to acknowledge the request only. Sample request: TRACE http://www.e-commerce.com | objectRule OR1 predicate {METHOD is TRACE} action forward |
| CON-NECT | METHOD; The client requests the server to establish a tunnel.<br><br>Sample request: CONNECT http://www.e-commerce.com/home.htm | objectRule OR1 predicate {METHOD is CONNECT} action forward |
| keep-alive | CONNECTION; The client is informed that the server will keep a persistent connection with the client after sending a response. | objectRule OR1 predicate {CONNECTION is keep-alive} action forward |
| close | CONNECTION; The client is informed that the server will close the connection after sending a response. | objectRule OR1 predicate {CONNECTION is close) action forward |
| chunked | TRANSFER-ENCODING; Chunked encoding breaks up the message body into chucks to improve Web server performance. The server begins sending the response as soon as it begins composing the response. The last chuck has a size of 0 bytes. | objectRule OR1 predicate {TRANSFER_EN-CODING is chunked} action forward |
| gzip | TRANSFER-ENCODING; The gzip keyword compresses the message body and reduces transmission time. | objectRule OR1 predicate {TRANSFER_EN-CODING is gzip} action forward |

An object rule requires one of the following actions after the predicate statement: forward, redirect, or reset. The forward action passes the HTTP request to the server, and is the default action if no other action is specified in the object rule. Table 6 lists and describes the options that can refine how the traffic is forwarded.

TABLE 6

| Forwarding option | Description |
|---|---|
| CookiePersist | Specifies the name of the cookie to be inserted into forwarded packets, from the cookie persistence table. If this field is not set, session persistence, as implemented by the application switch, is disabled. The parameters of the cookie are configured with the cookiePersistence command. |
| RetryCount | Specifies the number of attempts the switch should make to connect to a different real service (server) within the same service group before failover. If a connection is not made after the specified number of retries, the system takes the action specified with the sorryServiceType argument. The default number of retries is 1. |
| httpInBandEnable | Enables in-band HTTP-aware health checking. The default setting is false, disabling inbound health checking. |
| httpInBandFailoverCheck | Assert health failure when true. |
| sorryServiceType | Specifies the action to take when the system has exceeded the number of retries allowed for connection to a different real service within a service group. Possible actions are: page: Returns an HTML page to the client. The page returned is specified with the sorryString argument. close: Gracefully ends the TCP connection to the client. It sends an HTTP 500 Internal Error status code and closes the connection using a 4-way handshake and FIN instead of a reset. redirect: Returns an HTTP 302 redirect response to the client, redirecting the request to a different URI. The target of the redirection is set with the sorryString argument. The default action is reset. |
| SorryString | Specifies information to return to the client, depending on the configured sorryServiceType. If sorryServiceType is page, enter an HTML fully qualified path name. If sorryServiceType is redirect, enter a valid URI. |
| firstObjectSwitching | Sets the method of load balance processing of client requests in a single TCP session. When disabled, the system makes a load balancing decision on each client request. If the request results in a different service group assignment, the system initiates a new TCP session. When enabled, all requests in a single TCP session are sent to the same real service. This lessens the granularity of the load balancing function, but can speed processing by simplifying load balancing decisions. The default setting is disabled. |

The redirect action specifies the URI string to which a client request is redirected. A redirect action is not associated with a service group definition. The following object rule, for example, forwards a client request for contact information to the e-commerce home page.

objectRule rule1 predicate {URI_QUERY eq "contact information"}action redirect redirectString http://www.e-commerce.com/default/contact.htm/

A reset action forces the switch to return a TCP RESET response back to the client, closing the connection. The following object rule, for example, resets the client request to run an executable file from the e-commerce Web site, with a client request of HTTP://www.e-commerce.com/cgi/file.exe.

objectRule rule2 predicate {URI_SUFFIX eq "exe"} action reset

The application switch also provides cookie persistence functions. A cookie is a mechanism that a Web server uses to keep track of client requests (usually Web pages visited by the client). When a client accesses a Web site, the Web server returns a cookie to the client in the HTTP response. Subsequent client requests to that server may include the cookie, which identifies the client to the server, and can thereby eliminate repeated logins, user identification, as well as information already provided by the client. Cookies can also maintain persistent (or "sticky") sessions between an HTTP client and server.

A common cookie application is the e-commerce shopping cart. As users shop and add items to the cart, they can choose to continue shopping and view additional Web pages for items they may wish to purchase before returning to the shopping cart to check out. Cookies keep the connection persistent until the client chooses to end the session by checking out, supplying payment information, and receiving payment confirmation from the e-commerce Web site.

The application switch uses a switched managed cookie mode (also know as cookie-insert) in load balancing. In this mode, the system makes a load balancing decision, forwards the request to the service, and creates and inserts the cookie in the server's response packet. In subsequent client requests, the system deciphers the cookie and selects the same real service for forwarding.

The cookie persistence command and the object rule command are used to define the cookie persistence rule for a session. The cookie persistence command defines the cookie, and the object rule command assigns a named cookie to an object rule. The cookie persistence command has the following syntax.

[no] vSwitch-name loadBalance cookiePersistence name text
 [cookieName text]
 [cookieDomain text]
 [cookiePath text]
 [cookieExpires text]

Upon the creation of a real service, the system generates a unique, 32-bit hash key based on the real service name. This key is inserted in the cookieName field, and used to identify the client session. If cookieDomain and cookiepath fields are specified, they are concatenated with cookieName to produce the actual string that is inserted in the packet header. Session persistence, as provided by the application switch, is only enabled if the cookiePersistence field in the object rule command is set, although there may be other cookie fields in the HTTP header that were inserted by the client.

A named cookie persistence rule describes the elements that the load balancer uses to create a cookie. These elements are:
 cookieName
 cookieDomain (optional)
 cookiepath (optional)
 cookieExpires (optional)
 lookInURL (optional)

The cookieName is the actual string that the load balancer inserts into the HTTP response packet header. The load balancer inserts the hash key in the cookieName field to identify the client session, in the format: cookieNamecookieDomaincookiePath where the entire string becomes the cookie persistence rule for forwarding traffic to a real server.

The default cookieName is nnSessionID and the value is a hexadecimal number (e.g., Set-Cookie: nnSessionID= 0x123456F). The cookieDomain and cookiePath values are optional. If specified, the load balancer adds these fields to the cookieName to produce the full cookie string. The cookieDomain is an optional string for matching a fully qualified domain name (FQDN). If no cookieDomain is specified, the load balancer inserts the host name of the server that generated the cookie.

The cookie Path is an optional string for matching a URL path. If no path is specified, the load balancer inserts the path of the header in the URL request.

The cookieexpires string specifies the date and time when a cookie expires. If expired, the client no longer includes the cookie during subsequent requests to the server that originated the cookie. If no cookieExpires string is specified, the cookie expires when the client terminates the session.

The lookInUrl setting (true or false) tells the load balancer to decipher the cookie from the client request URL. The default setting is false.

In one embodiment, each virtualService definition supports up to six unique cookie persistence definitions. Each unique cookie persistence rule name counts as one of the six cookies in the virtualService. Each cookie persistence rule that has a unique cookieName counts as one of the six cookies in the virtualService. If more than one object rule/forwarding policy combinations uses cookie persistence, then the cookieName needs to be unique for each cookie persistence rule, or the cookiePath field in the cookie persistence rule entry must be present and unique, and requests to the forwardingPolicy must only come from that path.

The functionality and operator configuration of the application switch have now been discussed in some detail for load balancing. The approaches presented above can also be applied to the use of other functional modules, such as cache or firewall modules in which actions can be taken based on transport-layer stream contents. And the application switch can manipulate cookies in ways that extend beyond persistence. It will therefore be apparent that rules can be developed to use object-aware switching to achieve a broad range of network functionality.

Figure 5:
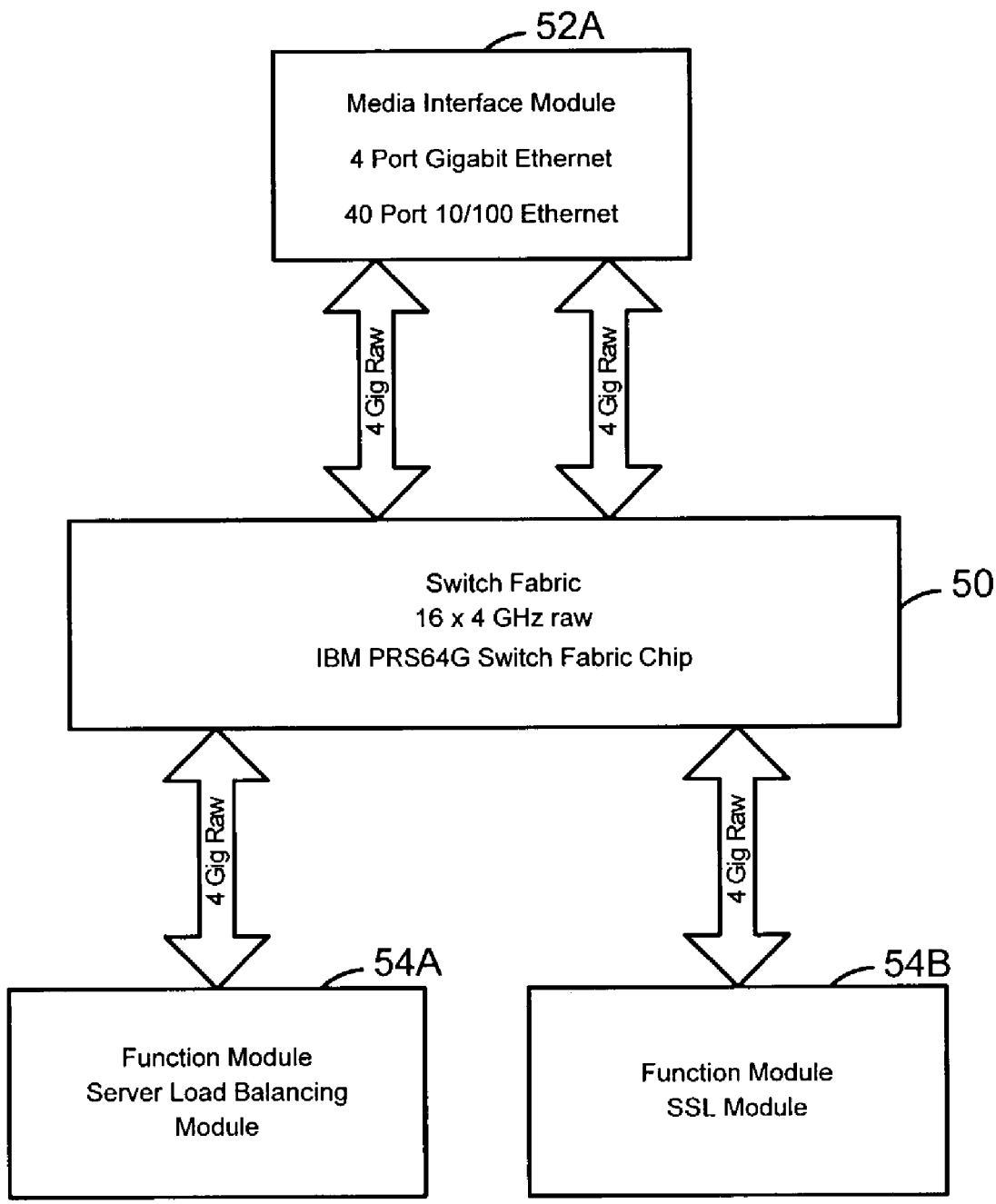
FIG. 5 is a block diagram of an object-aware application switch that employs one or more object-aware switches according to the invention, and can set up the set of virtual networks shown in FIG. 4.
Figure 6:
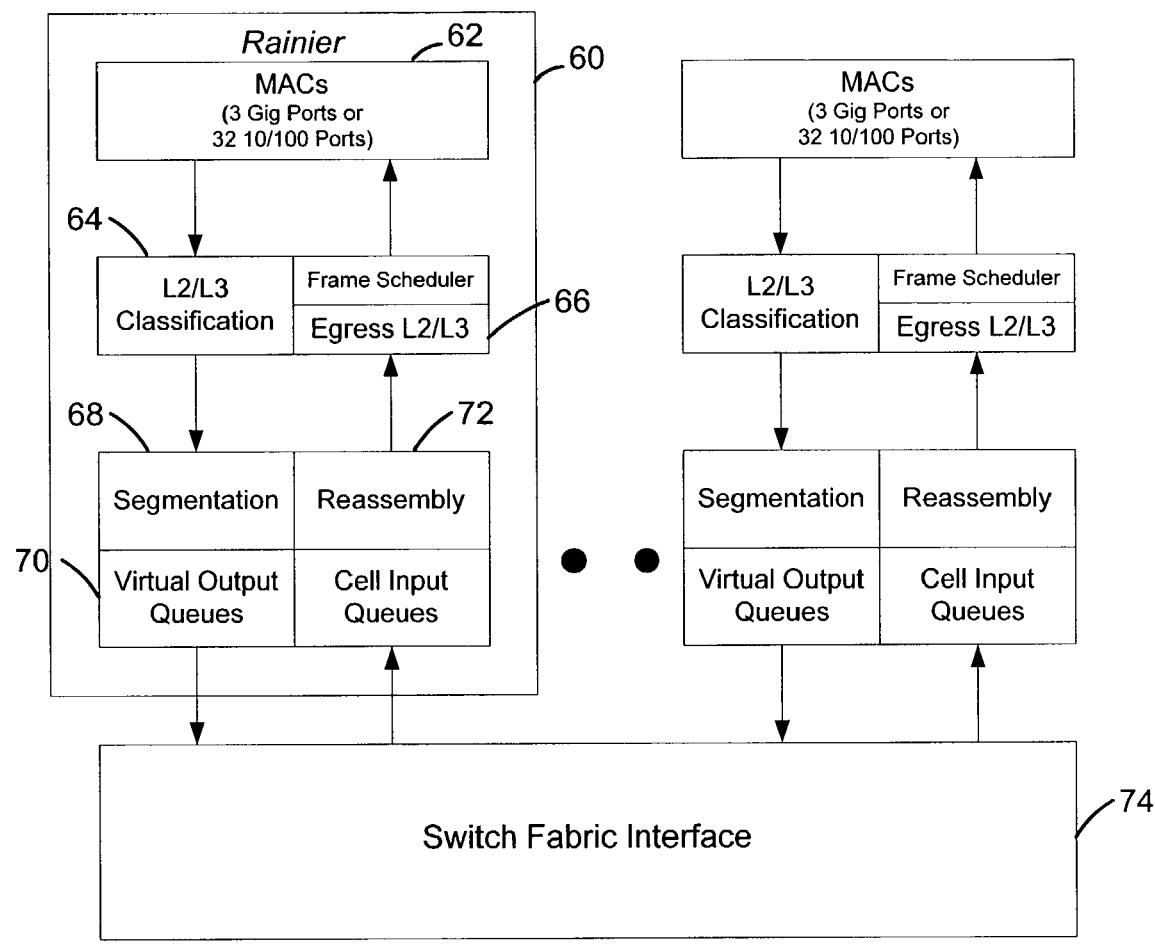
FIG. 6 is a more detailed block diagram of a portion of the application switch of FIG. 5.

Referring to FIGS. 5-6, the application switch can include a mother board that provides a switch fabric 50, and at least one media interface 52. One or more object-aware functional modules 54 of the same or different types can then each be included in one of a series of daughter cards that can be plugged into the mother board such that they can communicate through the switching fabric with other functional modules and with one or more of the media interface modules. The media interface modules provide the interface to one or more physical media, such as wires or optical fibers.

As do the function modules, every media module in the system has a network processor 60 (i.e., a Media Module Network Processor or MMNP). Its function is to connect to the physical layer components and perform the physical layer Media Access Control (MAC) functions (62). The MMNPs are also responsible for layer 2 and layer 3 forwarding decisions (64). In addition, the MMNPs perform the first level of processing for the higher layer functions of the system. For TCP termination, the MMNPs perform lookups to determine if the frames are destined to a function module and to which function module.

The MMNPs also perform the necessary functions for interfacing to the switch fabric. These functions include virtual output queuing (70), segmentation (68), and reassembly (72) of packets to and from cells, and implementation of flow control through the switch.

On the egress side, the MMNP is responsible for completing the L2/L3 function that is minimal on the egress side (66). Among these functions are intelligent multicasting, port mirroring, and traffic management. The switch fabric 74 can be implemented using the IBM PRS64G.

Figure 7:
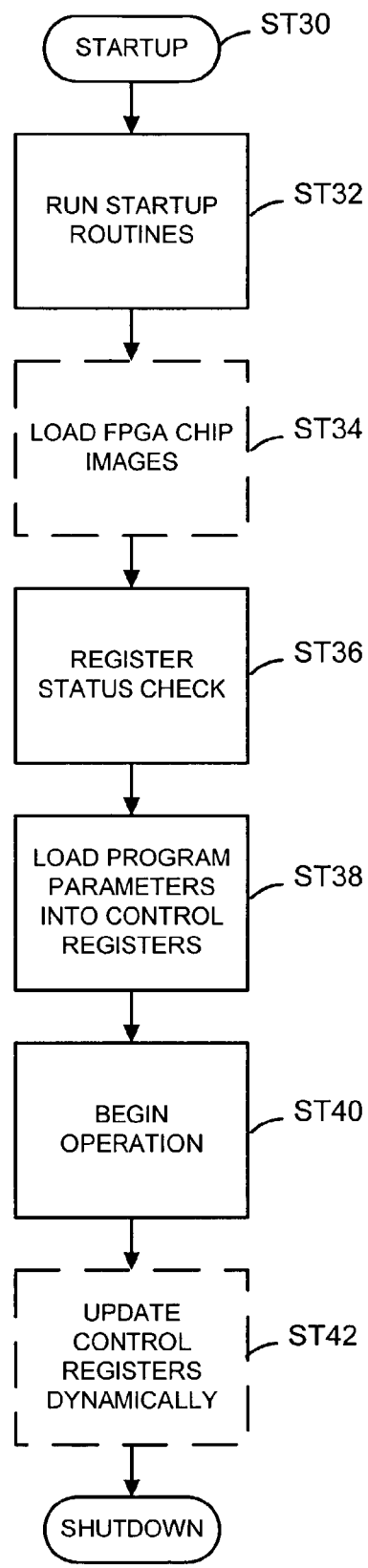
FIG. 7 is a flowchart illustrating the startup operation of the application switch of FIG. 5.

Referring to FIG. 7, operation of the application switch begins with a startup event, such as a power-up (step ST30). A processor on the mother board responds to this startup event by running one or more startup routines (step ST32). These startup routines can begin by performing any processor housekeeping functions, such as self-tests, that may be necessary. The motherboard processor can then load several different system applications, including bridging and routing applications, a management application, a command line interface application, a temperature monitoring application, and a network processor control application.

The processors in the daughter cards, which provide the OASP functionality, can also begin their startup routines in response to the startup event. These startup routines can begin by performing any processor housekeeping functions, such as self-tests, that may be necessary. The daughter card processors can then load several different daughter card applications, including a command line interface application, a temperature monitoring application, and a network processor control application. In systems in which elements of the OAS are implemented with FPGA technology, the daughter card processors can download their images into the chips (step ST34). The processors can then read the on-chip control registers to ensure that the images are compatible with the current software version (step ST36), and then configure the chips by loading program parameters into their control registers (step ST38). The system can then begin its ordinary operation (step ST40).

During operation, the system may update some of the control registers dynamically (step ST42). This can take place in response to operator configuration commands. For example, the operator can change resource allocations during operation of the application switch, and this type of change will take effect immediately.

Every module in the system interfaces to the switch fabric for data transfer. Frames are sent into the switch fabric interface with associated information on where the frame needs to be sent as well as the priority of the frame. The frame is then segmented into cells and queued up in virtual output queues. The cells are sent to the switch fabric. On the egress side, the switch interface needs to maintain an input queue for each of the ports. This allows the reassembly of cells into frames. Once the frames are reassembled, they are sent to the egress L2/L3 function and then queued up to the specific port(s). The switch interface portion that performs the segmentation and reassembly as well as the virtual output queues and cell scheduling are implemented in the network processor.

The switch fabric works on cells, and there is a separate queue in the switch fabric for each output port. This allows the switch to be non-blocking for all unicast frames. The switch maintains a separate set of queues for multicast cells. The destination port mask for the multicast traffic is stored in tables within the switch fabric. It is referenced by a multicast ID that must be configured in advance.

The system can support a fault-tolerant switch fabric by having a second one in the system in standby mode. Although the standby switch fabric is generally only used in the case of a failure, it is also possible to force traffic through the standby switch fabric. This feature is used to performing background testing on the standby switch fabric to ensure that it is operating properly in case it is needed.

Figure 9:
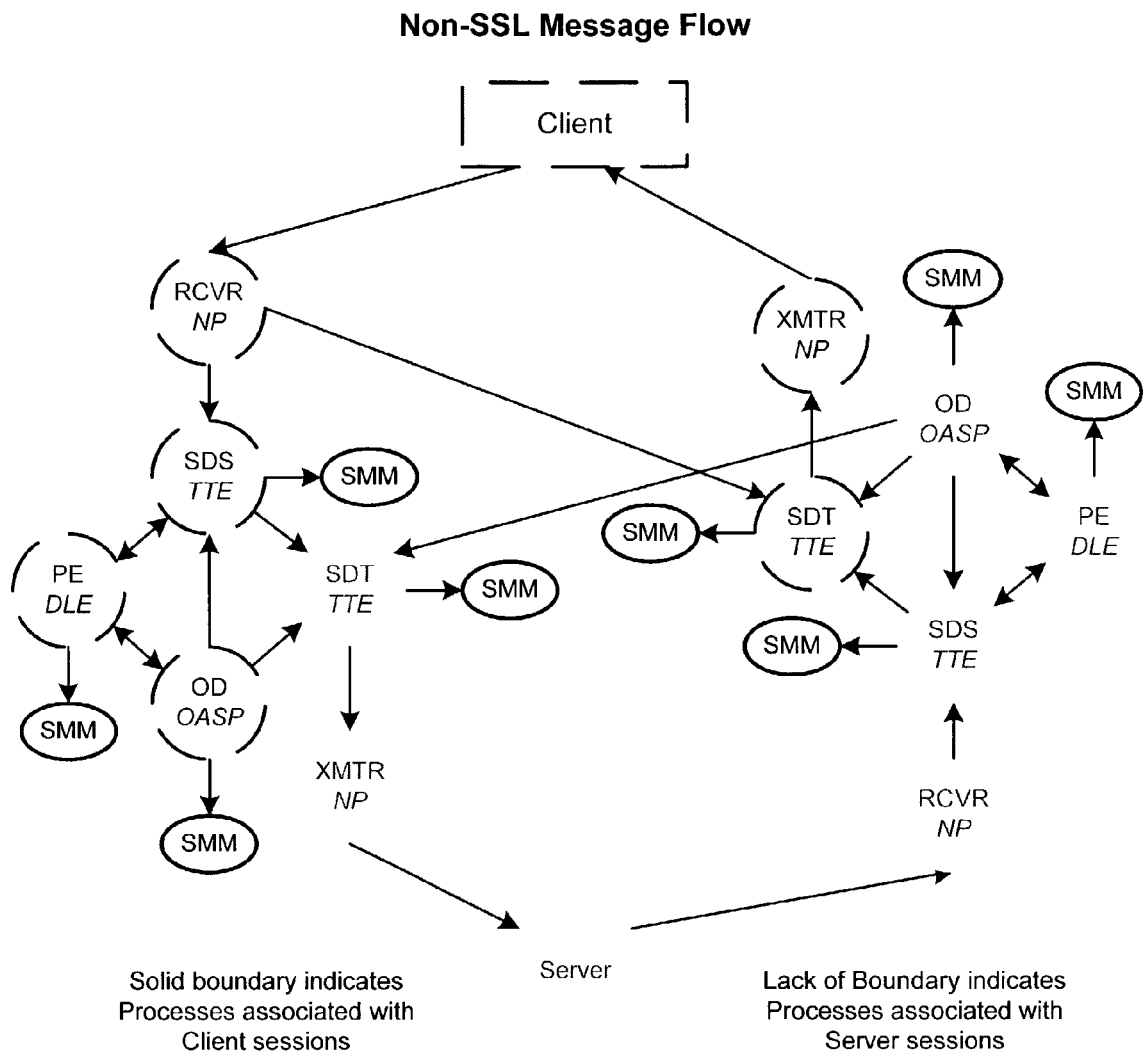
FIG. 9 is a block diagram of a first configuration for the application switch of FIG. 1 that can be used for unencrypted network traffic.

Referring to FIG. 9, the elements of the OAS chip complex communicate with each other using a number of industry standard POS-PHY physical interfaces, and the OASP communicates with the chip complex using a PCI interface. An additional component known as the Command Message Processor (CMP) transports messages between the Object-Aware Switching Processor (OASP) and the chip complex. One side of CMP handles messages over a 64-bit PCI bus, and the other side uses POS-PHY message channels (on- and off-chip busses).

The entire chip complex uses a flat memory map with a 40-bit global addressing scheme. The most significant four bits are used to map the address to a component in the system. The next bit is generally used to indicate whether the address is for on-chip registers or off-chip memory. The individual chips define how the remaining 35 bits are to be decoded.

The PCI address is a subset of the same global memory map. As the PCI bus uses only 32 bit addresses, the upper eight bits are zero when generating a 40-bit address. This restricts PCI to only seeing the low 4 GB of the global map, and thus OASP memory, CMP, and PCI registers are in the low 4 GB of the map.

All communication among elements is performed using messages. There are three kinds of messages: commands, returns, and events. Commands are messages that require the destination (TTE, SMM, DLE, OTE, CMP, or OASP) to perform some function. Returns are messages that provide the result of a specifically tagged command. Events are certain types of commands, which generally expect no return messages, and are not expected by the destination. The labeling of certain commands as events is for naming convenience only—any command sent in with no-acknowledgements is to the logic an event.

Messages can be broken down into bulk and non-bulk messages. Non-bulk messages comprise the majority of messages. A non-bulk message is always transferred over the POS-PHY interface in one chunk. Bulk messages may take many chunks. Examples of bulk messages include writes to stream memory of packet data, or a read from stream memory of packet data. Separating bulk and non-bulk messages allows commands to be processed while a large transfer is occurring. For example, while writing a large packet to stream memory, the TTE may want to request a read from another stream. Almost all of the commands have the ability to request an acknowledgment that the command has been received successfully. A few commands may require more than one acknowledgement upon the completion of a task. These are indicated in the message return definitions by a multiple response attribute.

The base message format for a command includes three bits that are used to request acknowledgements. The first one, called 'NoAck', when set, tells the recipient that unless there is an error in the execution of the command it should not send a response. There are two additional bits, Ack1 and Ack2, which are used to request responses once a task has completed successfully or in error.

When the response message is sent, the sender correlates the response to the command sent using the CommandTag field. For most commands, there is only one response and it is called a 'normal ack' or 'ackResp0'. There is an additional set of four bits that are only used by commands that have the multi-ack capability. These four bits are a bit mask of the types of acks that can be sent. A single response can be the ack response for several of the requested acks. These four bits include one bit for each of the three types of requested acks plus an additional bit to indicate an AckResp0 for a proxied command.

If a command results in an error, a response in the form of a return message to the command is generated. A status is included in that message to identify the reason for the error. In some cases the return is an ErrorRtn message rather then the expected return type.

If an error is detected in processing a command the unit normally responds to, the response is formatted normally but the status is set to non-OK. This will indicate to the requestor that the desired action was not completed. For the final return, hardware does not need to track which specific returns are still outstanding for multi-ack commands, it may simply leave all AckResp# bits clear and the CMP will use its in-flight database to set those AckResp# bits that were in flight. This does not apply when another response will come later; for example if a second response returns a error and the third return will come later, the second response sets only AckResp2.

When the originator of the command does not want any acknowledgement whatsoever, it sets cmd.noAck and clears cmd.ackreq {1,2}, if it is defined. In that case, the target device does not send a Return message if its status would be OK. If the command causes an error, the target device directs the return message to the OASP by sending SomeRtn (dest=OASP, stat!=OK, src=cmd.src, tag=cmd.tag). All fields in the Return message are filled normally except that "dest" is forced to OASP. Some commands may be defined with "noAck==1, ackreq {1,2}=0" fixed because the target chip doesn't support routing the Return message to places other than OASP.

When a message with (rtn==1 && src!=OASP) reaches the CMP, the CMP always routes it to the VI-Provider so the event will be treated as subscriber-fatal. For this to work, the CMP design requires software not to register an event handler for the "command codes" of any such messages. Subscriber software may register a handler for specific msg.cmd codes so that event messages to OASP may be handled, if desired. The software typically registers handlers only for InitParserCmd and SessionEvt; no handler is registered for any "XxRtn" event messages. Therefore, if software sends a Command with (noAck==1, ackreq {1,2}=0) and it fails, the error event sent to OASP will be routed to the VI-Provider, thus a "noAck error" will generally be subscriber-fatal.

Resource exhaustion errors should not be subscriber-fatal. Therefore, chips and software must not send a Command with (noAck==1, ackreq {1,2}=0) if that Command could fail for lack of shared resources.

If a Command causes an error in a unit that cannot form the matching return message, the unit must form an ErrorRtn message with ErrorRtn (dest=OASP, stat!=OK, ackresp=fixed, src=cmd.src, tag=cmd.tag) and embed the destination and opcode of the original Command. If a return to a chip causes an error (e.g., wrong-subscriber), it might be appropriate to raise a fatal interrupt. If not, ErrorRtn (dest=OASP, stat!=OK, ackResp=fixed) can be sent with (src, tag) set as convenient and with the opcode of the offending return embedded. All AckResp# bits are left clear in case a response was expected.

One type of ErrorRtn is for an invalid command. If a command is issued to a device that isn't capable of executing the command, it will return ErrorRtn with the 'INVALID' status code. The above rules apply, which will result in an OASP event and a subscriber fatal error.

If a message FBus on a chip could only generate an ErrorRtn if there is a hardware design error (not in any way as a result of a OASP command), the chip can raise a Non-Maskable-Interrupt (NMI) instead of generating/forwarding an EfrrorRtn.

Resource limitations are not really an error condition. When a request is made to allocate or use a resource that is not available, the response is sent using a non-zero status code. These indicate that the command did not complete successfully. Any originator of a command that requires the allocation of a resource must be able to handle gracefully a return code that indicates that the resource is not available.

A subscriber fatal error is one in which a command was issued and an unexpected error code was received, or a unexpected event is received. These errors are typically indicative of a subscriber inconsistency and most likely require the subscriber context be reinitialized.

A system fatal error is one in which the entire chip set must be reset. This includes non-recoverable Error-Correcting Code (ECC) errors, parity errors on an interface, or any kind of internal inconsistency that was not recoverable. When this occurs, a signal is sent to the TTE (from any of DLE, SMM, or SRP), which causes the TTE to stop transmitting. This is to prevent sending bad data outside the system. The TTE also generates an NMI to the OASP. In general, the OASP will log the error and reset the slice.

When issuing several write commands to write memory, it can't be assumed that they will occur all at once. The order of completion is maintained, but it is possible that other commands (potentially coming from different interfaces) will be processed in the middle of a multiple write command transaction. Therefore, when altering a data structure, it should be done in way that the final write command enables the use of the new structure.

To prevent deadlocks from occurring in the system, the switch ensures that one process cannot stall while waiting for another stalled process. This is achieved by guaranteeing that whenever a message is sent, the recipient processes it in a deterministic time. This means that there should be a limit on the number of outstanding messages sent to a recipient and that the recipient needs to have enough storage to buffer up the maximum number of messages. If the buffer fills up for any reason, this is indicative of a major error in the system. The recipient should return a 'QueueFull' error status code and continue processing messages in the queue. The sender, upon receiving a 'QueueFull' status code should inform the OASP by a return with error status or an ErrorRtn message.

The system is designed to support up to 256 different 'subscribers'. Each subscriber has its own guaranteed resources for its own purposes. There are also, subject to limits, a central pool of resources that are allocated dynamically to active subscribers. The goal for the resource management system is to minimize the adverse affects that one misbehaving subscriber can have on other subscribers.

On the OASP, each subscriber has its own task or set of tasks. The operating system on the OASP provides a level of isolation that prevents one subscriber's tasks from affecting others. However, support is required within the chip set to ensure that misbehaving subscribers do not inadvertently modify another subscriber's configuration.

To achieve this level of subscriber isolation, all subscriber-specific data structures within the chip complex are protected. Every command within the system is identified with a subscriber ID. This subscriber ID is used to validate any attempt to modify a subscriber specific data structure. This prevents a misbehaving subscriber from modifying the data structures of another subscriber. The only exception to this rule is for data structures and registers that are system wide. These belong to 'subscriber zero'. A subscriber ID of 0 indicates that subscriber checking should not be performed on the command.

The management of resources within the system is critical to providing subscriber isolation. Resources that are managed include the following:
SMM stream memory buffers
SMM stream IDs
TTE session IDs (TCB) and
TTE transmit packet descriptors
Bandwidth (QoS)

Every subscriber has a set of parameters for each resource that includes the minimum guaranteed and the maximum allowed number of instances that can be consumed. In addition, when allocating a resource to a subscriber, the request includes a priority. This priority is a request-specific parameter that tells the resource manager the priority of the individual request. The resource manager determines how much of the resource will be available after the request is granted. Higher priority requests will be allowed to consume more of a resource than lower priority requests.

The priority used for requesting resources is implemented as a three-bit value, the PriorityThreshold. This value is a number from 1-7 and indicates the number of bits to right-shift the maximum allowed. The truncated result is the amount that must remain following the grant of the request. This means that higher PriorityThreshold values have greater priority. The only exception to this is that a value of zero is considered the highest priority and the check is not performed.

There are 2 types of users of a stream: a 'user' and an 'extender'. A stream can have any number of users (up to 2^20) and either one or no extender. The entity that is considered the user of a stream is the one that has the ability to decrease its user count. The entity may not be interested in using the data at all, but if it is the one that is tasked with issuing the 'decrement user count command,' then it is considered the user. It can transfer this right to another entity (such as in a SendStream with a DecUser option) but if it wants to keep its own use of the stream, it needs to first increment the user count, wait for its completion. It can then transfer a use count to another entity.

The rules for freeing up memory are as follows: On a free memory command, the SMM only frees up memory when the number of users is zero or one. The SMM only deletes the stream if both, the number of users is zero and there is no extender.

When a stream is created, the extender flag is set and the number of users is specified in the CreateStreamCmd message. When there is no more data to be written to the stream, the extender sends a UseStreamCmd message with the 'clear extender' option. Note that even though there is no extender of the stream, there is no restriction on a user modifying data in the stream. This allows modifications to be made prior to transmitting an object. The only restriction is that the stream cannot grow. Any attempt to allocate more memory for the stream will fail.

The SplitStream command is another way in which the extender flag can get cleared. When a SplitStream takes place, the SMM transfers the state of the extender flag of the source stream to the new stream. The number of users of the new stream is specified in the SplitStream command, but in general it will be 1. The SplitStream command does not affect the number of users of the original stream.

Referring to FIG. 9, in order to make the command/response structure within the object aware system as general as possible, there are four generalizations made of command sources and destinations. These are referred to as the Parsing Entity (PE), Object Destination (OD), Stream Data Source (SDS), and Stream Data Target (SDT). These processes are defined in Table 7.

TABLE 7

| Process | Definition |
| --- | --- |
| ParsingEntity | The Parsing Entity is the process that examines data generated by a Stream Data Source. Once the PE has completed its task it sends the result to the Object Destination. The parsing entity is generally in the DLE, however, there are cases when the OASP may be running the PE process. In the SSL case, the SRP runs a PE process. |
| ObjectDestination | The Object Destination (OD) is the process that examines the results of the PE and makes a decision on what to do with the object. The OD generally runs on the OASP and the SPP. |
| StreamDataSource | The Stream Data Source (SDS) is a process that generates data that goes into a stream that needs to be parsed. For example, the TTE's receive process is an SDS. Data comes in on a session and is written to the stream. The other major SDS in the system is the SRP. |
| StreamDataTarget | The Stream Data Target (SDT) is a process that consumes data in a stream. This is done when data is sent out on a connection or when data is encrypted/decrypted. For example, the process that executes a Send Stream command is a Stream Data Target. |

Table 8 shows where the above processes are running in the system (all processes may also have instances on the OASP):

TABLE 8

| Process Type | Instances |
| --- | --- |
| RCVR (Receiver) | NP, EDEC (Encrypt-Decrypt Engine) |
| XMTR (Transmitter) | NP, EDEC |
| SDT (Stream Data Target) | TTE, SRP |
| SDS (Stream Data Source) | TTE, SRP |
| PB (Parsing Entity) | DLE, SRP |
| OD (Object Destination) | OASP, SPP |
| SMM | SMM |

The general flow of objects through the system, independent of the specific device running the processes, is as follows. An object first enters the system via a Stream Data Source. The object then gets passed to a Parsing Entity. The PE passes control of the object to an Object Destination. The OD decides what to do with the object and passes control to the Stream Data Target. While the message flow will be different for other configurations, this flow will be based on the generalized process set. This allows for a variety of different functionality sets to be created using different combinations of modules. The message flow in a non-SSL case is presented in FIG. 9, for example, and Table 9 lists the messages that are sent along the paths in that figure.

TABLE 9

| Command | Source | Dest |
| --- | --- | --- |
| CreateStreamCmd | SDS | SMM |
|  | OD | SMM |

TABLE 9-continued

| Command | Source | Dest |
|---|---|---|
| WriteStreamCmd | SDS | SMM |
|  | OD | SMM |
| ReadStreamCmd | SDT | SMM |
|  | PE | SMM |
|  | OD | SMM |
| FreeMemoryCmd | SDT | SMM |
|  | OD | SMM |
| UseStreamCmd(Add/DecUser) | SDT | SMM |
|  | OD | SMM |
| UseStreamCmd(ClearExtender) | SDS | SMM |
|  | OD | SMM |
| SplitStreamCmd | SDS | SMM |
|  | OD | SMM |
| CreateSessionCmd | OD | SDS/SDT |
| SendStreamCmd/SendDataCmd | OD | SDT |
| SDS as a proxy for OD | SDS(OD) | SDT |
| AutoStreamCmd | OD | SDS |
| WakeMeUpCmd | PE | SDS |
| SessionCmd(SendFIN) | OD | SDT |
| SessionCmd(AbortSession, RlsSessId, SendRST) | OD | SDS/SDT |
| Passive Open (only NP-TTE) | RCVR | SDS/SDT |
| FIN | RCVR | SDS |
|  | SDT | XMTR |
| RST | RCVR | SDS/SDT |
|  | SDT | XMTR |
| DataPacket | RCVR | SDS |
|  | SDT | XMTR |
| InitParserCmd | SDS | PE |
| RestartParserCmd | OD | PE |
| GetObjectCmd | OD | PE |
| SessionEvt | SDS | PE |
|  | SDT | OD |
| SetCipherStateCmd (only SPP-SRP) | OD | SDT |

Only one entity is allowed to issue SendStreamCmd messages to a session (Stream DataTarget—SDT). Initially, this is the OASP. When the OASP issues an AutoStream, it is effectively passing the transmitter control to the TTE (SDT). Only once the OASP gets confirmation that the AutoStream has terminated can it begin to issue more SendStreamCmd messages or pass control via another AutoStreamCmd. This is done by issuing the AutoStreamCmd with the ackOnAsDone bit. This will cause the final SDT generated SendStreamCmd to be sent with an ack (as well as the commandTag of the original AutoStreamCmd). This will in turn cause the recipient of the SendStreamCmd (SDT) to send the ack back to the issuer of the AutoStreamCmd.

There are two different types of priorities in the system, service categories and resource categories. The different service categories control the priority of sending and processing traffic. In general, the chip complex doesn't do very much with service categories, although the allocation of resources within the system, is controlled by different resource categories.

Every frame is assigned a service category when it enters the system. The media module NP assigns this value (three-bit field) based on factors such as the policy, received 802.1p priority field, TOS/Diffserv field, physical port, MAC addresses. There is a threshold for determining which priority to use when sending over the switch fabric. The switch fabric only has two levels of priority. When the frame gets to the TTE Network Processor (TTENP), it can change the service category as a result of its flow table lookup.

The service category in the flow table is updated by the TTE. When the TTE generates a frame, it can optionally set a bit that tells the NP to override the service category with a value provided. The OASP issues this request to the TTE using the AccessTcbCmd message and writing in the new service category as well as a bit that indicates that the NP needs to be updated.

The architecture of the illustrative application switch described above presents a variety of inventive principles and approaches to the design of network communication systems. These principles and approaches could of course be applied to allow for other types of functionality, or similar functionality could be achieved in somewhat different ways. For example, different types of standards, interfaces, or implementation techniques could be added or substituted in the designs presented. The design can also be varied so as to result in the addition or elimination of functional or structural components, changes in the interaction between these components, or changes in the components themselves. Note that a variety of the structures in the chip complex, such as the POS-PHY interfaces, are duplicated and reused in a variety of places.

One class of applications that can be implemented with the application switch include proxies. These can include proxies where web traffic received on a first connection is relayed onto a second connection with different communications characteristics. For example, fragmented sequences of out-of-order packets from a public network can be consolidated before being retransmitted over a private network. A related type of service is a compression service that can compress data received on a first connection and relay it onto a second connection. Compression can even be provided selectively to particular objects within an application-level protocol.

The application switch can also support applications that provide for protocol-to-protocol mapping. These applications can terminate a first connection using a first protocol and retransmit some or all of the information from that connection over a different connection using a different protocol, or a different version of a same protocol. Different levels of service quality can also be provided for on a same protocol, with policy-based dynamic adjustments being possible on a per-connection or per-subscriber basis.

Further applications include so-called "sorry services" which return error messages to web browsers. Marking services can also be provided, where packets are marked, such as with service category markings, for later processing.

TCP Termination Engine (TTE)

Figure 11:
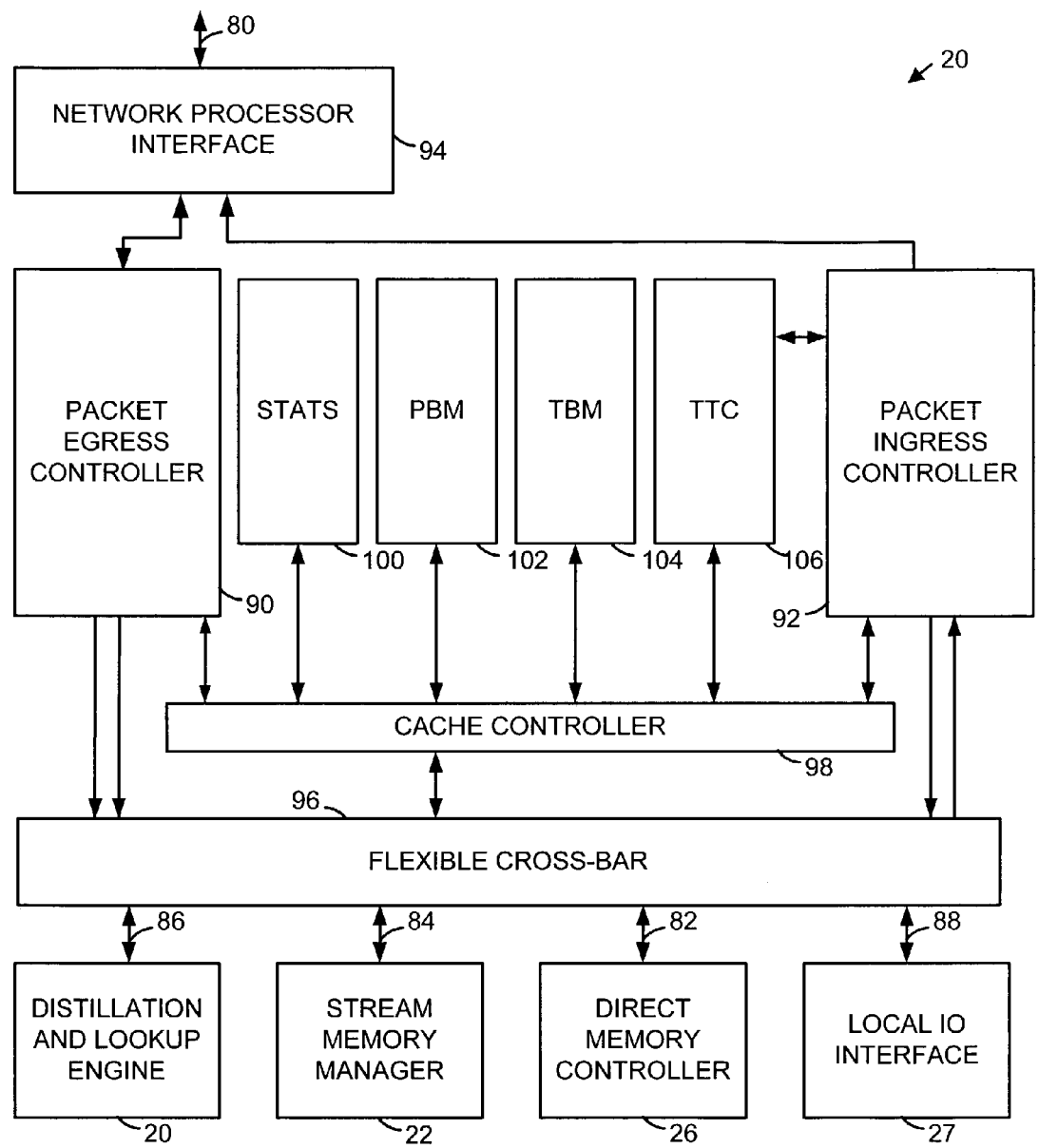
FIG. 11 is a block diagram of a TCP/IP termination engine for use in the application switch of FIG. 5.

Referring also to FIGS. 1-2 and 11, the TTE 20 is primarily responsible for managing TCP/IP sessions, and is the primary data path between the switch fabric and the remaining elements of the TCP engine 14. The traffic arriving at the TTE is pre-conditioned so that the TTE is only required to handle TCP traffic, with all other traffic such as ICMP messages or UDP traffic being filtered by the network processor and sent directly to the OASP. To optimize performance, the TTE is preferably implemented with dedicated, function-specific hardware and can be built using high density FPGA or high performance ASIC technology.

Packets entering and exiting the TTE 20 are encapsulated TCP segments. The TTE must first deal with this level of encapsulation before dealing with the packets' IP header. All packets received from the NP 12 will be IP datagrams, and similarly all packets sent to the NP will be valid IP datagrams. The mechanism for stripping and adding IP headers to the TCP segments is referred to simply as IP layering.

At the TCP layer, the TTE 20 is responsible for generating and stripping TCP headers. A TCP header will always include at least 20 bytes, with additional bytes being provided if certain options are specified in the header. The TTE computes a checksum across the entire TCP segment as well as an "IP pseudo header." Failures in de-encapsulating the TCP header cause the appropriate statistic to be incremented and the packet to be silently discarded.

The TTE 20 offloads from the OASP 16 most tasks associated with session management, with the goal to be able to be able to terminate a large number of sessions (e.g., 125,000 sessions per second). To this end, the TTE implements a state machine required by the TCP protocol. This protocol is presented in more detail in RFC793, which is herein incorporated by reference and presented in the accompanying Information Disclosure Statement.

The performance requirements for the TTE can be computed based on an appropriate traffic pattern, such as the Internet traffic pattern published by Cisco, which is referred to as the Internet mix or simply "IMIX." In the embodiment described, the TTE is designed to support a sustained rate of three Gb/s into and out of the TTE device, with 40-byte packets associated with the setup/teardown of TCP/IP connections.

If the TTE 20 is to be used in insecure network environments, care must be taken to avoid introducing vulnerabilities in implementing the TCP state machine. This can be accomplished by surveying security information dissemination sources that track recently developed attacks. For example, sequence number attacks can be dealt with according to the recommendations made in RFC 1948, entitled "Defending Against Sequence Number Attacks," which is herein incorporated by reference. The state of a connection is maintained in its TCB entry, which is described in more detail below.

Figure 8:
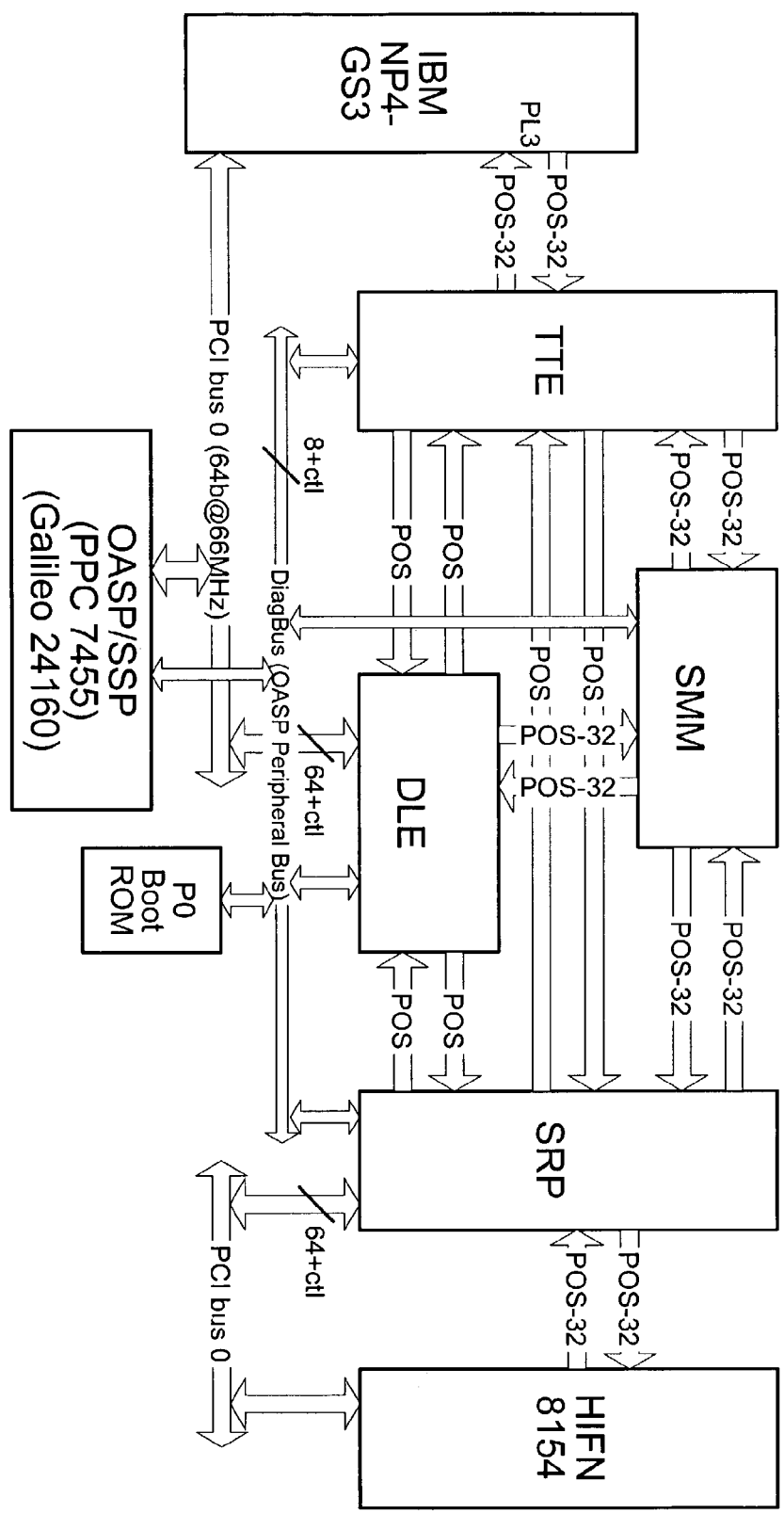
FIG. 8 is a block diagram showing physical message paths for the application switch of FIG. 5.

The TTE 20 has five bidirectional ports to interface with the other blocks in the OAS 10 (see also FIG. 8). A first of these three ports 80 is dedicated to interfacing to the switching fabric via the network processor 12. A second of these ports 82 provides an interface to a local Double Data Rate (DDR) memory subsystem used for per-connection state memory. The last three ports 84, 86, 88 respectively provide an interface to the DLE 22, and the SMM 24, and a Local 10 interface (LIO). There is no dedicated port that connects the OASP 16 with the TTE. The OASP instead communicates to the TTE via an API layered on top of the TCP engine's management interface, which may be transported over either the DLE or SMM ports.

Each of the bidirectional ports can be implemented with the same 32-bit POS-PHY interface that is used to communicate with the network processor 12. The TCP engine 14 then looks like a physical layer device to the network processor. This means that the network processor pushes packets to the TCP. engine and pulls packets from it as the master device on the POS-PHY interface that connects the TTE and NP. With respect to the POS-PHY interfaces that communicate with the DLE, SMM, and SRP the entity responsible for driving data will always be configured as the master.

The DDR subsystem utilizes a Direct Memory Controller (DMC) 26, which is an IP block that can be shared with the SMM 22 and DLE 20. The DMC is a 64-bit Dual Data Rate Random Access Memory (DDRAM) subsystem that is capable of supporting from 64 Mbytes to 512 Mbytes of DRAM. This DRAM contains the state for up to 256 K connections in data structures referred to as Transmission Control Blocks (TCB) as well as other data structures for maintaining statistics and scheduling packet transmissions.

The TTE 20 also includes a Packet Egress Controller (PEC, 90), and a Packet Ingress Controller (PIC, 92), which are both operatively connected to a network processor interface 44, which is in turn operatively connected to the network processor 12 via the first port 80. The packet egress controller and the packet ingress controller are also both operatively connected to a flexible cross-bar switch 96 and a cache controller 98. The cross-bar switch is operatively connected to the DMC 26 via the second port 82, to the SMM via the third port 84, to the DLE via the fourth port 86, to the LIO via the fifth port 88, as well as to the cache controller. The cache controller is operatively connected to a TCP statistics engine (STATS, 100), a Packet Descriptor Buffer Manager (PBM, 102), a Transmission Control Block Buffer Manager (TBM, 104), and a TCP Timer Control (TTC, 106).

The packet egress controller 90 is responsible for receiving packets from the NP 12, and the packet ingress controller is responsible for delivering packets from the TTE 20 to the switching fabric via the NP. All ingress packets into the switch are queued in an outgoing command queue called the packet command queue (PAC). Since there are actually two logical outgoing POS ports there is a dedicated queue for servicing each port. In addition to each logical port being fed by a dedicated queue, each port is further subdivided into a high and low priority queues serviced with a strict priority algorithm (i.e., if the high priority queue is non-empty it is always serviced next). A simple arbiter is used to monitor the status of the appropriate queues and services the highest priority non-empty queue. Because only commands are queued, there is no need to copy data from the SMM until it is read by the TTE.

A DMA engine is responsible for obtaining a command from a command prefetch buffer, as well as its corresponding packet header information. It then performs three functions: it builds a system Header, an IP Header, and a TCP Header. As the IP header is assembled the DMA engine is also responsible for computing and inserting the appropriate IP Header checksum. The DMA engine then dispatches a GET_STREAM command to the SMM Pos interface, and facilitates that data transfer back from the SMM to the appropriate outbound logical POS port. In some instances there is no data packet sent. The packet ingress controller also computes an end-to-end TCP checksum and appendes it to the outgoing IP datagram. The upstream NP is responsible for inserting the appended TCP checksum into the TCP header, prior to forwarding it through the switching fabric to the outgoing access media card.

The transmisson control block buffer manager 54 is an instantiation of a generic buffer manager, and manages TCB entries. Each TCB buffer includes 256 bytes, and there can be up to a total of 1 M descriptors in a system. The format of a stack entry is a right justified pointer to a TCB entry: {tbm_entry_ptr[39:8], 8'b0000_0000}.

The packet descriptor buffer manager 52 is also an instantiation of the generic buffer manager, and manages packet descriptors. Each Packet Descriptor buffer includes 64 bytes and there is up to 64 megabytes of memory reserved for packet descriptors. The format of a stack entry is then: {pdm_entry_ptr[37:8], 6'b00_0000}

The statistics engine 50 is responsible for offloading from the packet egress and ingress controllers 40, 42 most of the work required to maintain a robust set of TCP statistics. The engine takes commands from each of these controllers and issues atomic read-modify-write commands to increment statistics. A command is designed to operate on either a 64-bit or 32-bit integer. In order to efficiently support TCP statistics for up to 256 subscribers, the counters are divided into fast-path and slow-path counters. Fast-path counters are generally accessed during "normal" operations. In order to conserve external memory bandwidth these counters are contained in on-chip memory. The slow-path counters aggregate error information, and are contained in off-chip memory since they are infrequently accessed. The TCP Stat engine hides the details of fast-path and slow-path counters from the rest of the chip. If a counter is contained in off-chip memory then the engine, which is connected to the DMC via the FXB, will initiate an external memory cycle to update the counter.

The TCP timer control 56 controls the timers required by the TCP protocol. In the BSD implementation of TCP there are two entry points for tasks called "fasttimo" and "slowtimo" that service a connection's timers. Each of these entry points is reached as a result of a periodic signal from the kernel. The fasttimo results from a periodic 200 ms signal that TCP responds to by issuing delayed ACKS on every connection for which a segment has been received, but not yet acknowledged. In response to the slowtimo, which is spaced at 500 msec intervals, the timer state of every active connection must be accessed and decremented. If the decrement of any timer results in it reaching zero, TCP will take the appropriate action to service that timer.

The TTC 56 includes an implementation of fastimo and slowtimo combined in a single state machine referred to as simply "timo" that essentially runs as a background thread on the device. This logic block is designed such that it can be guaranteed to interrogate the timers, and delayed ACK state for each TCB entry within a 200 millisecond cycle. Each interrogation will result in a single 64-bit aligned read—only in the event of a time-out event will additional action be taken. In order to reduce the polling of TCBs to read only operation, the TTC deviates from the BSD timer implementation by recording time stamps, rather than actual timers. By saving timestamps the TTE does not need to decrement each counter by performing a write sequence to memory moving forward these entries in the TCB will be referred to as "stamps" rather than counters. The stamps are based on a single 18-bit master time stamp clock, called TCP_GLOBAL_TIMESTAMP. The value of a TCP stamp is always the time at which the underlying timer function would expire relative to the current TCP_GLOBAL_TIMESTAMP.

As the timo state machine sequences through each TCB entry, it compares the timestamp of each of the 4 timer function against the global timestamp using sequence number arithmetic if the stamp is greater than or equal to the global timestamp the timer is said to have expired. In order to perform sequence number arithmetic the maximum value of each timer assuming a 16-bit timestamp is set between 0 and $2^{15}-1$. Assuming the low order bit of the global timestamp incremented at 200 millisecond intervals, the maximum value for any TCP timer function would then be:

Max Timeout=$(((2^{15})/5)-1)$=6552 second=109 minutes=1.82 hours.

This value presents a small problem for implementing the KEEP-ALIVE counter, which requires intervals on the order of 2 hours. This problem is solved by the fact that only 500 ms of resolution is needed on the timestamps; therefore TCP_GLOBAL_TIMESTAMP, which is an 18-bit counter, will be incremented at 125 millisecond intervals. The set_timestamp function will be performed using full 18-bit arithmetic with the most significant 16 bits taken as the "stamp". This function now allows a maximum timeout value equal to:

Max Timeout=$(((2^{17})/8)-1)$=16383 second=273 minutes=4.55 hours.

Although TCP maintains six slow timers per active connection, some of the timers are mutually exclusive. Each of the timers can therefore be mapped to one of four timestamps.

In addition to checking the status of the four slow time stamps, two additional pieces of state information are necessary to determine if the connection under examination by the timo is active, and if so whether or not a delayed ACK is required to be sent for that connection. In order to contain the information that the timo state machine interrogates to an aligned 8-byte read, the TCB_2MSL is actually stored as a 14-bit stamp, thereby freeing up a pair of additional state bits. One of these state bits, TCB_DEL_ACK, is set upon receiving a packet and cleared when the packet is acknowledged. If this bit is set when interrogated by timo then a delayed acknowledge is issued for that connection. The second state bit referred to as TCB_CONN_VAL tracks whether or not the connection is active, it is set upon opening a channel and cleared when a connection is closed. The "timo" acts on a block only if and only if the TCB_CONN_VAL bit is set.

To implement delayed ACKs, a TCP implementation is required to service all connections with outstanding unacknowledged segments. In hardware, this can be accomplished by simply cycling through all connections every 200 milliseconds and checking a delayed ack status bit for action. But this approach could exhibit a significant bandwidth requirement. To more efficiently service fast timer requests, therefore, a fast timer service block (FTS) can implement a caching strategy. The TTE maintains a pair of bit-wise data-structures, TCP_SRVR_DACK and TCP_CLNT_DACK, which aggregated represent a total of 256 K connections (128 K of each type). The FTS will alternate between servicing the server and client side structures. The total size of the DACK structures is fixed at 32 Kbytes, which will reside in local high speed SRAM. Each bit in the DACK structures maps to a unique TCB entry. Whenever a packet is received on a connection its corresponding DACK bit is set, conversely it is cleared when the ACK for that segment is sent. This approach can reduce bandwidth overhead by a factor of six or more.

The main purpose of the TCP cache controller 56 is to provide the TTE with fast on-chip access to recently or soon-to-be-referenced pieces of state information necessary to process TCP flows. Another important function of the TCC is to insolate the DRAM Memory Controller (DMC) from seeing random sub-word read/write accesses. Since the DMC is optimized for block transfers with an 8-byte ECC code, sub-word writes can become very inefficient operations for it to service. The TCC accelerates operations to different types of data structures used by the TTE including TCB entries, TCB descriptors, and PQ descriptors. The TCC can support a fully associative 8 Kbyte write-back cache organized as 64-128 byte entries with an address space of 1024 Mbytes.

The TTE must maintain seven counters for each connection. Although there are six slow timers, they are maintained in four discrete counters since some of the timer functions are required in mutually exclusive TCP states. The connection establishment timer can be shared with the keep-alive timer, and similarly the FIN_WAIT_2 and TIME_WAIT timers share the same counter. TCP maintains the following timers.

Connection Establishment Timer (slowtimo)

Retransmission Timer (slowtimo)

Persist Timer (slowtimo)

Keep Alive Timer (slowtimo)

FIN_WAIT_2 Timer (slowtimo)

TIME_WAIT Timer (slowtimo)

Delayed ACK Timer (fasttimo)

A connection transitions from FIN_WAIT1 to FIN_WAIT2 on the receipt of an ACK for its SYN packet. If the FIN_WAIT_2 state is entered as a result of a full close, the 2MSL Timer serves double duty as the FIN_WAIT2 Timer. Here the timer is set to 11.25 minutes. If the FIN_WAIT2 timer expires before receiving a FIN packet from the other end of the connection the connection is closed immediately bypassing the TIME_WAIT state.

The TIME_WAIT state is entered when the TTE is asked to perform an ACTIVE_CLOSE on a connection and sends the final ACK of the four-way handshake. The primary purpose of this state is to ensure that the other endpoint receives the ACK and does not retransmit its final FIN packet. It is undesirable for connections in the TCB to be maintained in that state by the TTE and consuming a TCB buffer, since a simple analysis shows that it would not be possible for the TTE to meet its performance target of 100,000 objects per second. The TIME_WAIT state has therefore been moved to the network processor. When a connection needs to transition to the TIME_WAIT state the TTE passes a message a TTE_UPDATE message to the network processor, and can then recover the TCB buffer for re-use. The network processor then becomes responsible for implanting the 2MSL counter. When a connection is in the TIME_WAIT state it ignores all incoming traffic on that connection by dropping it on the floor. This is critical to avoid Time-Wait Assassination (TWA) hazards, documented in RFC1337. There is one exception to the rule that all segments received by a connection in the TIME_WAIT state be dropped. Since acknowledgements are not guaranteed to be delivered in TCP, then a connection can receive a re-transmitted FIN in the TIME_WAIT state. This results when one end of a connection fails to get an ACK for its FIN, and retransmits the original FIN. In the above scenario the TCP protocol (RFC 793) states that the connection must ACK the retransmitted FIN and re-start its 2MSL counter. The responsibility to retransmit the ACK is a collaborative effort between the TTE and the network processor. The following steps are performed to ensure this functionality:

When the TTE determines that a connection needs to transition to TIME_WAIT it will issue a TCP_UPDATE command to the network processor and along with the connections 4-tuple address it will pass the valid sequence number of a re-transmitted FIN.

The network processor performs the following check on all segments in the TIME_WAIT state if ((FIN.Sn != ExpectedFinSn) || RST || SYN || !FIN)
    silently discard the packet
else {
    reset 2MSL timer for this flow entry.
    issue a IP Looback Command to
    the TTE (with 2MSL indication "GenAck", see below)
}

TCP has a mechanism of providing what it calls urgent mode data, which many implementations incorrectly refer to as out-of-band data. The standards say that TCP must inform the application when an urgent pointer is received and one was not pending, or if the urgent pointer advances in the data stream. The TTE 20 will support this protocol by passing a message to the OASP 16 whenever it encounters urgent data, and pass a pointer to the last byte of urgent data as specified in RFC1122. Similarly a mechanism will be provided in the SendStream utility to set urgent mode and indicate the urgent mode offset as data is transmitted. The urgent mode offset is always computed to be the last byte of urgent data and is not necessarily contained within the segment that broadcasts the URG control bit. A segment is said to be in urgent mode until the last byte of urgent data is processed by the application responsible for interfacing to the TCP connection in question. The urgent pointer is broadcasted as an offset from the starting sequence number in which it was calculated.

When the outbound TCP session receives an urgent pointer either explicitly in a SendStream command from the OASP 16 or via an auto-stream mechanism the TTE 20 will immediately set the t_oobflag state bit indicating that it needs to set the URG control bit on the next segment transmitted. In addition, it will compute the urgent offset and save it in "snd_up" variable in the TCB block. At the next transmission opportunity for this connection the URG bit will be set with the proper URG_OFFSET broadcast as a TCP option. Once the URG state is broadcast and acknowledged as received by the other end of the connection the flag in the TCB block will be cleared. It is possible for a connection to get multiple URGENT messages prior to a segment transmission in which case the snd_up variable is continually updated with the recalculated urgent offset pointer. Since the urgent pointer is a 16-bit offset the URG bit will be set on a segment transmission only if the last byte of transmission is within 216-1 bytes of the starting sequence number of that segment.

The transmission control block is a piece of context associated with a connection that allows it to have persistent state over its lifetime. The TCB can be implemented as an 185 byte structure, although in many instances, only 128 bytes need to be accessed at any one time. From the TTE's perspective the structure can be viewed as six 32-byte blocks.

Generally, the TCB is initialized at connection establishment time via a template, and includes policy and dynamic fields. Policy fields are initialized at connection establishment. Dynamic fields can be altered during the life of a connection. In addition to terminating TCP, the TTE is also responsible for interacting with the rest of the termination engine via a Data Flow Architecture (DFA) messaging protocol. Relative to the DFA, a session is always in one of the states listed in Table 10.

TABLE 10

| | |
|---|---|
| 4'h0 LISTEN | Neither the receiver or transmitter are opened yet. Currently in the process of opening the connection. |
| 4'h1 ESTABLISHED | The Receiver and transmitter are open. They can receive/transmit more data. |
| 4'h2 FINRCV_XMTCLSD | The Receiver is closed due to a FIN segment received. Also the Transmitter was also previously closed via either a FIN or RST command from the OASP |
| 4'h3 FINRCV | The Receiver is closed due to a FIN segment received. |
| 4'h4 FINRCV_RSTRCV | The Transmitter and Receiver are closed due to a RST segment received. Prior to entering this state a FIN_RCV had been detected. |
| 4'h5 FINRCV_RSTSENT | The Transmitter and Receiver are closed due to a RST segment sent. Prior to entering this state a FIN_RCV had been detected. |
| 4'h6 RSTRCV | The Transmitter and Receiver are closed due to RST segment received. |

TABLE 10-continued

| | |
|---|---|
| 4'h7 RSTSENT | The Transmitter and Receiver are closed. The Connection was Aborted by the TTE sending a RST segment. |

Session events are generated whenever the DFA state of a session changes and is the principal means by which the TTE stays synchronized with the DLE and OASP subsystems. In general, there are just two types of session events. Either the receiver is closing or a connection is being reset, and both of these result in the session transitioning to a new DFA state. When the transmitter closes normally is under control of the OASP there is no session event required, unless it is closed due to an inbound RST segment.

All DFA state transitions result in a session event being broadcast over one of the following commands initiated by the TTE:

InitParserCmd

WakeMeUpRtn

SessionEvt

In most cases the target of a session event is the Parsing Entity (PE), the only exception being a situation where a connection is reset after its receiver is closed. In this scenario the event is directed at the object destination (generally the OASP 16) instead. The resulting state would be either FIN_RST_RCV in the case that the RST segment was issued from the remote end of the connection, or FIN_RST_SENT if the TTE generated the RST segment due to an abort condition.

The InitParserCmd is the mechanism the TTE uses to broadcast to the PE that a passive connection or active connection has been established. The only valid sessionStat that can be received with an InitParserCmd is "ESTABLISHED". If a passive connection is reset or dropped prior to a successful three-way handshake it will not result in an initParserCmd or any other sessionEvent. If an active connection attempt (initiated by the OASP) fails then it will be reflected in the CreateSessionRtn command. The PE is guaranteed not to see any other session events prior to being issued an InitParserCmd. Once a connection has been established and the InitParserCmd sent to the PE then any subsequent DFA state transition results in one of the following session events:

If a WakeMeUpRtn is pending then it is broadcasted on top of the WakeMeUpRtn

If the transition is to FIN_RST_RCV then this means that the PE has already been closed and a SessionEvt will be broadcasted to the OASP, otherwise a sessionEvt is broadcasted to the PE. The TTE will not generate event to the PE when a session is released. The only way a session can be released is if the PE had already received a "CLOSE" event.

The TTE 20 incorporates a traffic shaper that allows any TCP flow to be regulated. The algorithm is based on a dual token bucket scheme that provides hierarchical shaping of TCP connections within subscriber realms. To understand the traffic shaping capabilities there are some basic terms that should be defined.

The TTE buffers all in-bound traffic on a connection in a contiguous region in SMM memory called a stream. The pointer to the head of the stream is allocated at the time a connection is created. The biggest problem in receiving data on a TCP connection is that segments can arrive out of order.

Figure 12A:
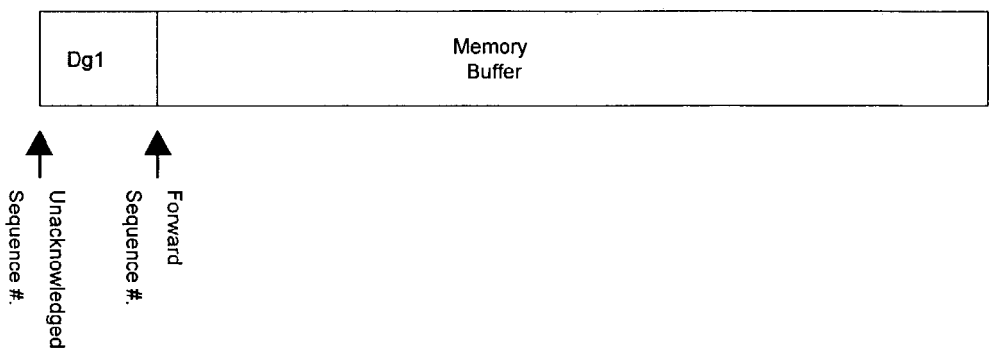
FIGS. 12A-12E are data stream diagrams illustrating the reception and processing of transport layer packets by the TCP termination engine of FIG. 11.

As segments arrive for a connection they are inserted into a pre-allocated SMM stream. The Forward Sequence Number (FSN) is placed at the lead end of the incoming data stream, indicating the next location for insertion of incoming data. The Unacknowledged Sequence Number (USN) indicates the start of data that hasn't been acknowledged yet. Initially the FSN and USN are set to the Initial Sequence Number (ISN) negotiated at connection establishment time, and the FSN is set to the ISN+1 (see FIG. 12A).

Figure 12B:
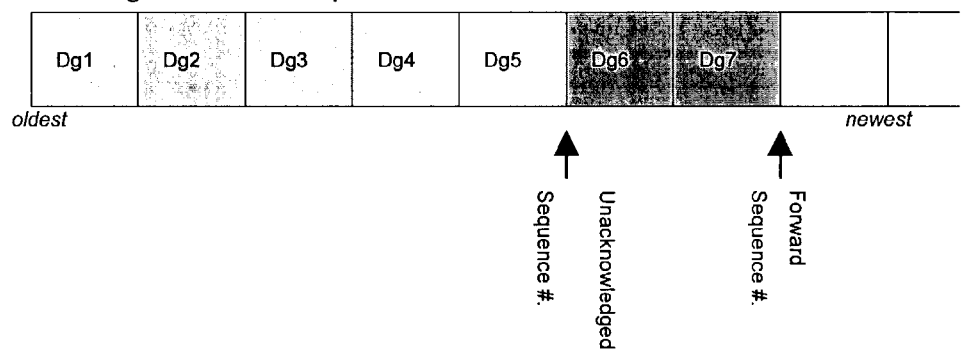

As more datagrams are received, they are inserted at the forward sequence number and the stream grows, with the newest inserted data to the right and the older data to the left. As time progresses and TCP segments are acknowledged the USN will chase the FSN (see FIG. 12B).

Figure 12C:
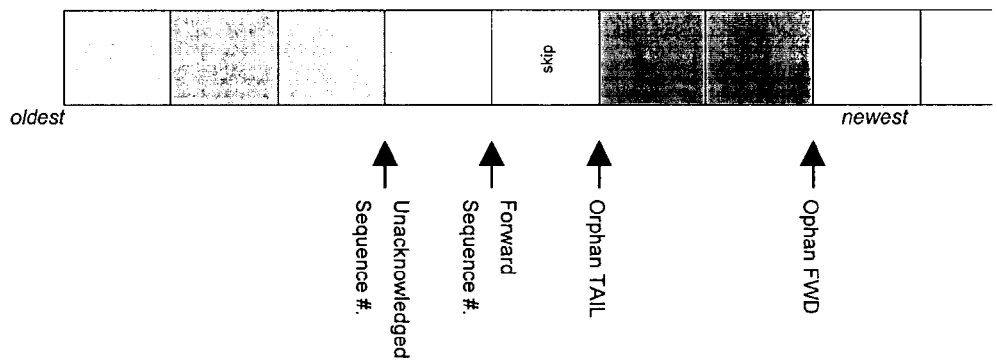

Occasionally datagrams can be lost or they can arrive to the TTE out of order. The TTE detects this when a gap is discovered between the FSN and the actual sequence number of the incoming datagram. In this situation the datagram is still accepted, a hole will be left in memory corresponding to the length of the missing segment. To support this technique, the concept of "Orphan Pointers" is introduced (see FIG. 12C).

Figure 12D:
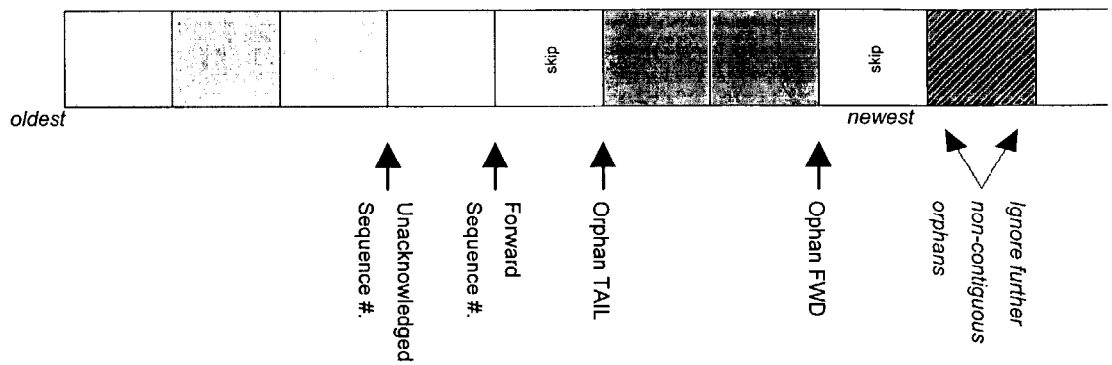

Data beyond the skipped sequence is inserted. The orphan tail pointer is placed at the lowest most sequence number associated with the orphan string. The orphan FWD pointer moves along with the forward and of the orphan string. As long as contiguous sequences are received, they are added to the forward end of the orphan string (see FIG. 12D).

Figure 12E:
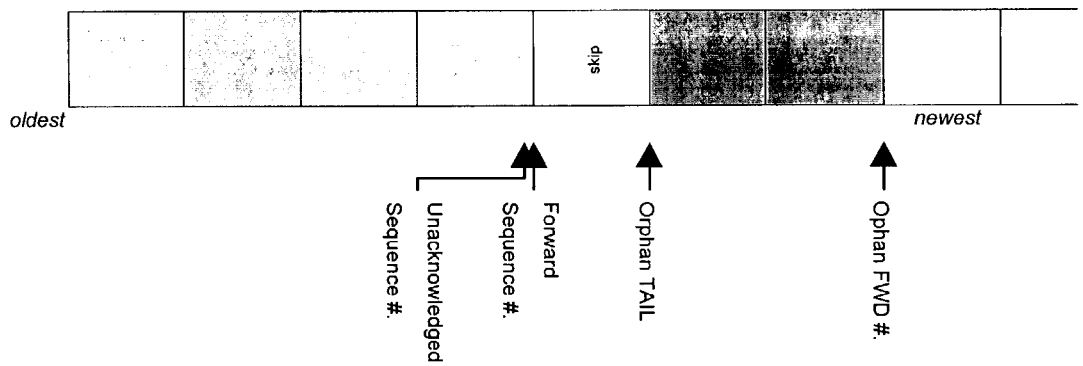

The TTE can support up to three sets of orphans. If an out of order segment is received that is within the TCP window but requires a fourth orphan pair, then it will be discarded (see FIG. 12E).

To activate the selective retransmission feature of TCP, normal ACKs are issued up to the FSN. If a datagram is received out of order an immediate ACK is issued corresponding to sequence number equal to the FSN. The receiver should recognize this, and determine which datagram is missing.

Stream Memory Manager (SMM)

The SMM 24 is a memory system that provides stream-based storage for other entities in the OAS 10. Theses entities can use the SMM to create a stream, write to the stream, and read from the stream. They can also change the number of users of a stream, split a stream, and request to free memory or receive notifications about freed memory within a stream. The SMM is described in more detail in a copending application entitled Stream Memory Manager.

The SMM and the TTE can interact to provide for flow control and congestion management. Specifically, the SMM can warn the TTE when a stream that it is writing to has reached a particular size. This condition can indicate that there is a downstream processing element that is not reading and deallocating the stream at a sufficient rate, and may be a symptom of subscriber resource exhaustion or even global resource exhaustion. If the TTE advertises a shorter window in response to the SMM's warning signal, therefore, the TTE can slow its writes to the oversized streams and thereby alleviate these conditions. This can allow for gradual performance degradation in response to overly congested conditions, instead of catastrophic failure.

Distillation and Lookup Engine (DLE)

The DLE performs two major functions: parsing of key fields from streams, and lookups of the key fields. These functions can be triggered by the TTE sending the DLE a message when there is data in a stream that needs to be parsed. The OASP can also initiate a DLE function manually on a stream.

The parsing function uses a general parsing tree that is used to identify the key portions of data in the stream. The DLE can support different parsing trees depending on the policy for the connection. There is an index known as the policy evaluation index that points to a series of pointers that are used to control the parsing and lookup engines. During the parsing phase, the DLE may not have all the data necessary to complete the parsing of an object. In this case the DLE will instruct the TTE to wake it up when there is more data in the stream. Once the DLE has enough data to parse, it completes the rest of its lookups and then goes into an idle state for that session. The OASP, after determining what to do with the object, can then instruct the DLE to continue parsing the stream. This may include parsing to the end of entity for chunked frames, or the OASP may instruct the DLE to retrieve the next object from the stream.

The lookup function begins by looking up a particular field and performing a lookup on that field. The type of lookup can include a series of longest prefix matches, longest suffix matches, or exact matches with some wildcarding capability. These lookups are performed on the fields that were extracted in the parsing phase. The result of the lookup can be a service group index, which is a pointer to a list of servers that might be selected using the Weighted Random Selection (WRS) algorithm.

When the lookup and WRS function is complete, the DLE sends a message to the OASP including the results of the lookup and other key information. The OASP can then determine what to do with the object and tell the TTE to which session it should be sent.

Figure 13:
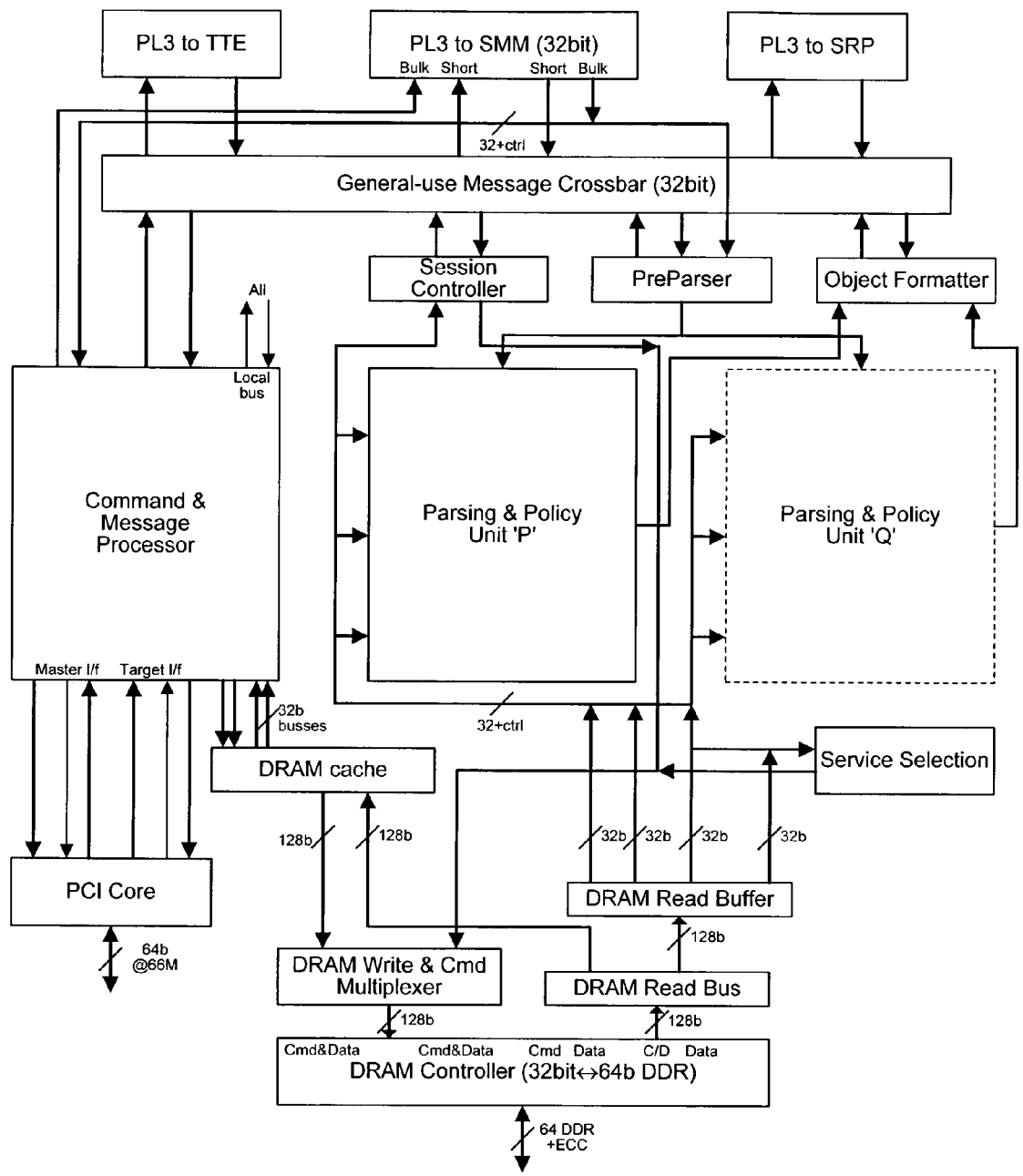
FIG. 13 is a block diagram of a distillation-and-lookup engine for the application switch of FIG. 5.
Figure 14:
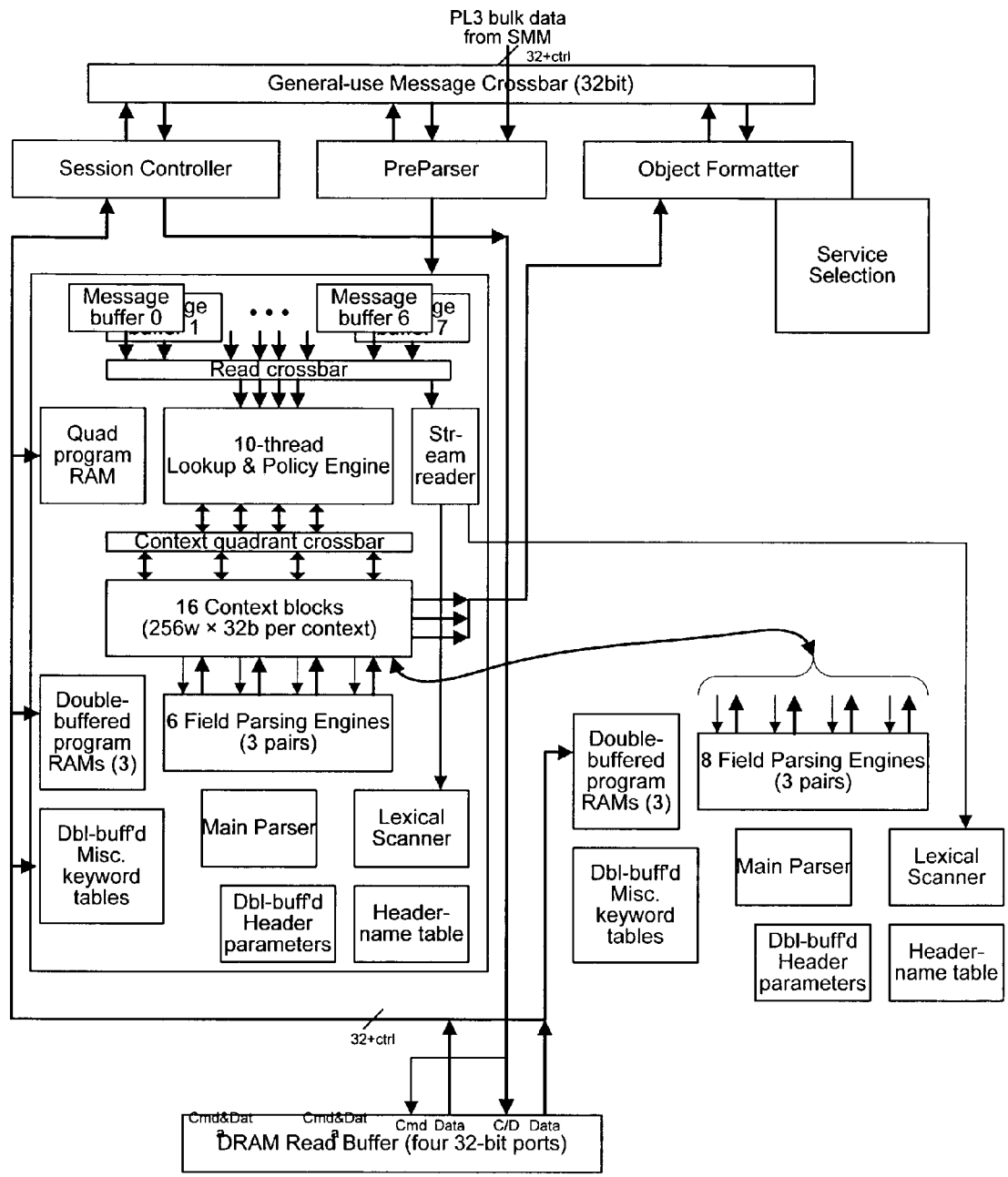
FIG. 14 is a block diagram of a distillation-and-lookup object processing block for the distillation-and-lookup engine of FIG. 13.

Referring to FIGS. 13-14, the DLE contains protocol-specific logic for lexical scanning purposes, such as finding the end of a message, locating each protocol header at the start of a message, and scanning over quoted strings. Beyond that, parsing is programmable. Within selected HTTP headers, the DLE parses nested list elements and name-value pairs in search of programmed names. The parser extracts (delineates and validates) values of interest for deeper analysis, and it can decode numbers and dates. Then a policy engine in DLE executes a sequential pattern-matching program to evaluate policy rules using the delineated values. Next, a service selection stage consults tables to select a service group member in a weighted-random fashion. Finally, the object formatter condenses the accumulated parsing, policy, and selection state of the message and sends the results to the OASP.

Although delineation of the overall headers and message body is mostly hard-wired, the symbol tables for field extraction and the policy rules and patterns are loaded from off-chip tables per virtual service (actually, per DLE policy offset within the parsing entity handle), and per real service in the back-end network. In the application switch architecture, a client session's virtual service is a mapping of the virtual IP destination, protocol and port number. Since the application switch actively opens connections to real services, those parsing handles can be more specific. The software can also specify a parsing handle for each received message after the first one on a passive connection.

The headers of a message might match a policy that directs the system to extract fields from the message body. Suppose that HTTP headers identify the message body as a 250,000-byte XML document, and that the policies for the HTTP headers determine that the DLE should extract the XML DOCTYPE and certain attribute values from some XML elements. It is also possible to process the parts of a message in phases.

In each phase of parsing and policy processing, the DLE first scans for the end of the byte-range to be parsed (e.g., the entire HTTP headers, or the first N bytes of an XML document). Once the DLE finds enough data in the TCP receive buffer or SSL decryption buffer, the DLE parses the byte-range at full speed to locate and validate selected fields. When parsing is complete, the policy programming can study the delineated fields in any sequence.

The policy program decides either to trigger another phase of parsing and policy processing, or to proceed with service selection and object formatting. For the latter option, the policy program must determine a service group index and decide what portion of the message state should be delivered to the OASP. For the option to process more of the message, the policy program should help the OASP to decide what byte-range to parse next and what DLE policy offset to use for the next parsing and policy tables. The policy program must also decide what portion of the message state to deliver to OASP now, since the DLE is not capable of storing the state from one round of processing while it waits for the system to receive the byte-range to be parsed next.

Parsing will be confined to the selected byte-range, and parsing cannot begin until that much of the receive buffer is valid. To moderate the system's demand for receive buffering, the art of processing a large message body lies in knowing how little of the initial body data is needed to evaluate the desired policies.

The data structures used by the DLE will now be described in more detail, beginning with session, subscriber and transient structures. The DLE uses Session Context Blocks (SCBs) that each have control handles and the starting sequence number for the current entity to be parsed on the TCP session's (current) receive stream. Controls include the session's subscriber ID, stream ID, and where DLE should send the parsing results. For each of 251 subscriber-IDs (0 to at least 250), the DLE has base and limit pointers for the subscriber's writeable segment of DLE memory, a 10-bit count of GETOBJECTCMD messages, each being a permission to send an unsolicited parsing result for any of the subscriber's receive streams, and the head index of a "receive buffer" ring to hold command-"tag" values from the GETOBJECTCMD messages. For commands from the OASP, the tag is an index to the flight table in the CMP, which stores the PCI address for each receive buffer. For each subscriber number, the DLE statically allocates 4 k bytes of memory to hold a 1024-entry ring-type fifo of GetObject buffer tags. After a complete message (i.e., headers) arrives in stream memory, the DLE allocates a context block and a message buffer so the message can be processed. The DLE frees a context after storing the results in an OASP bulk-data buffer.

The DLE also uses a number of policy related structures, including per subscriber load balancing tables. All of the services for each subscriber are listed in an off-chip table. The table has current weights and round-robin state to choose the default service for a message. A parallel table of counters records how many times each service was picked.

Each of a subscriber's parsing entity handles can select different off-chip tables to drive the parsing and policy evaluation stages. For a passive TCP connection, the first message uses the handle defined for the virtual service (IP destination, protocol and port number). In other cases, software can specify the parsing handle for each successive received message. Parameters for The pre-parser include the protocol for headers (HTTP) and the maximum pre-parsing length for headers. The OASP instructs the DLE how to parse each message body.

The lexical scanner uses global (static) and transient symbol tables to enumerate protocol keywords and other words of interest in the message headers. The transient table is loaded when the parser starts to process a message. The DLE relies on symbol table look-ups in situations where several words can appear, and the parser should take different actions based on them (even to store an 'enum'). If the parser needs only to delineate a varying word, it need not be added to a symbol table since the look-up and policy engine is designed to search a sparse table of strings.

For each known header name, the main parser must be told the outer list separator, and the character set and case-sensitivity of keywords. More importantly, each header name activates several delineation registers and parsing programs to process the header's elements.

When the parser starts to process a message, the DLE loads a suite of up to 56 field-parsing programs to guide the dissection of message headers. Each program is a stylized regular expression with side effects inserted after selected pattern steps. For example, the "mark" and "point" operators tell what substring of a header field needs policy evaluation.

So that DLE can load up to parsing programs quickly, the regular expressions do not embed the character sets to be matched at various steps. All of the character sets used in the 56 programs are defined by a central table of 30-bit masks. Successive characters of the message index the table to determine which of 30 character-sets include the current character.

The bulk of each DLE context block (DCB) comprises 56 delineation registers (each 4×32 bits) and 32 general registers (each 1×32 bits). For a given message, the parsing handle chooses a suite of 56 parsing programs, each of which intends to load its register with an interesting piece of the message headers. A few special-purpose registers are filled by miscellaneous hard-wired parsing logic.

A delineation register tells where the datum was located in the message (byte offset and length), or that no data matched the register's target pattern. Each parsing program can also perform operations such as enumerating known words, or decoding an ASCII integer or date. The policy evaluation phase studies what data was collected in the registers. Some or all of the register contents can be delivered to software to describe the received object.

When parsing is complete, DLE assigns the message to an execution thread in the look-up and policy engine. Each thread executes a sequential program using the off-chip instructions.

Top-Level Sequencing for the DLE will now be described. At start-up, the OASP posts up to 500 GETOBJECTCMD messages for each subscriber ID. Each one carries a bulk data pointer that is used later to store the distilled object in PCI memory.

When each TCP session is fully created, the TCP Termination Engine (TTE) sends an INITPARSERCMD message with the parsing handle to be used for the first object headers read from the session. From the policy tables, the DLE reads controls for the pre-parser and stores them in the session context block (SCB). Unless INITPARSERCMD indicates that data has already been received, the DLE sends a WAKEMEUPCMD(minEndSeqNum, splitStream=false) message to the TTE requesting the initial byte length for the policy's protocol (e.g., 1 byte) and the session enters the WAITFORHDR state.

When enough TCP data arrives, if it has not already, or when the receiver closes, the TTE sends a WAKEMEUPRTN(endSeqNum, endOfRx, endReason, newStreamId) message. EndOfRx=1 indicates that endSeqNum is final, and no more data will be received. In addition, the TTE sends one SESSIONEVENTCMD(endReason) message per session if the receiver closes at a time that TTE does not owe a WAKEMEUPRTN message to DLE.

The DLE saves the WAKEMEUPRTN arguments in the SCB and posts a SESSIONWORK(sessionId, rcvObject=1, subscriberId) event in its work queue. The same dialog applies between DLE and the SSL Record Processor (SRP).

The DLE then checks the head entry of the global session-work queue. If a parsing result is required (rcvObject=1) and is directed to the OASP, the DLE checks for a free GETOBJECTXX response buffer for the session's subscriber ID. Lacking a response buffer, DLE moves the SESSIONWORK event to the end of the queue so it doesn't block the progress of other subscribers. Note that in this embodiment, the OASP is the only supported destination of DLE parsing/policy output.

The DLE then holds the session parameters and waits for the pre-parser to finish the previous PARSESTREAM (rcvObject) action. (Independently, the pre-parser can process one SCANBODY action. And it can pipeline several FETCHSTREAM actions to refill message buffers for other stages of The DLE.) The DLE also waits for the ObjectFormatter to free an on-chip context block and message buffer. Since The DLE has two copies of parsing/policy logic, The DLE makes a two-way load balancing decision at this point.

The pre-parser then stores the session parameters in a free context block and begins to read 128-byte chunks of data from the stream. The SCB supplies a protocol selector ("HTTP", "chunked body", etc.) and a maximum message size. At four bytes per cycle, the pre-parser scans for the end of the entity according to the protocol, and it saves the first 2 Kbytes in the on-chip message buffer. If the data runs out, the DLE frees the buffer, puts the session back in the WAITFORHDR state and sends a WAKEMEUPCMD asking for one byte beyond the prior endSeqNum.

Once the pre-parser determines that the entire message has been received, the DLE waits for the chosen parsing subsystem to finish the prior message. (Each of two parsing subsystems is associated with half of the context block, message buffer pairs.) The pre-parser hands off the work to the stream reader, which feeds the message bytes to the parser at one byte per two cycles.

The parser analyzes each message header in turn in the programmed manner. The programming directs the parser to extract selected protocol elements into delineation registers. If the entire message (headers) did not fit in the on-chip 2 Kbyte buffer, the stream reader directs part of the pre-parser to fetch the third 1 Kbytes as soon as the first 1 Kbytes have been parsed. The goal is to parse large messages without much stalling.

When parsing and delineation/decoding is complete, the parsing subsystem stalls until it can allocate a thread of the look-up and policy engine. A sequencer loads a number of initial words of the off-chip policy engine instructions into the on-chip program RAM.

When evaluation is complete, the context block and message buffer are queued to the object formatter and the session is updated to the idle state. The context and buffer are not freed until the object formatter transfers results to a OASP receive buffer or the specified destination chip.

Eventually, The OASP instructs the DLE how to restart parsing the session's receive data. For example, the session should scan a chunk-encoded HTTP entity. The DLE sends WAKEMEUPCMD as before, but often with a meaningful target length instead of "one byte beyond the prior object".

The TTE and the object-transformation engine (e.g., SRP) are responsible for dividing their sessions among subscribers, and for confining each session to its own stream. The DLE checks that INITPARSER commands from those devices before The DLE sets the high bits to distinguish the command source. The DLE trusts and stores the subscriber ID, resultDest, stream ID, etc., fields in INITPARSER commands from those devices. Note that user code on the OASP should not be allowed to set session controls directly.

Parsing Phases will now be discussed in more detail, beginning with scanning for end-of-headers or end-of-body. The pre-parser requests stream data from SMM and scans for the end of message headers or a chunked message body at the rate of four bytes per cycle. The pre-parser has a hardwired behavior for each protocol (MIME-like headers for HTTP, "chunked-body" encoding, etc.), and only needs to know the protocol/encoding of the stream's current entity. The pre-parser updates the session context block every time it attempts to scan an entity.

The pre-parser is the sole recipient of stream data from SMM. In addition to its pre-parsing role, the pre-parser will refill an on-chip message buffer with additional stream data, as requested later by the parsing and policy-evaluation stages.

The pre-parser has these components: stream readers (3), end-of-entity scanner for headers, and end-of-entity scanner for bodies. The stream readers are state machines that read stream data in 128-byte chunks, so as not to clog the bulk-data channel from SMM. The machines also post WAKEMEUP messages if the end-of-entity wasn't found. There is one machine for PARSESTREAM work and one for SCANBODY work. The third machine serves a queue of FETCHSTREAM work from later stages of DLE. The End-of-entity scanner for headers is a data path that locates the end of the entity for the current PARSESTREAM action. The end-of-entity scanner for bodies is a data path that locates the end of the entity for the current SCANBODY action.

The parsing and extraction data path will now be discussed. Once its tables are loaded, each of two parsing subsystems scans headers and recognizes keywords at one byte per two cycles. Exclusive of start-up latency, two parsers are adequate to process a header of up to >>400 bytes every 500 cycles.

The parsing data path has a number of components: a lexical scanner, a header-name recognizer, a keyword recognizer, a policy word recognizer, a main parsing engine, field parsing engines and delineation registers, a date decoder, and integer and real-number decoders.

The lexical scanner delineates each header and any quoted strings, and emits two views of the message data: normal and quoted-string. The lexical scanner tells what separator follows the present character of a protocol 'token,' after skipping optional whitespace. After scanning 1 Kbytes of the initial headers that were buffered on-chip, the scanner will instruct the pre-parser to bring in more stream data, and will stall the parsing data path as needed.

The header-name recognizer includes a global symbol table that has well-known header names. It runs about 15 byte-times (30 cycles) ahead of the rest of the parser, since it controls the latter's behavior. HTTP examples include "GET," "Connection," "Accept-Encoding," and "Set-Cookie".

The Keyword recognizer includes a global symbol table that has well-known keywords that appear within a header. HTTP examples include "HTTP"/1.1, "close," "gzip," and "expires."

The policy word recognizer includes a loadable table of that includes service-specific names, words, and other information. It is used primarily to locate relevant cookies, and to find named fields within a query string or a relevant cookie.

The main parsing engine looks up the field-name of each header and optionally scans the outer level of list elements in the field-value. Per-header controls include the list element separators, and how to look up keywords within that header using a symbol table. Unless it should be ignored, each header name activates a set of delineation registers and parsing programs to analyze the header's list elements (or the whole value).

The main parser drives the chosen parsing programs with a stream of characters, indications of where header elements begin and end, the 'enum' code of a just-completed protocol word, and character-set classifications for each successive character. For example, if a parsing program wants to match the next character to "[A-Za-z]", it checks the proper set-membership output from main parser. For each parsing handle, the programming of main parser comprises the table of per-header parameters and a table of 30-bit character set masks.

Separating outer list elements is fundamental to the HTTP protocol, since many headers contain an unordered list of elements that are processed independently. The order of inner lists is usually significant, at least to distinguish the first element as in "<keyword>; <attrName>=<attrValue>".

The main parsing engine could scan an inner list within an outer list element, as a division of complexity between main parser and field parsing engines. As designed, the field parsing engines search for inner list elements.

One DLE context block holds 56 delineation registers (DRs) and 32 simple registers. The message's parsing handle defines what the up to 56 DRs should do by assigning each DR to a known header name and providing its parsing program. Although each half of DLE has eight contexts of 56 delineation registers (in dense RAMs), there are only eight copies of field parser logic per half of DLE. The DRs and field parsers are distributed in four quadrants, each with 56±4 DRs (per context) and two field parsers. The DRs are numbered so that software can ignore the quadrants and focus on the headers. For each message header, software allocates zero to eight consecutively numbered DRs. At most two of the chosen DRs fall in a given quadrant, and each quadrant has two field parsers.

The date decoder decodes dates. Whenever a separator is followed by a capitalized weekday, this central circuit begins decoding a date string in the three formats allowed for HTTP. All three formats begin with the full or abbreviated weekday. They use ":" between time digits and two formats use "," between the weekday and date. One format uses "-" around the abbreviated month. For a field parser to use the decoded date, its parsing program and the central date decoder must agree on the fire st and last characters of the date field. Each field parser also contains its own decoders for decimal and hex integers, and for simple fixed-point numbers (for ";q=0.5" in HTTP).

Each delineation register (DR) is programmed to parse a specific message header (by name), and optionally, to confine the parsing to selected outer list elements within that header(s). At the start of each message header, the Main-Parser prepares up to eight field parsers to update as many DRs by telling each field parser its target register number.

For a given parsing handle, each DR is dedicated to a particular parsing task, so DR numbers are equal to parsing-program numbers within that policy. All (up to) 60 parsing programs were brought on-chip at the start of the message.

Once the field parsers get their DR/program numbers, they spend 15 byte-times (30 cycles) to load control words from their programs' base addresses. (LexScanH adds stall cycles after "<LF>Header-Name:" to fill 15 byte-times.) The first instruction of each program is just after the control words. The field parsers also load one word from their assigned DRs. That word holds the state to influence successive invocations of the parsing program. For example, each DR flags an error if the header material it seeks appears twice in the same message. The remaining DR words (3 of 4) are only written by field parser (after successfully delineating the element of interest).

Among the prefetched control words, each field parser loads selectors for what part of the named header it should process. A DR can parse a header's entire field-value (and do so again if the message has multiple instances of that header). The DR can parse every outer list element in the header, or a selected list element (by name or position). For each instance of the selected header element, the assigned field parser runs the DR's parsing program to completion. Every field parser (and delineation register) runs the same instruction set. A field parser has these decisions to make:

1. Select an element. Note that MainParser found the desired outer list element within the header. Optionally the characters before and after a desired inner list element are skipped (e.g., an HTTP parameter).
2. Trigger. Decide that the element warrants loading the delineation register, if available. If a message might have multiple elements that trigger, the parsing program can reload the DR up to the N-th trigger. (This allows three DRs to capture the first three instances of a recurring header element.) If an element beyond the N-th also triggers, the field parser only sets an error flag in the register. A parsing program triggers the DR by picking the start and end of a byte-range to delineate. The parsing program can supercede or cancel the byte-range as the bytes of the header element stream into the parser. At the end of the header element, the DR increments its trigger count and captures the offset and length of the interesting bytes. In addition, the parsing program can specify a substring to be decoded as a number or to be hashed.
3. Validate: In the course of matching the input stream to the programmed regular expression, the field parser notices if the input data is malformed. A complete match is deemed "good" and a mismatch is "bad". Since the error may lie beyond the delineated part, the field parser allows an element's "good or bad" decision to be independent of "trigger or skip".

The field parser also provides a "warning" feature. A good protocol receiver is tolerant of unexpected input that can still be deciphered. The regular expressions will be written to parse all valid inputs as simply as possible, which means that the expressions will match many improper inputs as well. Each step of the regular expression can be annotated with a set of characters that the protocol doesn't allow there. An unexpected character will set the "warning" flag in the DR, independent of the good/bad decision. The overall parsing architecture and the field parser instruction set are carefully designed to make parsing programs small. So that leaves parsing data paths provide enough performance, backtracking to retest an earlier character should be rare in all applications. This is achieved by avoiding backtracking entirely. The instruction set is designed so that every instruction consumes at least one input character.

The DLE service selection engine is a hardware assist engine to provide service selection and load balancing. This module picks a service from a software-generated list stored in memory. The goal is to fairly distribute the workload to a group of servers with the ability to manage the percentage of the total load applied to each server. This load balancing is done using a WRS algorithm. The load-balancing algorithm can also operate in straight round robin mode.

A service group is defined as a list of services stored in DLE memory. Each entry consists of svcSwHandle (a 32-bit opaque value for software) and an eight-bit weight. The weight is used as a relative preference value in the server selection process. Services with a higher weight value will be selected more often than other services. Setting the weight to zero will prevent the service from being selected by this process.

There is an array of counters in DLE memory parallel to the list of services in the service group. A pair of 32-bit counters corresponds to each service. The result of service selection can increment of one of the two associated counters. An input to DleSvcSel chooses which of the two counters to increment.

An object formatter creates and sends a DLE result message to an OASP receive buffer, which is the only supported parsing destination for a session in this embodiment. From the DLE context block, the object formatter reads the mask of context registers to include in the abridged results, and the number of initial message header bytes to include.

Object-related state that is not accessible to policy instructions is stored in the hidden registers of each DLE context. This includes:

session ID (implies subscriber ID)
  End-of-session status (still open, or the first event that closed the receive session)
  Current stream ID (in case the prior objects were split off for out-of-order disposal)
  Starting sequence number of the message
  DLE policy offset and software policy handle
  End-of-headers sequence number (the byte beyond the parsed stream data)

These general registers are loaded by special logic and have read-only access by policy instructions.

Implied: Network protocol (e.g., IPv4) and IP protocol (e.g., TCP)
  IPv4 destination and source addresses
  IP destination and source port numbers Table maintenance requirements will be implemented as follows. WRITEMEMCMD is first executed atomically to change all of the structure pointers for a given policy evaluation offset. The DLE reads the block of pointers atomically when using them. This allows the OASP to install new policies for an active session.

A large sequence number is assigned to each context as it starts to read DLE tables. The low-order sequence number of the oldest context that is still reading DLE tables, and the oldest number whose results haven't been pushed into OASP memory are tracked. The OASP can sample these registers twice to confirm that DLE work-in-progress has completed since the time OASP pointed DLE to new parsing/policy tables. In order to resize an active subscriber's memory segment, one extra memory segment is provided so that a designated subscriber can have two copies of DLE tables.

When old work is finished, OASP can atomically make the new region the subscriber's normal region.

SSL Record Processor

Figure 15:
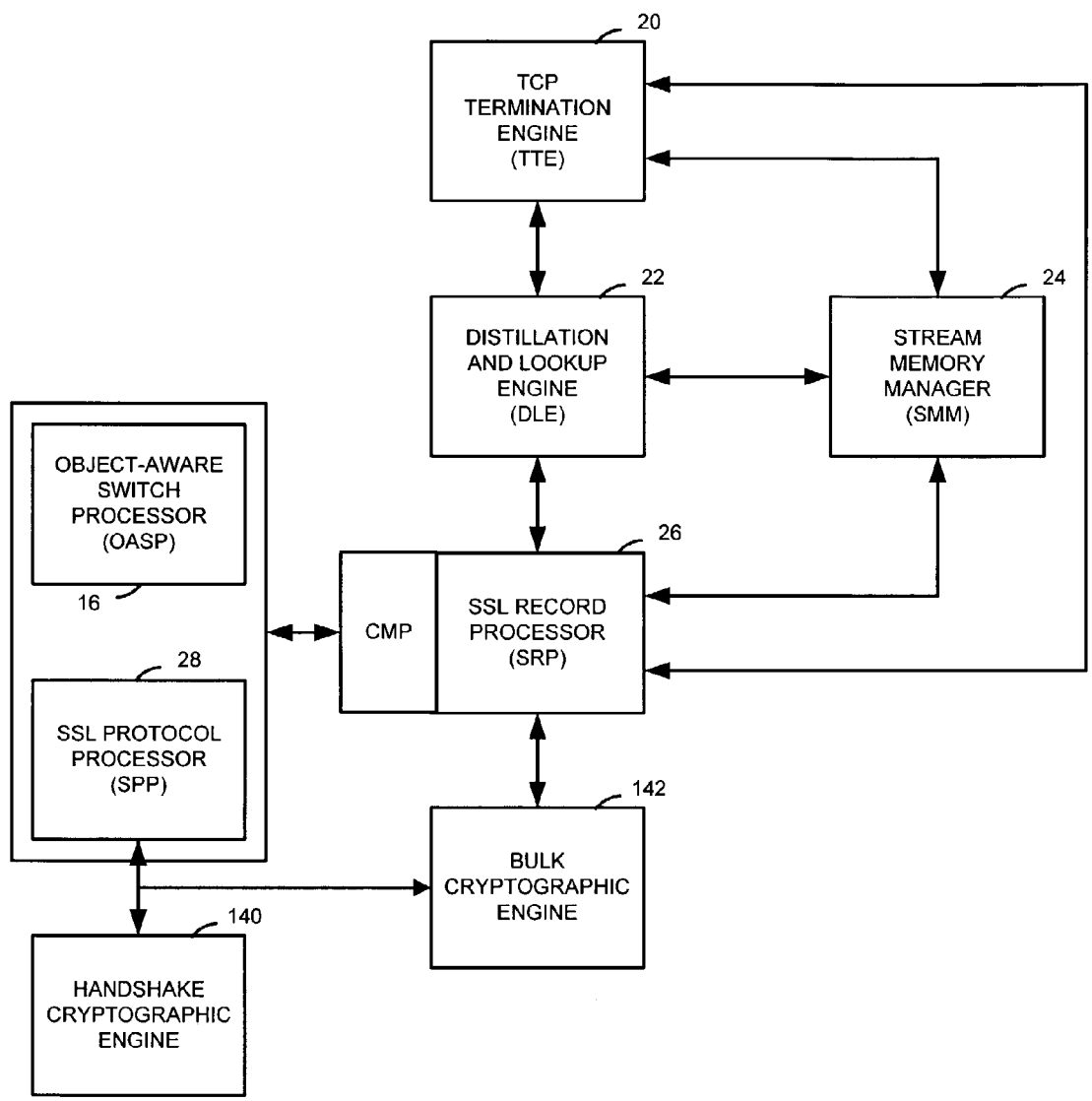
FIG. 15 is a block diagram of an illustrative object-aware switch that includes encryption processing facilities.

Referring to FIG. 15, the SSL Record Processor (SRP) 26 is an instance of an Object Transformation Engine (OTE) for the chip complex. It provides SSL acceleration functionality that allows OAS implementations to operate on SSL-encrypted data at rates that are comparable to those for unencrypted implementations.

Figure 10:
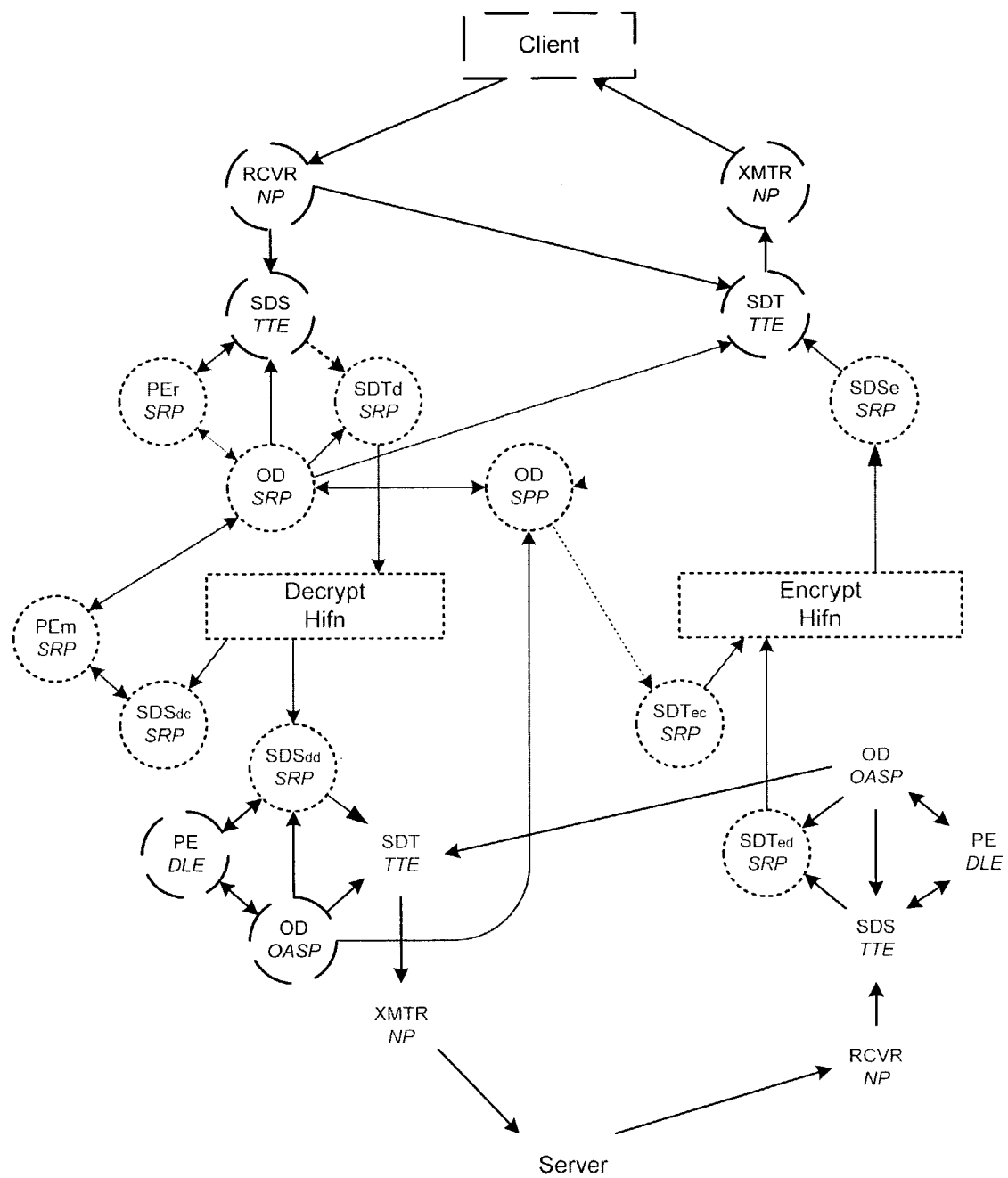
FIG. 10 is a block diagram of a second configuration for the application switch of FIG. 1 that can be used for encrypted network traffic.

As shown in FIGS. 9 and 10, the SRP is introduced as an intermediate layer in the DFA architecture of an OAS implementation. The OASP 16, TTE 20, and DLE 22 can therefore generate and receive the same messages as they do in non-SSL flow. The only difference is in the destination of the messages that are sent. For example, when the TTE opens a connection to a client, it would normally send an InitParserCmd to the DLE, but in the case of an SSL connection, which can be determined by policy and is typically determined by TCP port number, the message is sent to the SRP.

When the SRP acts as a stream data target, it can, like the TTE, act on a queue of commands that reference streams stored in the SMM. This allows it to encrypt data from a succession of streams in order of anticipated transmission without requiring any copying of data, even if the streams were created out of order by different entities.

The SRP 26 can provide SSL acceleration by acting as an interface between elements of the complex (the TTE 20, the DLE 22, and the SMM 24) and a bulk cryptographic engine 142. In one embodiment, this engine can include an off-the-shelf encryption/decryption chip, such as the HIFN 8154, produced by Hifn, of Los Gatos, Calif. This engine handles the encryption and decryption of SSL records.

The SRP can also interface with an SSL Protocol Processor (SPP) 28, which performs SSL handshake processing. The SPP can be implemented as a process running on the same processor as the OASP 16 and accessed through the SRP's DLE POS-PHY3 interface. The SPP can interface with a second cryptographic engine 142, such as a Cavium Nitrox™ security processor. This engine handles cryptographic calculations for the SSL handshaking.

An SSL record is a unit of data that is encrypted or decrypted. Within a record there may be several messages or even parts of a message. There are large messages that can easily span several SSL records. Full SSL records are always sent to the bulk cryptographic engine, but the SRP parses the SSL messages and sends them one at a time to the SPP. This parsing includes examining the length field of an SSL record and then buffering an amount of data from the record that corresponds to this length. The SPP, with one exception, always looks at SSL messages and doesn't get involved in the SSL record layer.

There are four main types of SSL records, which the SSL specification refers to as protocols. These are: the Handshake Protocol, the Alert Protocol, the Change Cipher Spec Protocol (CCS), and Application Protocol Data. Another type of record that provides compatibility with initial handshaking for SSL/TLS version 2.0-enabled browsers is also supported. The SSL specification also defines 'control messages' and 'data messages.' Control messages consist of handshake messages, alert messages and CCS messages. Data messages are application protocol data messages. The SSL standard is described in more detail in the "The SSL Protocol SSL," Version 3.0, by Alan O. Freier et al., dated Nov. 18, 1996, which is herein incorporated by reference and is presented in the accompanying Information Disclosure Statement.

For each SSL session, the SRP 26 keeps track of the following four different streams.

Receive Record Stream (RcvRecordStream)

Receive Decrypted Control Message Stream (RcvCtlMsgStream)

Receive Decrypted Data Stream (RcvDataStream) and

Transmit Record Stream (XmitRecordStream).

The Receive Record Stream (RcvRecordStream) is created by the TTE when a client initiates a session. This stream contains the raw records as the client sent them. The SRP parses this stream to give the control messages (contained in control records) to the cryptographic engine.

The Receive Decrypted Control Message Stream (RcvCtlMsgStream) is created by the SRP when initializing a CCB (Combined Context Block). This stream is created when a parser initialization message is received for a session. This stream contains the SSL messages with the record layer removed. There is one exception to this rule: application data that is either encrypted or decrypted with a result that has an error will be placed in this stream and sent to the SPP. This is considered a session fatal error and all subsequent data messages will be dropped. The data going into the stream comes from the cryptographic engine. Even if the session is not being encrypted, all traffic passes through the cryptographic engine. There is a null decrypt ID that is used when sending in SSL messages prior to the first CCS message. Each of the SSL messages in this stream is parsed, the message type and length are extracted as well as a predefined number of bytes, and sent to the SPP.

The Receive Decrypted Data Stream (RcvDataStream) is created when the SRP initializes the CCB. This stream is used for application data that is decrypted by the cryptographic engine.

The Transmit Record Stream (XmitRecordStream) is created when the SRP initializes the CCB. This stream is used for SSL records that are transmitted. These SSL records may be control messages or data messages and they may be encrypted or decrypted. The SSL record layer is added to the message by the SRP as the message comes out of the cryptographic engine.

There are two other streams that are used for SSL sessions. There is a clear stream that is used for communication from the server (ServerStream), and there is a clear stream that is used by the SPP to generate control messages (SppCtlMsgStream). The server stream is created by the TTE when initiating a session with the server. The SPP's clear-text control stream is created and managed by the SPP. The SRP becomes aware of this stream when the SPP issues a SendStreamCmd to the SDTec. The SRP stores the stream information in the CCB. This stream is also known as the EcStream (i.e. the stream used by the SDTec process).

There is one other stream that is used per server instance. This is used to store and send the server certificate. This stream is not associated with a particular session and is managed by the SPP.

Table 1 lists all the streams described above and which entity is the owner and extender of the stream. The owner is the entity that needs to decrement the use count or transfer its ownership:

TABLE 1

| Stream Name | User Owner | Xtender | Created by | Description |
| --- | --- | --- | --- | --- |
| RcvRecordStream (S1) | SRP | TTE | TTE | Created by TTE on connection establishment. The SRP is the owner, since the SRP is responsible for deleting the stream. The SRP deletes the stream when the last record has been sent through the Hifn chip and the receiver has been closed. |
| RcvCtlMsgStream (S2) | SRP | SRP/SDSdc | SRP | Created by the SRP when initializing the CCB. The SRP deletes the stream when receiving the RlsSessionId command from the SPP. |
| RcvDataStream (S3) | OASP | SRP/SDSdd | SRP | Created by the SRP when initializing the CCB. The OASP is the owner of this stream and treats it the way it does any client request stream. This stream can be 'split' on a WakeMeUpCmd from the DLE. |
| ServerStream (S4) | OASP | TTE | TTE | This stream is treated the same as a server response stream. |
| SppCtlMsgStream (S5) | SPP | SPP | SRP | This stream is completely maintained by the SPP. This stream will never have more than 1 user. The SPP instructs the SRP to delete this stream when it no longer needs to send control messages. |
| XmitRecordStream (S6) | SRP | SRP/SDSe | SRP | Created by the SRP when initializing the CCB. Once the last record to be transmitted is placed in this stream, it is sent to the TTE with an AutoDecUse flag. This will automatically delete the stream once the data has been sent. This is typically a 'Close-Notify' alert. |
| ServerCertStream (G1) | SPP | SPP | SPP | This stream is used by the SPP to store the server certificate. When sending from this stream, the SPP must increment the UseCount and then send it with AutoDecUse. This allows the deletion of the stream without the SPP keeping track of the use count. |

Note: The 'G' means that this is a general stream that is not specific to a particular session. The other 'S' streams are created and deleted per SSL session.

Table 2 presents a general description of the processes associated with the SRP.

TABLE 2

| Process | Description |
| --- | --- |
| SRP/Per (Record Layer) | Parsing Entity records. The Record Layer Parsing Entity is responsible for parsing the SSL record layer. The Per receives the InitParserCmd and must initialize the CCB and create the RcvCtlMsgStream. The Per interacts with the TTE/SDS with WakeMeUp messages. When the Per has received an entire SSL record, it passes control to the SRP/OD. |
| SRP/OD | Object Destination. The OD is logically the termination point for the Parsing Entities. It is responsible for generating the GetObjectRtn messages that are sent to the SPP for each SSL message or event. The OD also generates the SendStreamCmd messages to the SRP/SDTd, which can be generated without the SPP. The OD is physically in several state machines in the SRP, however, it is helpful to simplify it and think of it as a single process. |
| SRP/SDTd | Stream Data Target decrypt. This is the process that sends raw SSL records through the Hifn chip. Any number of application data records may be pending, however, only one control record may be pending at a given time. There is a transmit queue of raw records that need to be sent over the Hifn interface. The CCB does not maintain a transmit packet descriptor queue for this process. |
| SRP/SDSdc | Stream Data Source decrypt control messages. When a control message is passed through the Hifn chip, (either decrypted or null) the SRP/SDSdc places the message in the RcvCtlMsgStream. The SRP/SDSdc sends a message (WakeMeUpRtn) to the SRP/Pem to parse the SSL message. It is also possible that the SRP/Pem is waiting for a long message that requires another record. In this case, the SRP/Pem will send a message to the SRP/OD to restart the SRP/Per and retrieve another record. Although this process handles all control SSL messages, if a data record comes through the Hifn chip in error (either decryption |

TABLE 2-continued

| Process | Description |
|---|---|
| | error or authentication error), the data is put in the RcvCtlMsgStream. ThiS results in a GetObjectRtn message sent to the SPP with the error information. |
| SRP/SDSdd | Stream Data Source decrypt data. Data messages coming through the Hifn chip get placed in the RcvDataStream. The SRP/SDSdd has the same behavior as the TTE/SDS. It generates InitParserCmd messages to the DLE/PE, responds to WakeMeUpCmd messages, generates WakeMeUpRtn messages, and accepts AutoStreamCmd messages. |
| SRP/Pem (Message) | Parsing Entity for SSL Messages. The SRP/Pem parses the RcvCtlMsgStream and extracts SSL message information. Once an entire message is available it sends it to the SRP/OD which generates and GetObjectRtn to the SPP. |
| SPP/OD | Object Destination. This refers to the SPP function as it relates to the SRP. The SPP is responsible for processing the SSL messages and communicating with the public key engines. The SPP sets up the Hifn chips with the appropriate ciphers and configures the SRP with the HifnSessionIds. The SPP also generates the SSL messages that are required for completing the SSL handshakes. |
| SRP/SDTec | Stream Data Target encrypt control. The SRP/SDTec takes an SSL message or set of messages, creates SSL records and sends them to the Hifn. These records may or may not be encrypted depending on the state of the session. The SPP issues the SendStreamCmd message to the SRP/SDTec and can only have 1 outstanding SendStream per session. Note that there can be any number of SSL messages in the stream, but they must all be of the same SSL protocol. Once the SRP/SDTec receives the SendStreamCmd message, it will take priority over any application data being sent from SRP/SDTed. The SPP may issue another SendStreamCmd once it has received the ack message that the current one has been transmitted through the Hifn chip. The SRP/SDSe generates this acknowledgement message. |
| SRP/SDTed | Stream Data Target encrypt data. Unencrypted data is sent to the SRP/SDTed for encryption from the TTE or OASP. This behaves in the same way as the TTE/SDT. It can accept SendStreamCmd, or SessionCmd messages. These send requests are placed on a transmit descriptor list for the session. An SSL data record is then created and sent through the bulk cryptographic engine. |
| SRP/SDSe | Stream Data Source encrypt. This process takes SSL records from the Hifn and puts them in the XmitRecordStream. The SSL 5 byte record header is put in the stream. A SendStreamCmd is then sent to the TTE. This SDS is always in 'AutoStream to End of Session' mode. |

Figure 16:
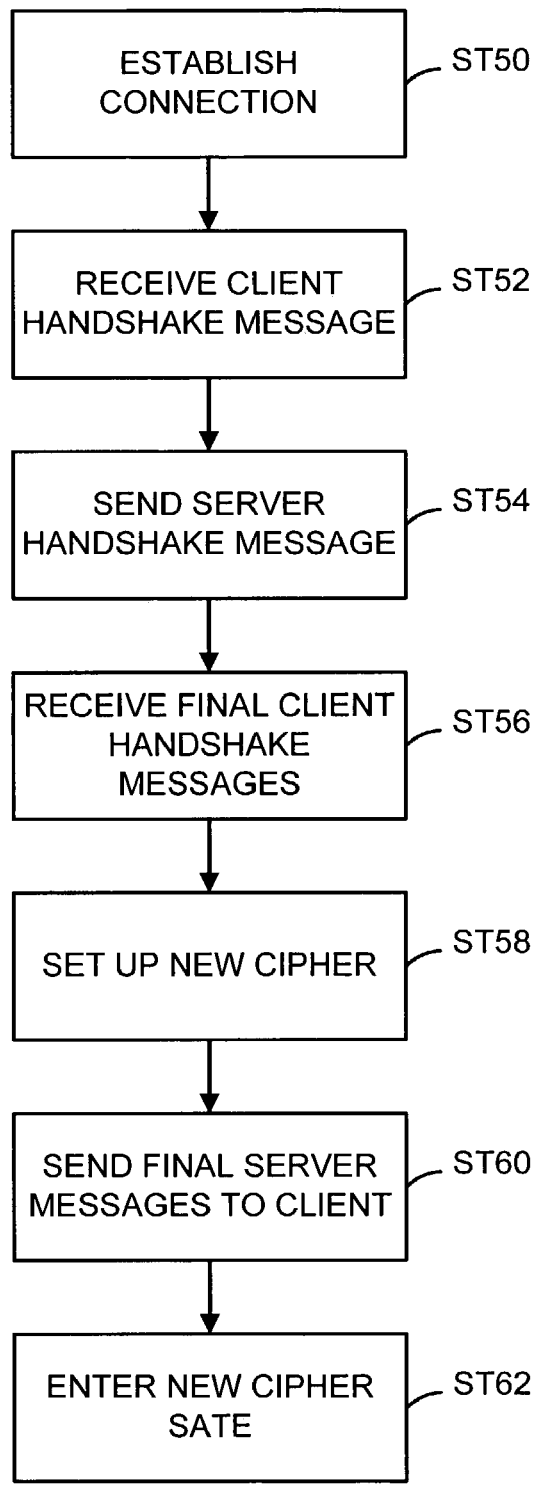
FIG. 16 is a flowchart illustrating the operation of the encryption processing facilities of FIG. 15.

In operation, referring to FIG. 16, basic message flow begins with the establishment of a connection (step ST50). An SSL session begins when a client opens a connection to the TTE. A policy that was executed on the TTENP determines the new session handle, which contains a default template index that points to the default TCB to be used by the TTE for that session. For SSL sessions the parsing entity is the SRP and the object destination is the SPP.

A parser initialization message is sent from the TTE/SDS to the SRP/Per (Parsing Entity for the Record layer). The SRP/Per initializes the CCB for that session and also creates the RcvCtlMsgStream, RcvDataStream and the XmitRecordStream. If a complete SSL record is available in the RcvRecordStream, the SRP/OD issues a SendStreamCmd to the SRP/SDTd.

The next event in the basic message flow is the receipt of an SSL handshake from the client (ClientHello) (step ST52). The SRP/SDTd sends the SSL record through the cryptographic processor using currently active cipher. For the first handshake on a connection this is a null cipher. The SRP/SDSdc receives the ClientHello message and writes it into the RcvCtlMsgStream. The SSL record header is not written to the stream. It is stored in the CCB. The SRP/SDSdh sends a message to the SRP/Pem (Parsing Entity for SSL Messages) to parse the message. The SRP/Pem parses the message header, and, if a complete message is in the stream (note it is possible the message spans multiple SSL records), a GetObjectRtn message is sent to the SPP.

The OAS then generates and sends SSL handshake messages to the client (step ST54). The SPP creates the server handshake messages (ServerHello, Certificate, and ServerHelloDone) and puts these messages in a single stream, SppCtlMsgStream (stored in CCB as EcStream). The SPP issues a SendStreamCmd to the SRP/SDTec. Note that the SDTeh can only transmit from one stream at a time. It is stored in the CCB, not in a transmit descriptor. The SRP/SDTec sends the server handshake messages through the cryptographic engine, again, using the current cipher, which at this time is null. Note that the SRP/SDTec only sends as much data as will fill in a maximum sized SSL record. If the size of the messages in the stream is larger, the SDTec will break it into several SSL records. The SRP/SDSe receives the message data and puts on the SSL record layer header as it writes the message data to the SMM in stream XmitRecordStream. The SRP/SDSe always issues a SendStreamCmd to the TTE/SDT. It behaves as though it is in a permanent autostream mode.

The next event in the basic message is the transfer of the final SSL Handshake messages to SPP (step ST56). The client responds to the SSL handshake messages from the OAS with ClientKeyExchange, ChangeCipherSpec and Finished messages. The SPP issues a RestartParserCmd to the SRP/Pem. If there are no messages, or an incomplete message, in the RcvCtlMsgStream, the SRP/Pem will restart the SRP/Per to retrieve another record. If there are no records available, the SRP/Per will issue a WakeMeUpCmd to the TTE/SDS. The TTE/SDS receives the client responses and sends a WakeMeUpRtn to the SRP/Per. The SRP/Per sends the first record (containing only the ClientKeyExchange) through the cryptographic engine. The SRP/SDSdc, receives the record, puts in the SMM, and tells the SRP/Pem to parse the message. The SRP/Pem then parses the message and sends a message to the SPP.

The next event in the basic message is the receipt of a CCS/Finished message by the SPP (step ST56). The SPP then issues a restart parser command to the SRP/Pem. Since there are no more messages to process, the SRP/Pem requests another record from the SRP/Per. The SRP/Per sends the next record, which is a ChangeCipherSpec, through the cryptographic engine to the SDSdc. The Pem records in the CCB that it has received the CCS message and then requests the next record from the Per. Once the Pem receives the 'Finished' message, it sends a message to the SPP indicating receipt of the 'Finished' message and also indicating that a valid CCS was received just before it.

The OAS then sets up the cryptographic engine with a new cipher (step ST58). This process can begin with the transmission of handshake messages to the bulk cryptographic engine, which validates the finished message and returns the keys. The SPP then installs the keys in the bulk cryptographic engine. Final handshake messages can then be sent to the Client. The SPP writes the finished message into a stream (SppCtlMsgStream). The SRP/SDTec sends the finished message preceded with a CCS message.

Finally, the SRP transitions into a new cipher state (step ST62). A RestartParserCmd is issued to the SRP.

Table 3 shows all of the messages sent between the SRP, SPP, DLE and TTE.

TABLE 3

| Source/Destination | Messages | Description |
| --- | --- | --- |
| TTE.SDS - SRP.PER | InitParserCmd SessionEvt | |
| DLE.PE - SRP.SDSdd | WakeMeUpCmd | |
| SRP.PER - TTE.SDS | WakeMeUpCmd | |
| SRP.SDSdd - DLE.PE | InitParserCmd SessionEvt | |
| SRP.SDSdd - TTE.SDT | SendStreamCmd | |
| SRP.SDSe TTE.SDT | SendStreamCmd SessionCmd | |
| SRP.OD - TTE | CreateSessionCmd | |
| SRP.SDSe - SPP | AutoStreamRtn | Used to terminate the SendStremCmd for the sending of a control message. |
| OASP - SPP | CreateSessionCmd SessionCmd | OASP.Client OASP.Server |
| OASP - SRP.SDSdd | AutoStreamCmd | |
| SPP - SRP.OD | CreateSessionCmd | |
| SPP - SRP.PEM | GetObjectCmd | |
| SPP - SRP.SDTec | SessionCmd SendStreamCmd | |
| SPP - SRP.OD | SetCipherStateCmd | |

The SRP receives the peHandle from the TTE in the InitParserCmd message. The TTE, in its TCB that was copied from a default TCB used for SSL, should have the SRP's Parsing Entity Handle. The SRP sends the pehandle received from the TTE to the SPP on the GetObjectRtn message sent with the ClientHello message. When the SPP issues the SetCipherStateCmd message to the SRP, it updates the peHandle to what the next parsing entity requires (i.e. this is what would normally be sent directly from the TTE to the DLE for non-SSL connections).

One of the goals of the SSL subsystem is to make it as seamless as possible to the OASP. The message interaction between the OASP and the chip complex remains the same whether the session is SSL terminated or not. The only difference is the destination of the DFA commands. The OASP only needs to redirect its messages that would normally go to the TTE to the SRP or SPP. This is dependant on the command. Table 4 shows destinations for the individual messages.

TABLE 4

| Command | Destination | Description |
| --- | --- | --- |
| CreateSessionCmd | TTE | This command is only used for sessions where re-encryption is required (Client side). |
| SendStreamCmd | SRP/SDTed | The OASP can send data to be encrypted. The target of the OASP generated SendStreamCmd message is always the SDTed. |
| AutoStreamCmd | SRP/SDSdd | The OASP can direct decrypted data to be automatically sent to the server. |
| SessionCmd | SPP | These must be directed to the SPP. The SPP must know when a session is being terminated (SendFin, SendRst, or Abort). The SPP will also instruct the SRP to send a Close-Notify alert, if necessary. |
| AccessTcbCmd | TTE | These still need to go the TTE. |
| WakeMeUpCmd | SRP | When the OASP is also acting as a parsing entity, it may need to send a WakeMeUpCmd message to the SRP. |

Figure 17:
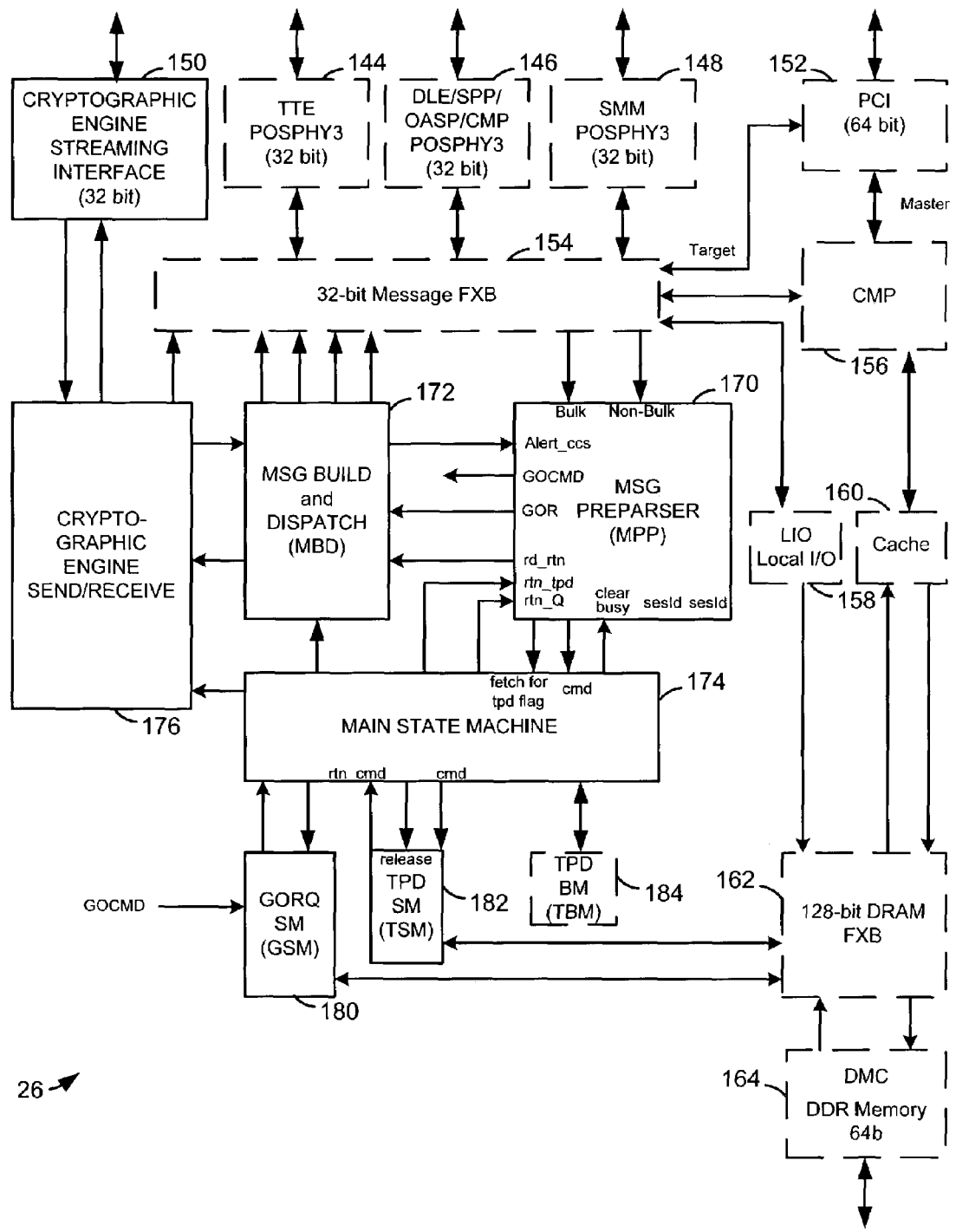
FIG. 17 is a block diagram of an SSL record processor for the object-aware switch of FIG. 15.

Referring to FIG. 17, the structure of an illustrative embodiment of the SRP 26 will be discussed in more detail.

There are 3 POS-PHY interfaces 144, 146, 148 on the SRP. They are connected to the TTE 20, the DLE 22, and the SMM 24, respectively. Each of these interfaces is 32 bits wide running at 100 MHz. The SRP interfaces to the bulk cryptographic engine 140 using a streaming interface 150. This interface consists of two unidirectional buses each 32 bits wide and running at 83 MHz. The SRP is the master for these interfaces with a FIFO handshaking signaling mechanism. Although this interface can handle the sending of SSL records in multiple transfers, the SRP always sends complete SSL records to the Hifn chip. The SRP uses external memory to store session state information. In one embodiment, it uses a 128-bit 133 MHz DDR DRAM interface with 64 Mbytes of memory 164 with a cache 160. Messages are transported to and from the POS-PHY interfaces and a PCI interface 152 through a 32-bit message crossbar 154. This crossbar is also operatively connected to a local 10 interface 158 and to the Command Message Processor (CMP) 156.

A Message Pre-Parser (MPP) 170 receives messages from the crossbar 154 and determines whether they should be routed to a Main State Machine (MSM) 174, a message build and dispatch unit (MBD) 172, or a cryptographic engine send/receive unit 176. The MSM also detects error conditions in SSL records, including invalid message types, and invalid version fields.

The main state machine 174 is responsible for operations surrounding the creation of the CCB and the four streams used in SSL processing. It interfaces with three other units that assist it in these tasks, the Get Object Return Tag Queue (GORQ) 180, the Transmit Packet Descriptor State Machine (TPD SM) 182, and the Transmit Packet Descriptor Buffer Manager (TPD BM) 184. The GORQ manages tags for get object return messages. The TPD SM manages lists of CCB's. And the TPD BM is responsible for the allocation of resources including session ID's for the bulk cryptographic processor 140. The MBD 172 is responsible for relaying messages through the crossbar 154.

The present invention has now been described in connection with a number of specific embodiments thereof. However, numerous modifications which are contemplated as falling within the scope of the present invention should now be apparent to those skilled in the art. It is therefore intended that the scope of the present invention be limited only by the scope of the claims appended hereto. In addition, the order of presentation of the claims should not be construed to limit the scope of any particular term in the claims.

What is claimed is:

1. A network communication unit, comprising:

decision logic operative to determine whether at least one secure message contained in at least one cryptographic record should be routed through a cryptographic record parsing engine or whether to bypass the cryptographic record parsing engine via a message passing system comprising a higher priority queue and a lower priority queue, upon a determination to route the at least one cryptographic record to the cryptographic record parsing engine, the cryptographic record parsing engine receiving and parsing the at least one cryptographic record, said cryptographic record parsing engine having an input and an output, message-length-detection logic operative to store an amount of message data even if the message is encoded in a plurality of different cryptographic record, wherein said amount of message data corresponds to a message length obtained from the at least one cryptographic record to be stored, and a processor including cryptographic handshake logic for performing cryptographic handshaking, said processor having an input operatively connected to the output of the cryptographic record parsing engine so as to receive the cryptographic records that have been parsed by the cryptographic record parsing engine.

2. The network communication unit of claim 1 wherein the cryptographic record parsing engine is an SSL/TLS parsing engine.

3. The network communication unit of claim 1 wherein the message-length detection logic is operative to cause the amount of message data to be stored independent of any interactions with the processor.

4. The network communication unit of claim 1 further including a handshake cryptographic acceleration engine operatively connected to a port of the processor.

5. The network communication unit of claim 4 wherein operative connections between the processor and the cryptographic record parsing engine are of a different type than are operative connections between the processor and the cryptographic acceleration engine.

6. The network communication unit of claim 4 further including a bulk cryptographic acceleration engine operatively connected to a port of the processor, wherein the handshake cryptographic acceleration engine includes handshake acceleration logic, and wherein the bulk cryptographic acceleration engine includes encryption and decryption acceleration logic.

7. The network communication unit of claim 1 wherein the cryptographic record parsing engine includes validation logic operative to validate format information in a cryptographic records received from the network.

8. The network communication unit of claim 7 wherein the validation logic includes type validation logic for validating message types.

9. The network communication unit of claim 7 wherein the validation logic includes protocol version validation logic for validating version fields.

10. The network communication unit of claim 7 wherein the validation logic is operative to invalidate cryptographic records independent of any interactions with the processor.

11. The unit of claim 1, wherein the message passing system comprises at least one portion of at lest one secure message in the higher priority queue and at least one portion of at least one second secure message in the lower priority queue, the portion of the secure message in the higher priority queue passes the portion of the secure second message in the lower priority queue where the higher priority queue is serviced prior to the lower priority queue when the higher priority queue is non-empty.

* * * * *